US010978053B1

(12) United States Patent
Smythe et al.

(10) Patent No.: US 10,978,053 B1
(45) Date of Patent: Apr. 13, 2021

(54) SYSTEM FOR DETERMINING USER INTENT FROM TEXT

(71) Applicant: SAS Institute Inc., Cary, NC (US)

(72) Inventors: Jared Michael Dean Smythe, Cary, NC (US); Richard Welland Crowell, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/069,128

(22) Filed: Oct. 13, 2020

Related U.S. Application Data

(60) Provisional application No. 62/984,741, filed on Mar. 3, 2020.

(51) Int. Cl.
| | |
|---|---|
| *G10L 15/18* | (2013.01) |
| *G10L 13/02* | (2013.01) |
| *G10L 15/22* | (2006.01) |

(52) U.S. Cl.
CPC .......... *G10L 15/1815* (2013.01); *G10L 13/02* (2013.01); *G10L 15/1822* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 8,543,401 B2 * | 9/2013 | Suendermann | ..... G10L 15/1815 704/243 |
| 9,454,960 B2 | 9/2016 | Stewart | |
| 10,331,402 B1 | 6/2019 | Spector et al. | |
| 10,559,308 B2 | 2/2020 | Smythe et al. | |
| 10,600,406 B1 * | 3/2020 | Shapiro | ................... G10L 15/22 |
| 2003/0217052 A1 * | 11/2003 | Rubenczyk | ......... G06F 16/3323 |
| 2013/0103390 A1 | 4/2013 | Fujita et al. | |

(Continued)

OTHER PUBLICATIONS

Rabiner, L. R., & Huang, B. H., Fundamentals of speech recognition. Englewood Cliffs, NJ: Prentice Hall., 1993, Chapter 8, pp. 434-481.

(Continued)

*Primary Examiner* — Neeraj Sharma
(74) *Attorney, Agent, or Firm* — Bell & Manning, LLC

(57) ABSTRACT

A system determines user intent from a received conversation element. A plurality of distinct intent labels are generated for the received conversation element. The generated plurality of distinct intent labels are divided into a plurality of interpretation partitions with overlapping semantic content. for each interpretation partition of the plurality of interpretation partitions, a set of maximal coherent subgroups are defined that do not disagree on labels for terms in each subgroup, a score is computed for each maximal coherent subgroup of the defined set of maximal coherent subgroups, and a maximal coherent subgroup is selected from the set of maximal coherent subgroups based on the computed score. Intent labels are aggregated from the selected maximal coherent subgroup of each interpretation partition of the plurality of interpretation partitions to define a multiple intent interpretation of the received conversation element. The defined multiple intent interpretation is output for the received conversation element.

29 Claims, 53 Drawing Sheets

(56) References Cited

U.S. PATENT DOCUMENTS

| | | | |
|---|---|---|---|
| 2014/0358889 A1* | 12/2014 | Shmiel | G06F 16/3329 707/710 |
| 2015/0081711 A1* | 3/2015 | Harris | G06F 16/367 707/737 |
| 2016/0350277 A1* | 12/2016 | Malle | G06F 40/30 |
| 2017/0177715 A1 | 6/2017 | Chang et al. | |
| 2017/0228369 A1* | 8/2017 | Zelenkov | G06F 40/30 |
| 2017/0235848 A1* | 8/2017 | Van Dusen | G06F 16/904 705/12 |
| 2018/0025303 A1* | 1/2018 | Janz | G06Q 10/0639 705/2 |
| 2018/0060304 A1 | 3/2018 | Bull et al. | |
| 2020/0097563 A1* | 3/2020 | Alexander | G06Q 30/01 |
| 2020/0142959 A1* | 5/2020 | Mallinar | G06N 20/00 |

OTHER PUBLICATIONS

Allen, J. (1995) Natural language understanding. Redwood City, CA: The Benjamin Cummings, Chapter 1, pp. 1-18; Chapter 15, pp. 465-499, Chapter 16, pp. 503-537 and Chapter 17.8, pp. 564-567.

McTear, M. F. (2004). Spoken dialogue technology. Toward the conversational user interface. Springer. http://dx.doi.org/10.1007/978-0-85729-414-2, pp. 341-348.

Baptist, L., & Seneff, S. (2000). Genesis-II: A versatile system for language generation in conversational system applications. Proceedings of the 6th International Conference on Spoken Language Processing (ICSLP '00), 3, 271-274.

Dutoit, T. (1996). An introduction to Text-to-Speech synthesis. Dordrecht: Kluwer Academic, pp. 145-155.

Daniel Jurafsky and James H. Martin, Speech and Language Processing, Chapter 15 Dependence Parsing, 2019, 27 pages.

NLP Toolkit for JVM Languages, 2020 by Emory NLP.

Google AI Blog, posted by Slav Petrov, Announcing SyntaxNet: The World's Most Accurate Parser Goes Open Source, May 12, 2016.

Michael C. McCord, IBM Research Report, Using Slot Grammar, Mar. 24, 2010, 69 pages.

Software>Stanford Parser, The Stanford Parser: A statistical parser, Stanford NLP Group, 2011, 16 pages.

Fujita et al., "A Compositional Approach toward Dynamic Phrasal Thesaurus", *Proceedings of the Workshop on Textual Entailment and Paraphrasing*, pp. 151-158, Jun. 2007.

\* cited by examiner

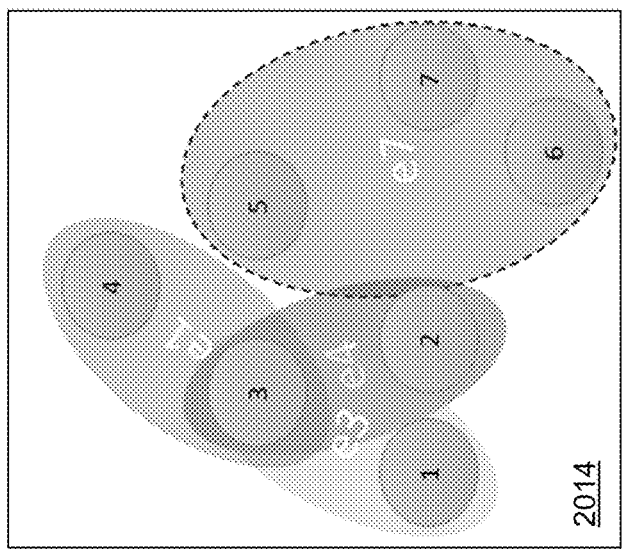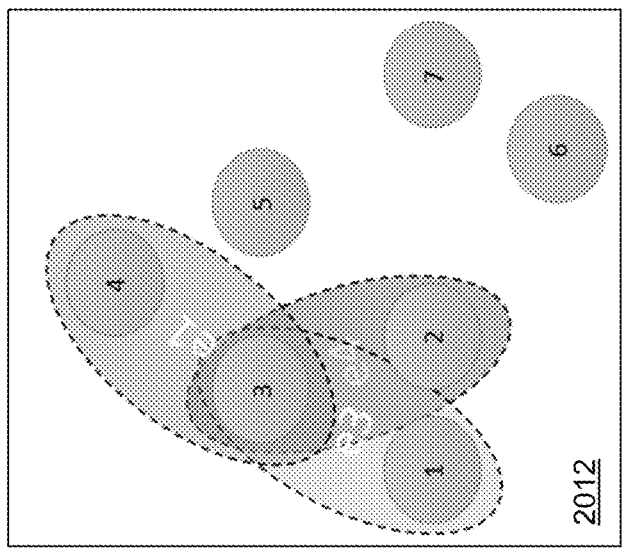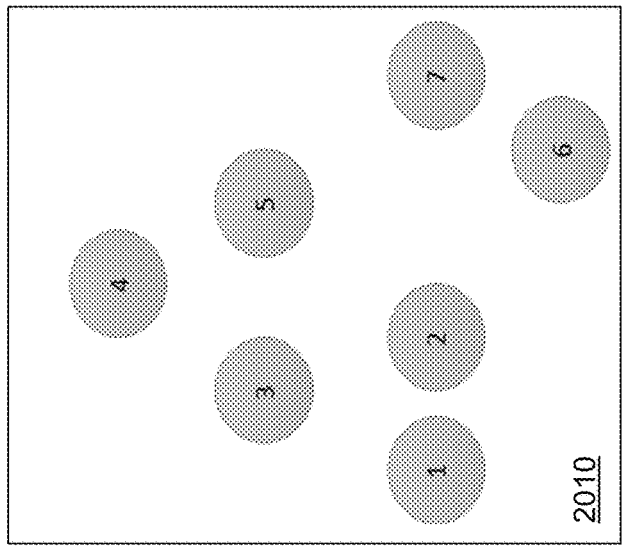
FIG. 20C

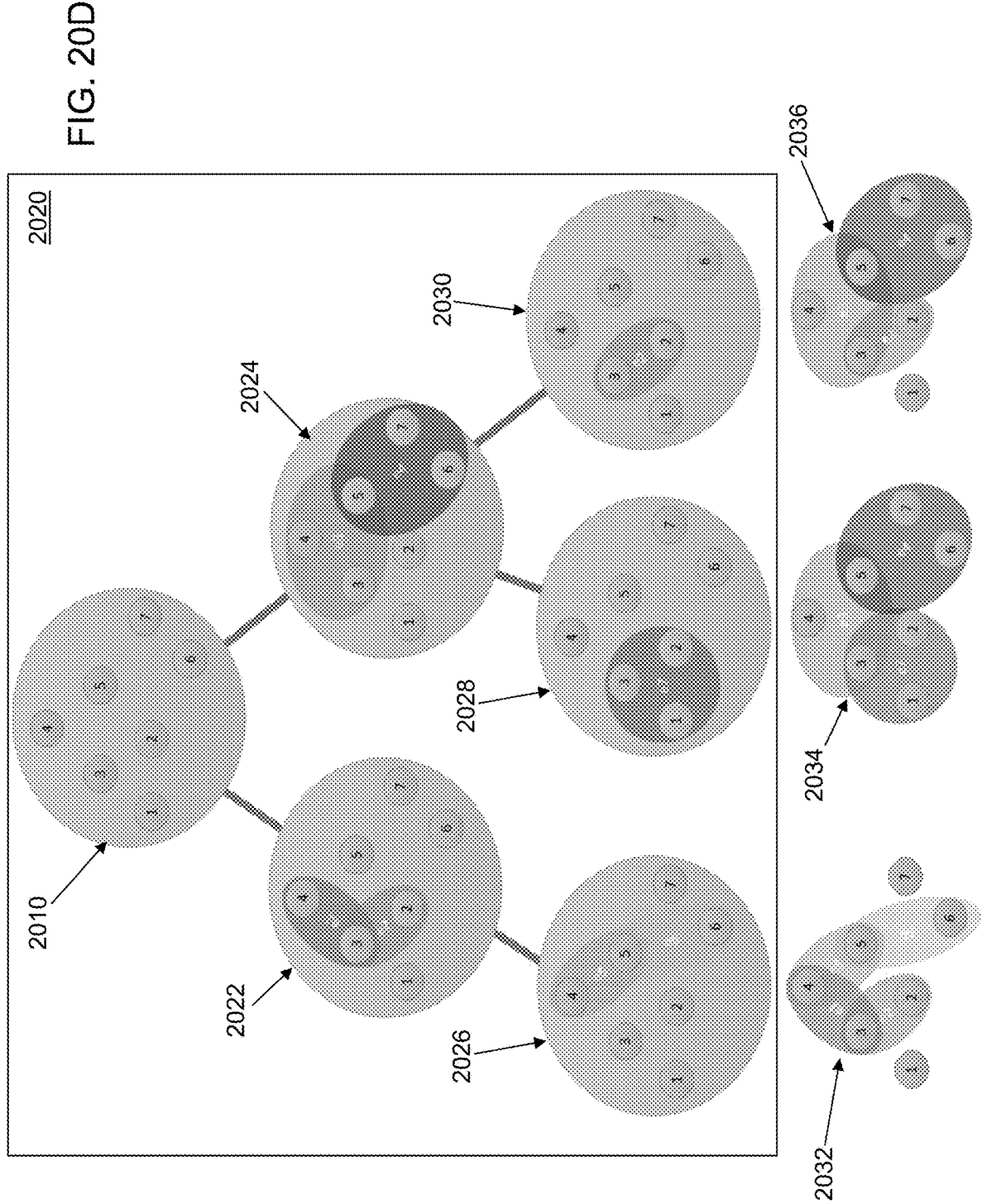

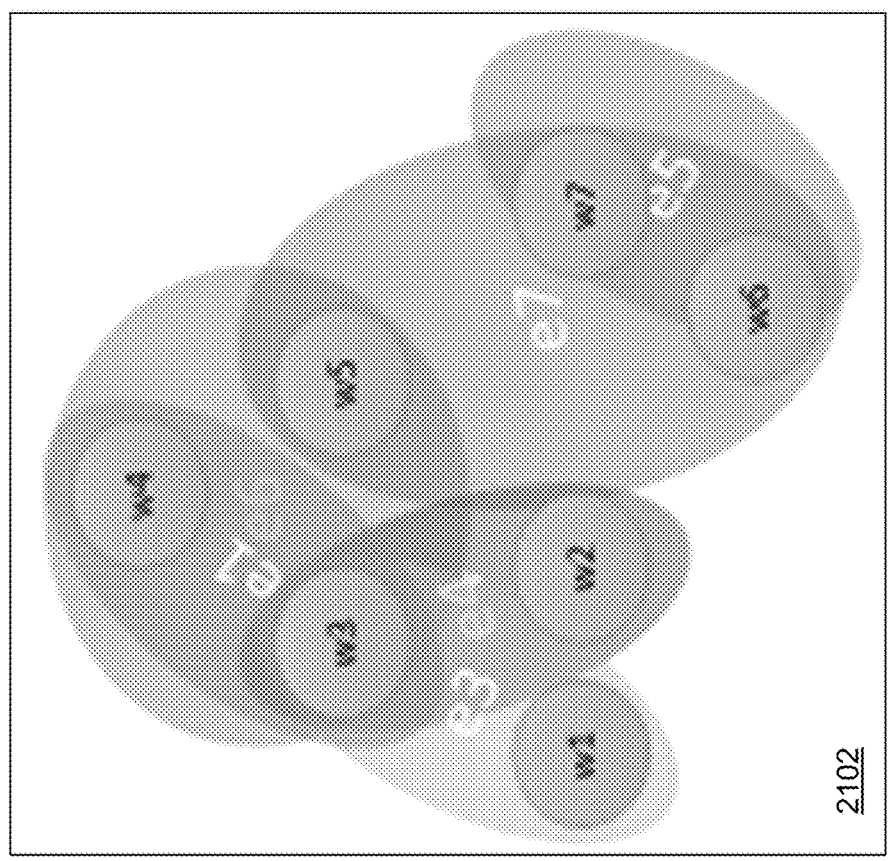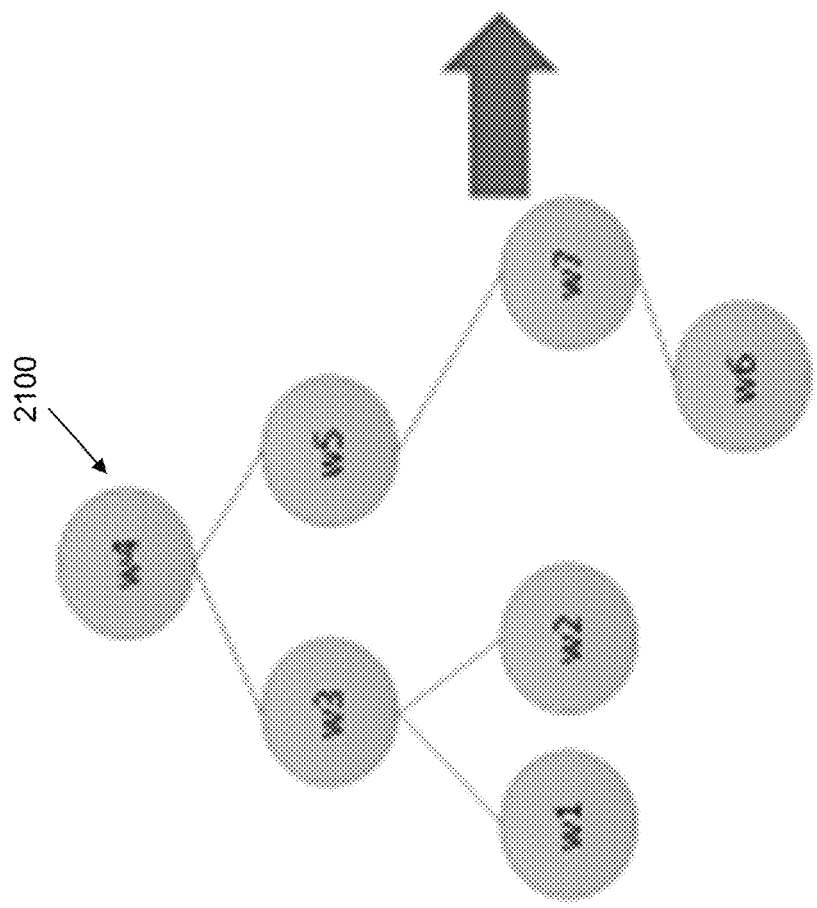
FIG. 21A

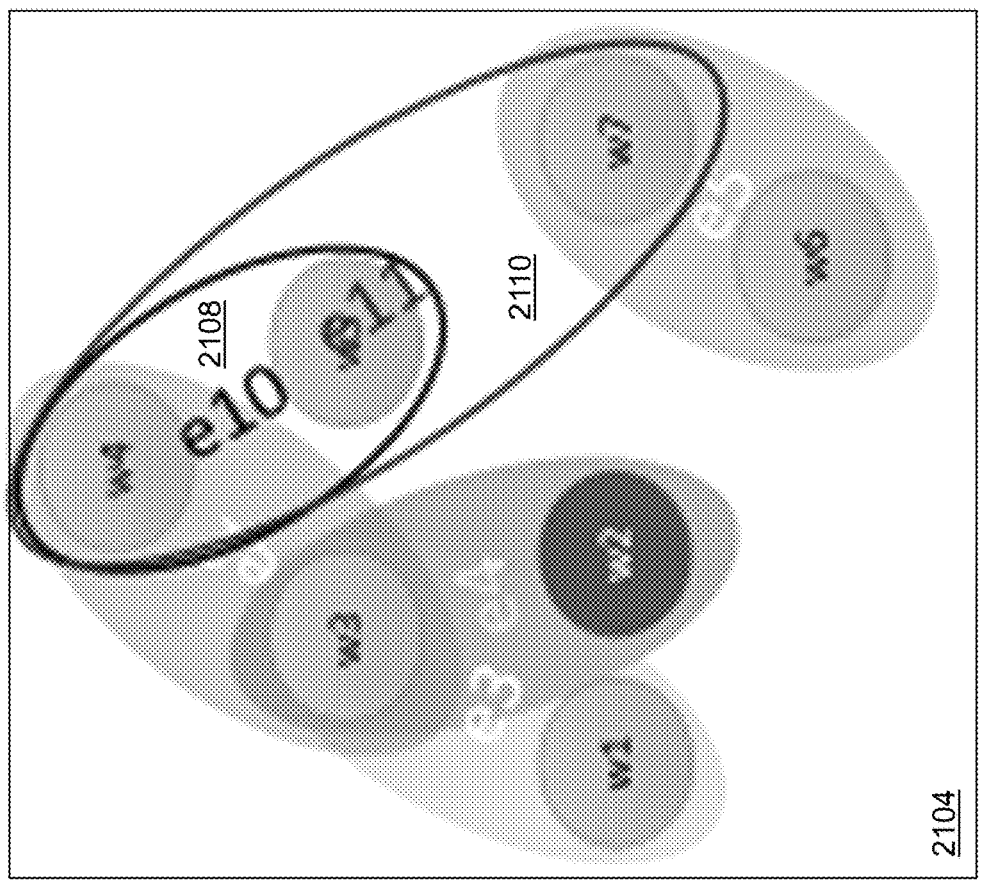
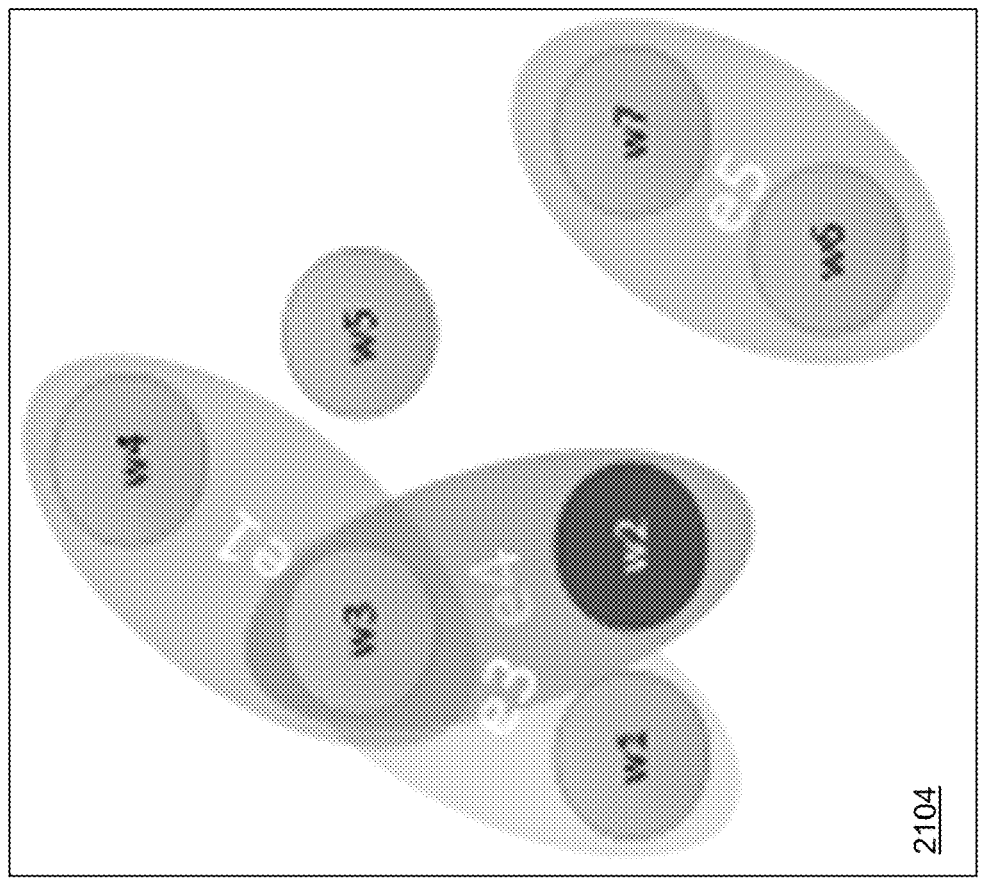
FIG. 21C

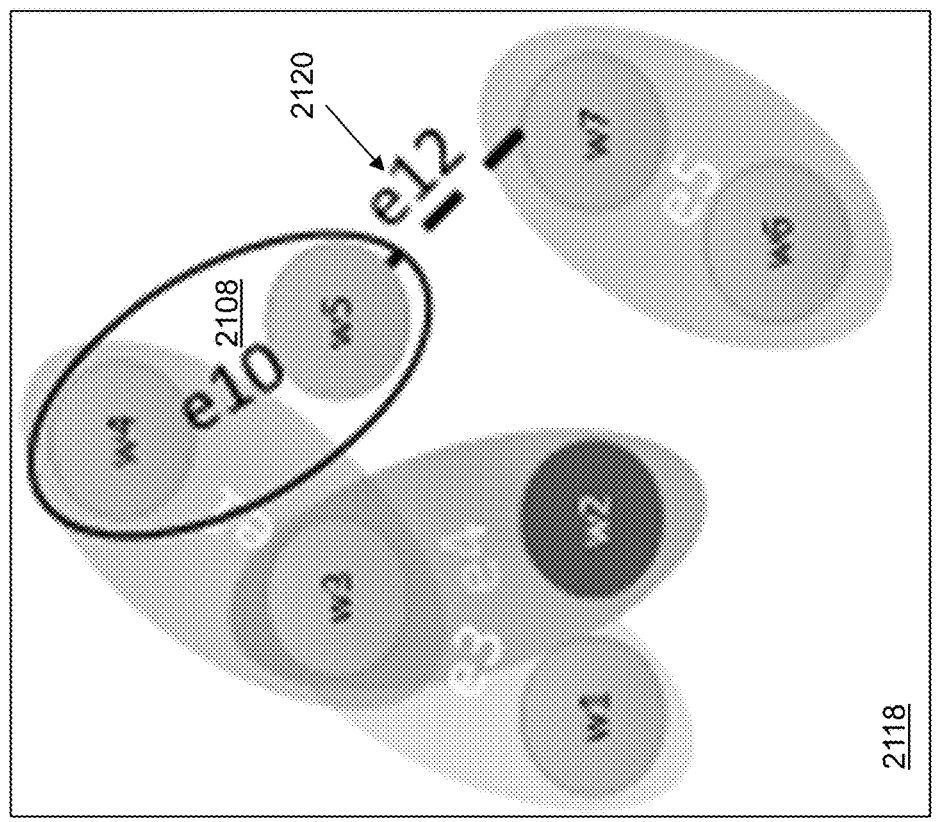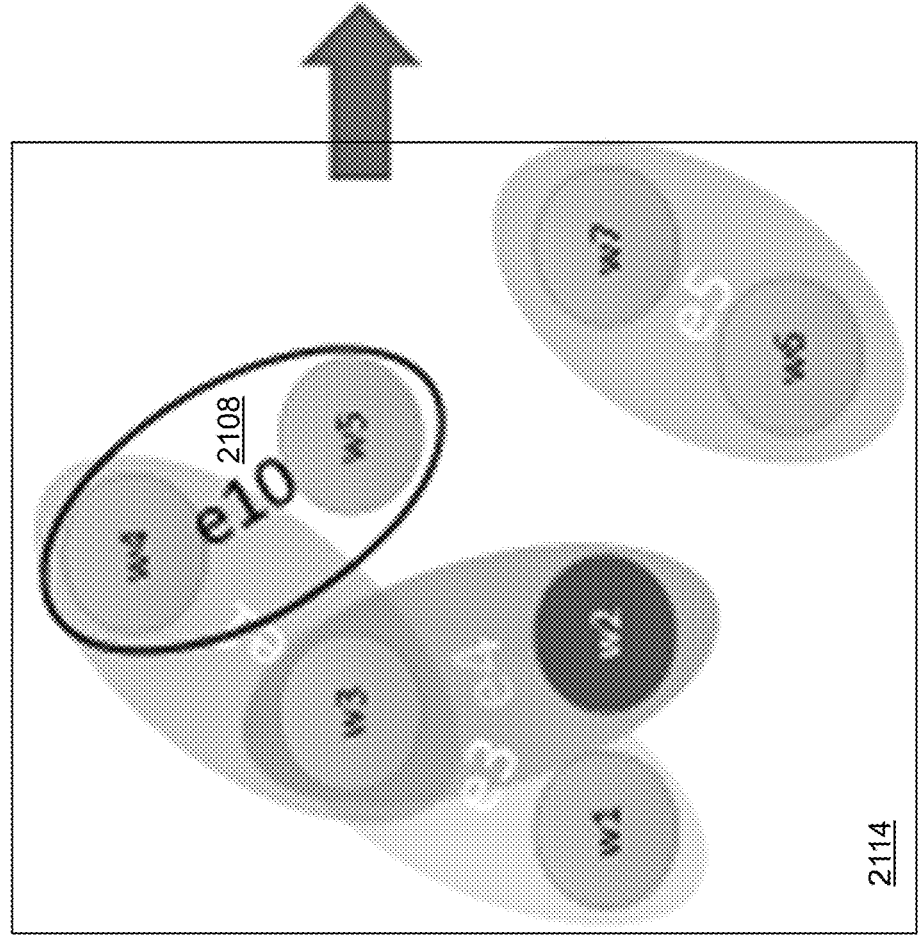
FIG. 21E

FIG. 22A
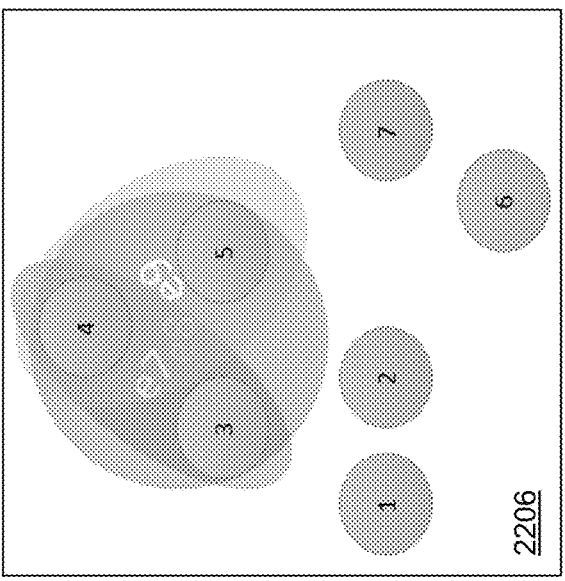
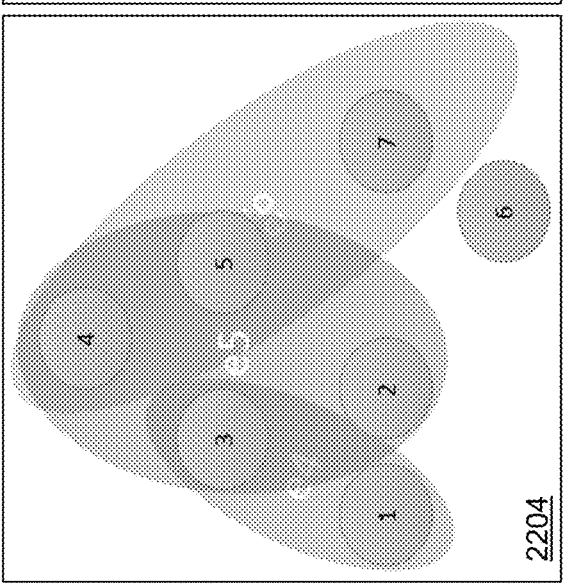
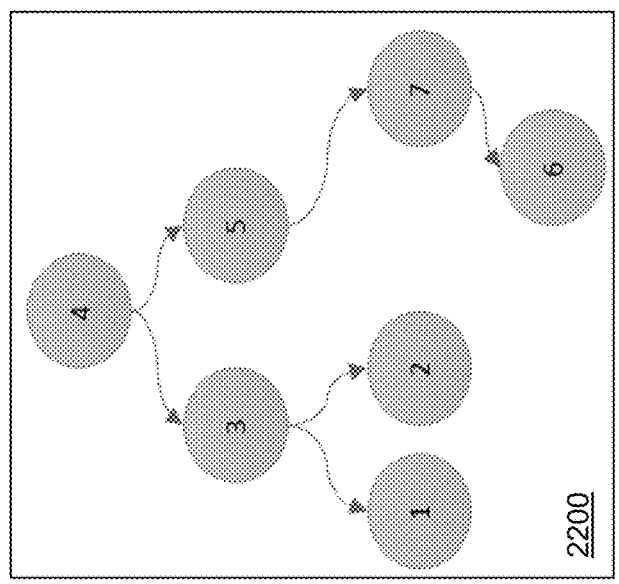

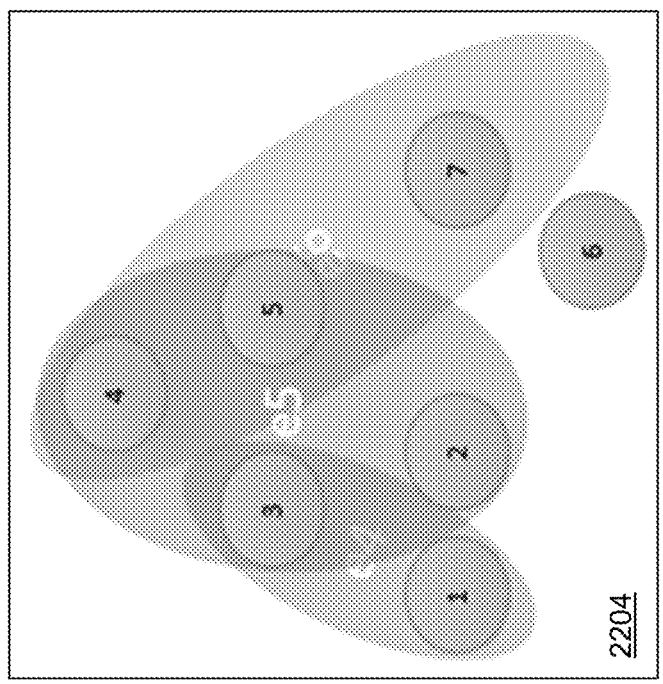
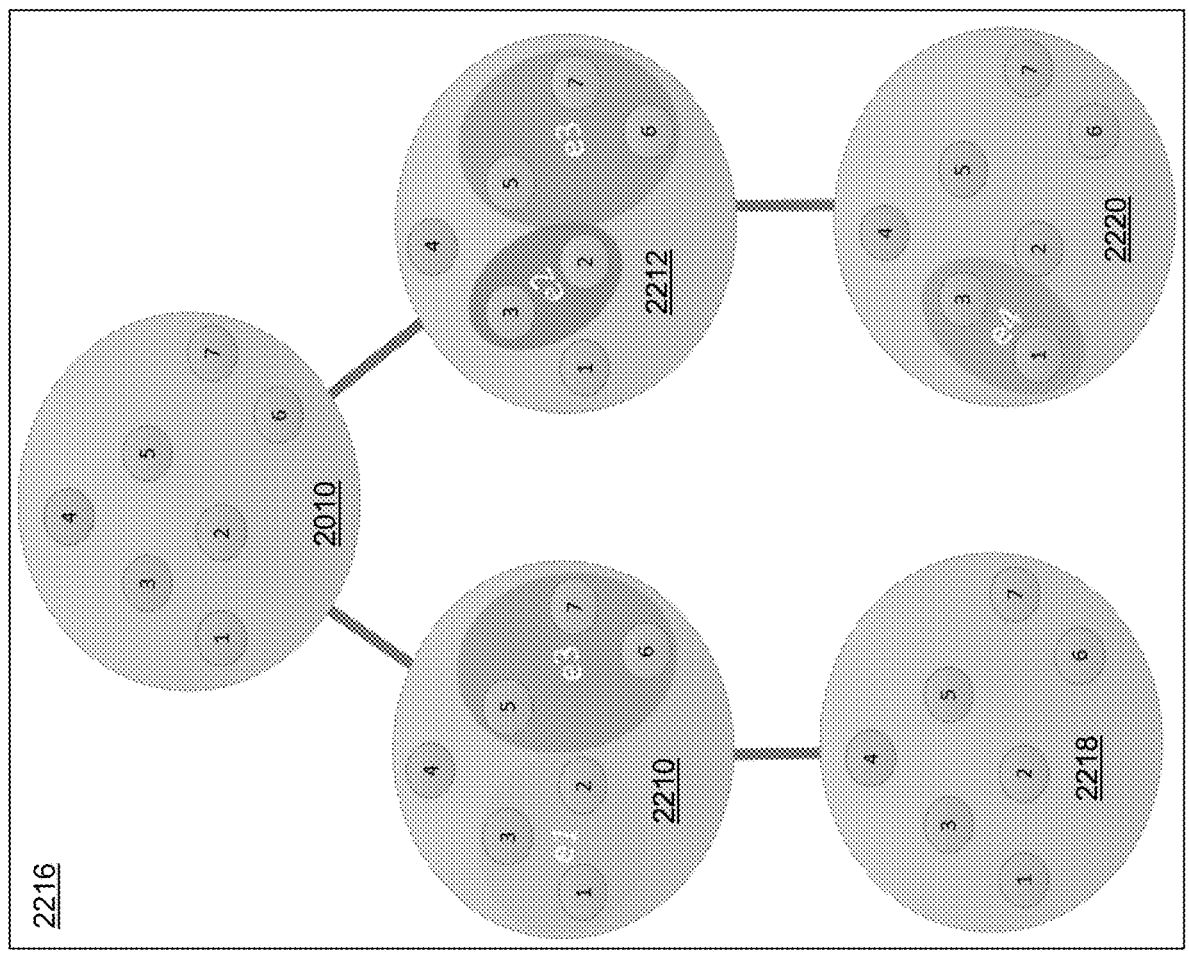
FIG. 22D

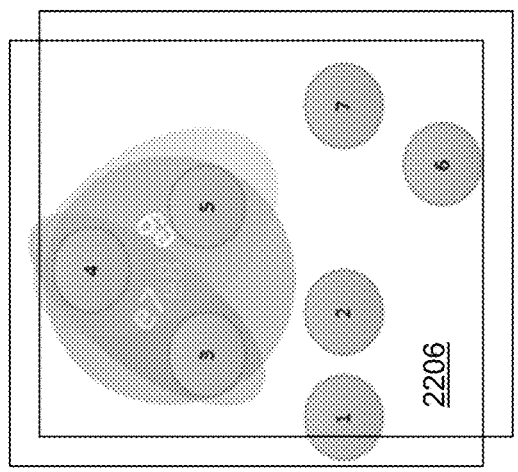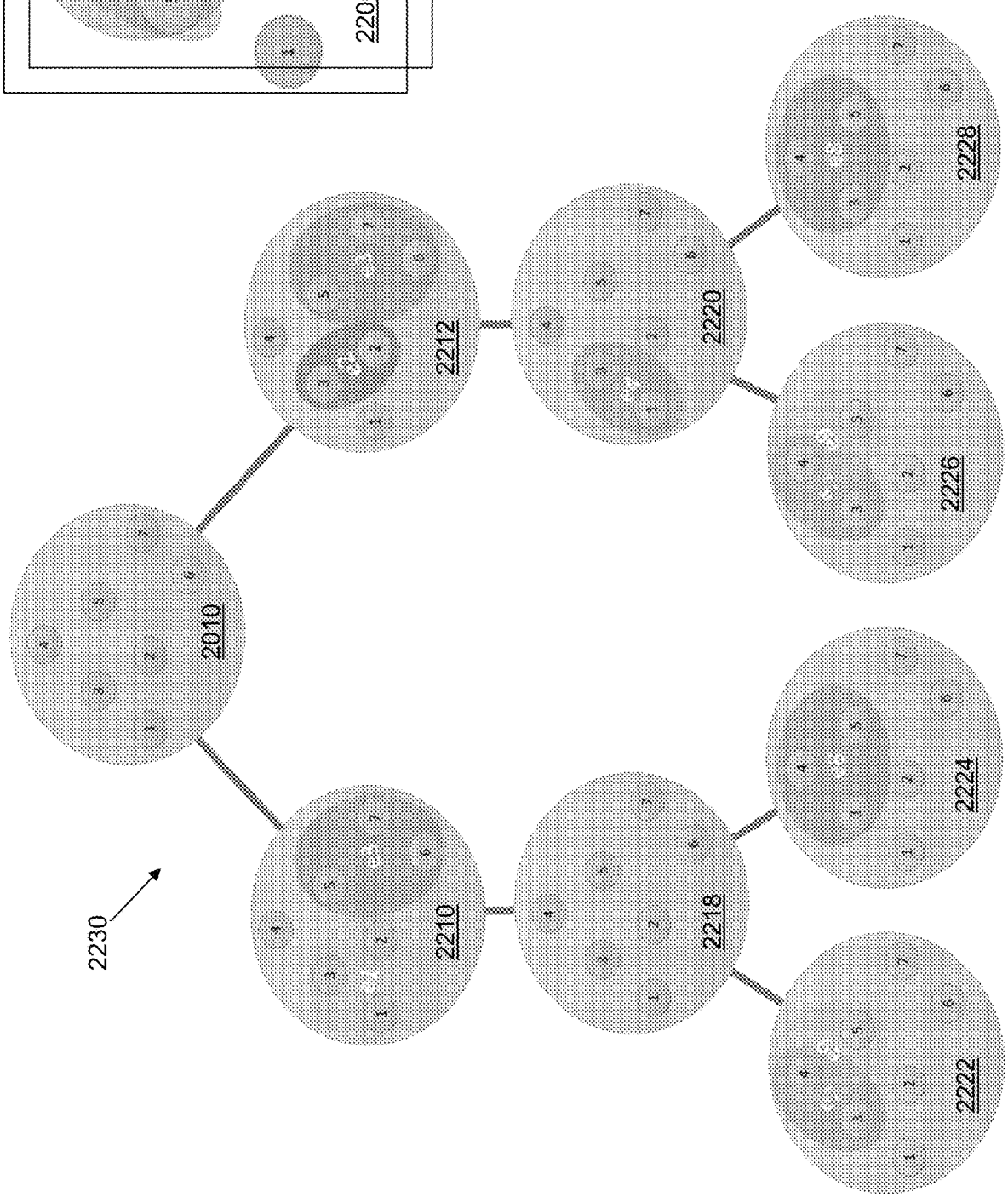
FIG. 22E

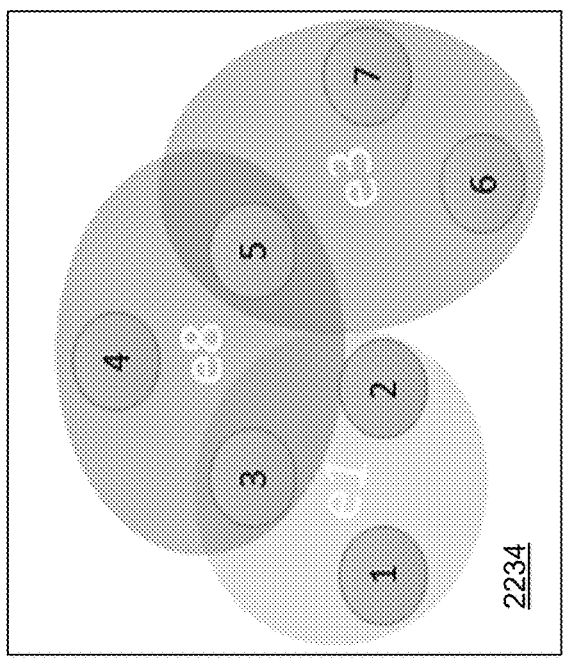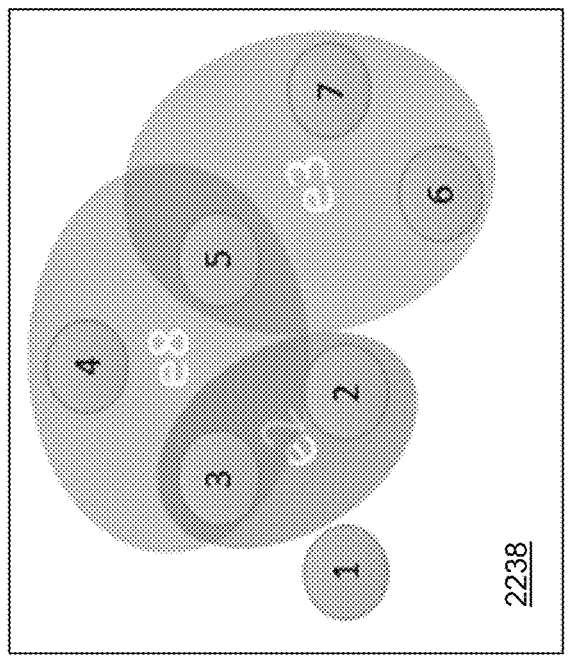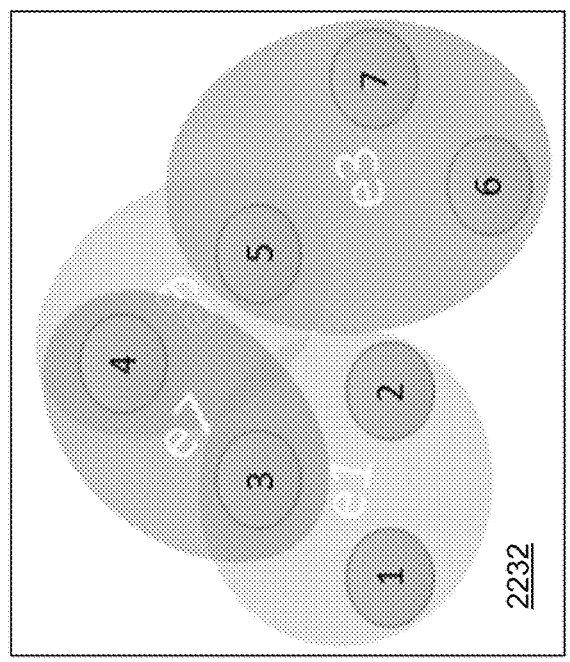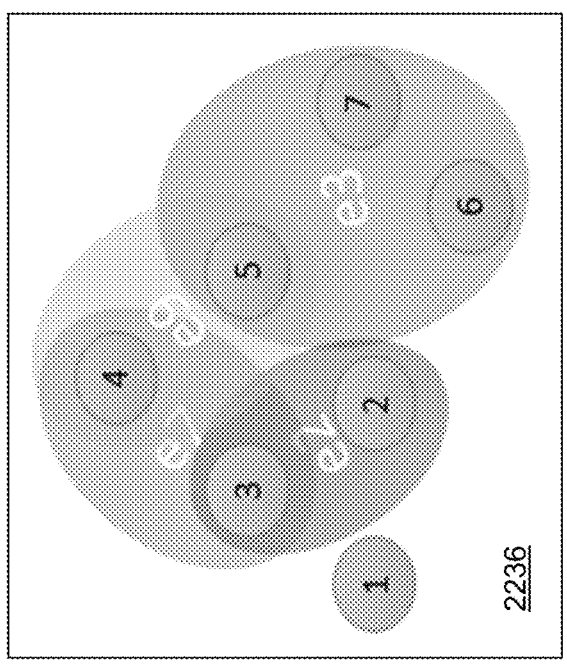
FIG. 22F

US 10,978,053 B1

SYSTEM FOR DETERMINING USER INTENT FROM TEXT

CROSS-REFERENCE TO RELATED APPLICATIONS

The present application claims the benefit of and priority to 35 U.S.C. § 119(e) to U.S. Provisional Patent Application No. 62/984,741 filed on Mar. 3, 2020, the entire contents of which are hereby incorporated by reference.

SUMMARY

In an example embodiment, a non-transitory computer-readable medium is provided having stored thereon computer-readable instructions that, when executed by a computing device, cause the computing device to determine user intent from text. A conversation element is received. A plurality of distinct intent labels are generated for the received conversation element. The generated plurality of distinct intent labels are divided into a plurality of interpretation partitions with overlapping semantic content. for each interpretation partition of the plurality of interpretation partitions, a set of maximal coherent subgroups are defined that do not disagree on labels for terms in each subgroup, a score is computed for each maximal coherent subgroup of the defined set of maximal coherent subgroups, and a maximal coherent subgroup is selected from the set of maximal coherent subgroups based on the computed score. Intent labels are aggregated from the selected maximal coherent subgroup of each interpretation partition of the plurality of interpretation partitions to define a multiple intent interpretation of the received conversation element. The defined multiple intent interpretation is output for the received conversation element.

In another example embodiment, a computing device is provided. The computing device includes, but is not limited to, a processor and a non-transitory computer-readable medium operably coupled to the processor. The non-transitory computer-readable medium has instructions stored thereon that, when executed by the computing device, cause the computing device to determine user intent from text.

In yet another example embodiment, a method of determining user intent from text is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIGS. 20A to 20E graphically illustrate concepts for building the intent semantic rules in accordance with an illustrative embodiment.

FIGS. 21A to 21F graphically illustrate aspects of building the intent semantic rules in accordance with an illustrative embodiment.

FIGS. 22A to 22I further graphically illustrate aspects of building the intent semantic rules in accordance with an illustrative embodiment.

DETAILED DESCRIPTION

Figure 1:
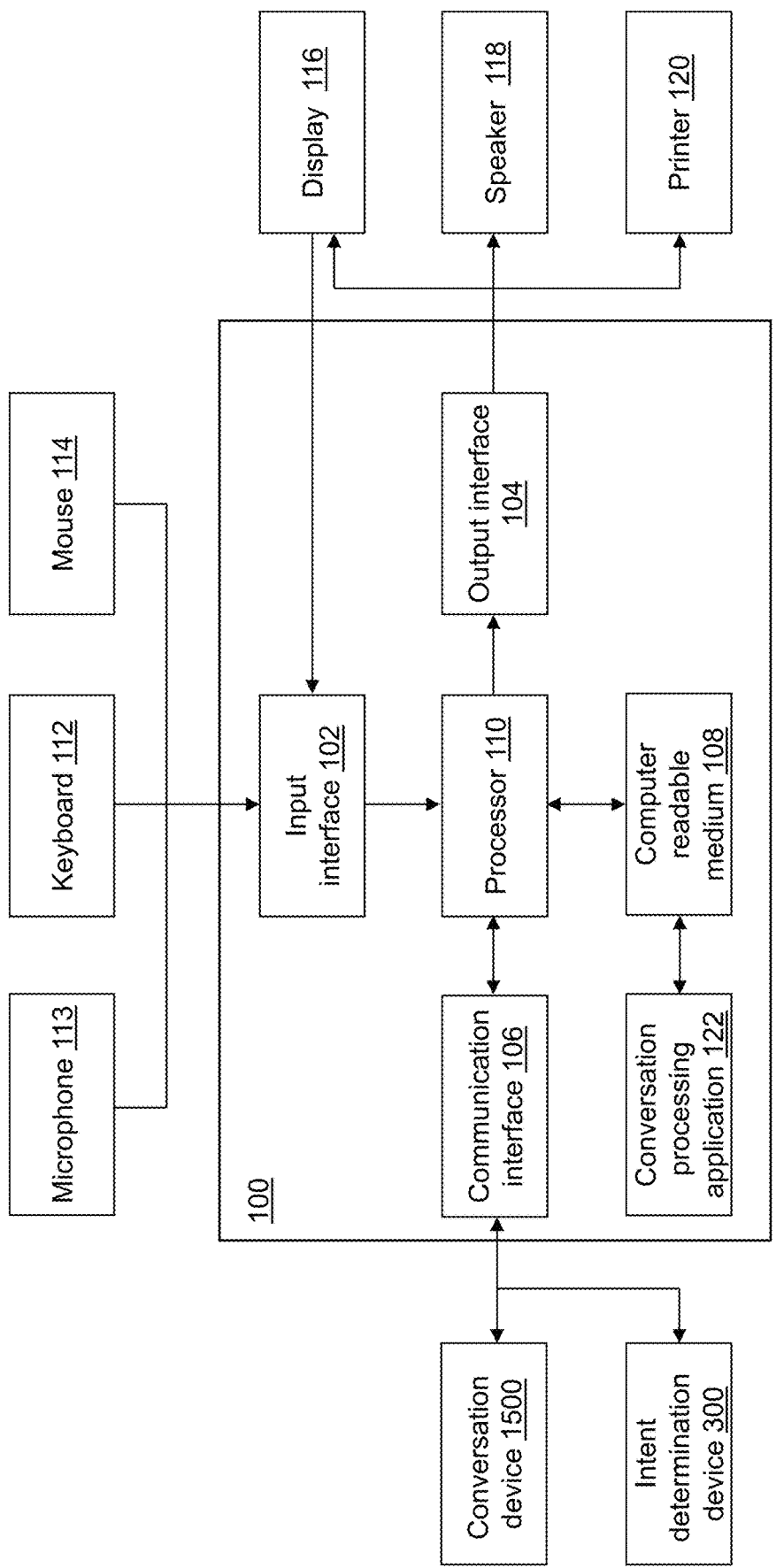
FIG. 1 depicts a block diagram of a conversation processing device in accordance with an illustrative embodiment.

Referring to FIG. 1, a block diagram of a conversation processing device 100 is shown in accordance with an illustrative embodiment. Conversation processing device 100 may include an input interface 102, an output interface 104, a communication interface 106, a non-transitory computer-readable medium 108, a processor 110, and a conversation processing application 122. Fewer, different, and/or additional components may be incorporated into conversation processing device 100.

Conversation processing device 100 may receive a conversation element from a conversation device 1100 (shown referring to FIG. 11), determine a response to the conversation element, and send the determined response to conversation device 1100. Conversation processing device 100 may receive the conversation element as text or voice that is converted to text using voice recognition. Once the text is understood using natural language understanding (NLU) processes, one or more responses can be determined, for example, using natural language generation (NLG) processes. The response(s) may be provided in text, using a synthetic voice, as an image, a hyperlink, etc.

NLU processes decipher the meaning of the text though the text may have various meanings, for example, because different words have the same meaning or the meaning changes based on the context. NLG processes perform the opposite function. Given the determination of the meaning of the text, NLG processes generate narratives in conversational language based on domain knowledge to produce accurate output quickly.

As understood by a person of skill in the art, intent identification and the associated slot filling of an identified intent are critical subtasks of NLU of conversation elements. NLU is a branch of artificial intelligence that helps computers understand, interpret, and manipulate human language. NLU draws from many disciplines, including computer science and computational linguistics to support human communication with computers. NLU goes beyond a structural understanding of language to interpret intent and to resolve context and word ambiguity. NLU algorithms tackle the complex problem of semantic interpretation—that is, understanding the intended meaning of spoken or written language, with all the subtleties, context, and inferences that humans are able to comprehend.

Existing conversation processing devices perform intent identification and the associated slot filling using either human created domain ontologies and semantic grammars, classifiers using sentence-to-slot labels, sentence-to-filler labels, and sentence-to-intent labels, or sequence models (e.g., recurrent neural network) using sentence-to-filled-slot labels. Conversation processing device 100 provides a ranked coherent integration of multiple intent hits. Semantic relationships aid the conversation or dialogue processing system in choosing the best slots and fillers for a given conversation element (question, command, comment, statement, etc.).

Input interface 102 provides an interface for receiving information from the user or another device for entry into conversation processing device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into conversation processing device 100 or to make selections presented in a user interface displayed on display 116.

Output interface 104 provides an interface for outputting information for review by a user of conversation processing device 100 and/or for use by another application or device. For example, output interface 104 may interface with various output technologies including, but not limited to, display 116, a speaker 118, a printer 120, etc. Conversation processing device 100 may have one or more output interfaces that use the same or a different output interface technology. The output interface technology further may be accessible by conversation processing device 100 through communication interface 106.

The same interface may support both input interface 102 and output interface 104. For example, display 116 comprising a touch screen provides a mechanism for user input and for presentation of output to the user. Conversation processing device 100 may have one or more input interfaces that use the same or a different input interface technology. The input interface technology further may be accessible by conversation processing device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Conversation processing device 100 may have one or more communication interfaces that use the same or a different communication interface technology. For example, conversation processing device 100 may support communication using an Ethernet port, a Bluetooth antenna, a telephone jack, a USB port, etc. Data and messages may be transferred between conversation processing device 100 and conversation device 1100 and/or an intent determination device 300 (shown referring to FIG. 3) using communication interface 106.

Non-transitory computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. conversation processing device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Conversation processing device 100 also may have one or more drives that support the loading of a memory media such as a CD, DVD, an external hard drive, etc. One or more external hard drives further may be connected to conversation processing device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Conversation processing device 100 may include a plurality of processors that use the same or a different processing technology.

Conversation processing application 122 performs operations associated with receiving the conversation element from conversation device 1100, determining the response to the conversation element based on an intent determination by intent determination device 300, and sending the determined response to conversation device 1100. The operations may be implemented using hardware, firmware, software, or any combination of these methods. Referring to the example embodiment of FIG. 1, conversation processing application 122 is implemented in software (comprised of computer-readable and/or computer-executable instructions) stored in computer-readable medium 108 and accessible by processor 110 for execution of the instructions that embody the operations of conversation processing application 122. Conversation processing application 122 may be written using one or more programming languages, assembly languages, scripting languages, etc. Conversation processing application 122 may be integrated with other analytic tools. As an example, conversation processing application 122 may be part of an integrated data analytics software application and/or software architecture such as that offered by SAS Institute Inc. of Cary, N.C., USA. For example, conversation processing application 122 may be integrated with one or more SAS software tools such as SAS® Enterprise Miner™, SAS® Visual Text Analytics, SAS® Visual Analytics, SAS® Contextual Analysis, Base SAS, SAS/STAR), SAS® High Performance Analytics Server, SAS® LASR™, SAS® In-Database Products, SAS® Viya™, SAS In-Memory Statistics for Hadoop®, SAS® Event Stream processing (ESP), SAS® Mobile BI, SAS Conversation Designer, all of which are developed and provided by SAS Institute Inc. of Cary, N.C., USA. Data mining and data analytics is applicable in a wide variety of industries.

Conversation processing application 122 may be implemented as a Web application. For example, conversation processing application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Figure 2:
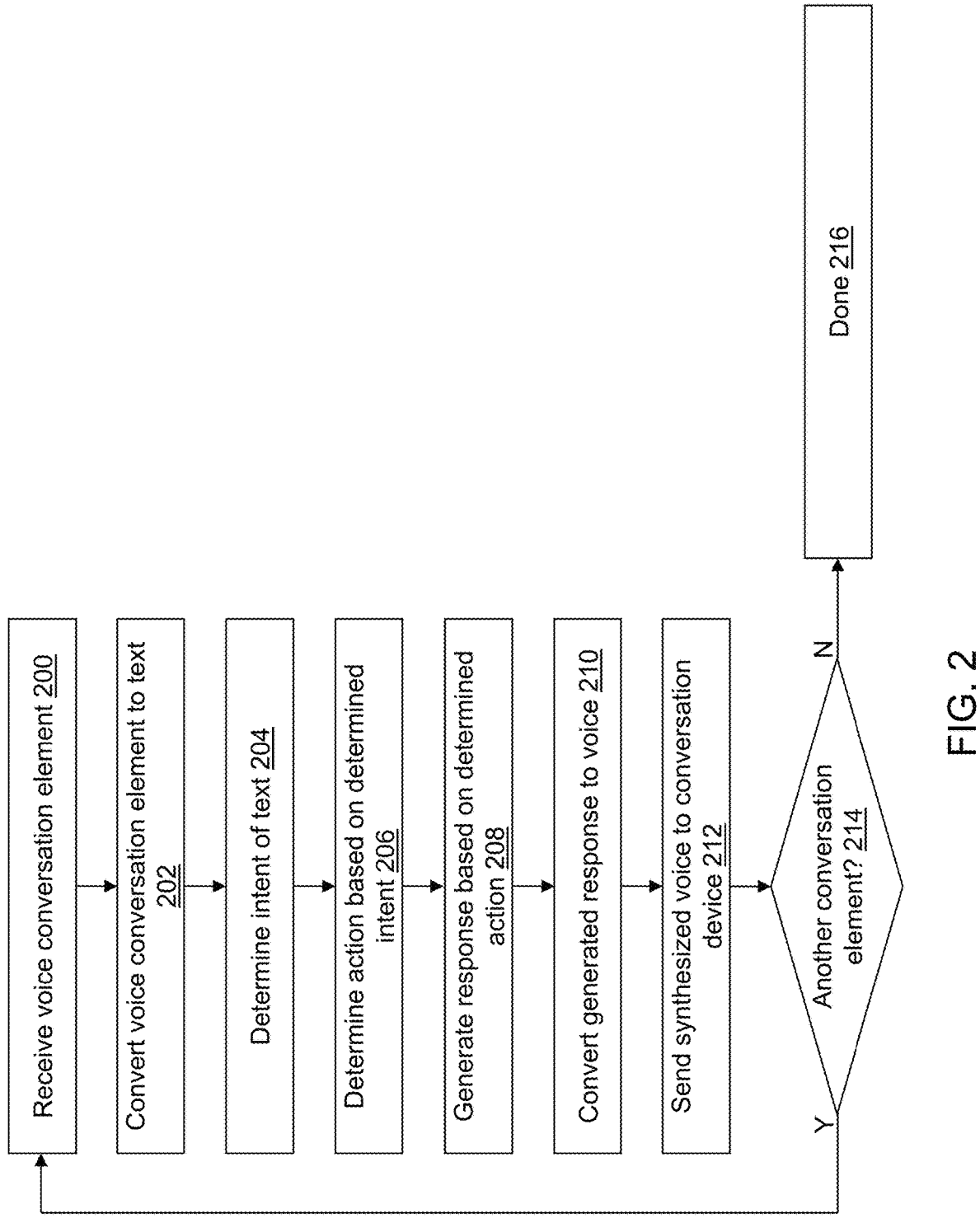
FIG. 2 depicts a flow diagram illustrating examples of operations performed by the conversation processing device of FIG. 1 in accordance with an illustrative embodiment.

Referring to FIG. 2, example operations associated with conversation processing application 122 are described. Additional, fewer, or different operations may be performed depending on the embodiment of conversation processing application 122. The order of presentation of the operations of FIG. 2 is not intended to be limiting. Although some of the operational flows are presented in sequence, the various operations may be performed in various repetitions, concurrently (in parallel, for example, using threads and/or a distributed computing system), and/or in other orders than those that are illustrated. For example, a user may execute or trigger execution of conversation processing application 122, which causes presentation of a first user interface window, which may include a plurality of menus and selectors such as drop-down menus, buttons, text boxes, hyperlinks, etc. associated with conversation processing application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by conversation processing application 122. For example, instead of receiving input through a user interface, the input may be read from a file stored on computer-readable medium 108 and/or on another computing system.

In an operation 200, a first indicator may be received that indicates a voice conversation element such as a question, command, statement, comment, etc. made to conversation device 1100. As an example, the first indicator may be received by conversation processing application 122 after receipt from microphone 113 through input interface 102 or from a second microphone 1113 (shown referring to FIG. 11) through a third input interface 1102 (shown referring to FIG. 11) of conversation device 1100 through communication interface 106 and a third communication interface 1106 (shown referring to FIG. 11) of conversation device 1100, etc.

In an operation 202, the received voice conversation element may be converted to text using voice recognition software as understood by a person of skill in the art. In an alternative embodiment, text is received using the first indicator instead of voice, and no translation is performed. As an example, the first indicator including text may be received by conversation processing application 122 after selection from a user interface window of a third display 1116 (shown referring to FIG. 11) possibly also using a second keyboard 1112 (shown referring to FIG. 11), or a second mouse 1114 (shown referring to FIG. 11) of conversation device 1100 and through third input interface 1102, after entry by a user into the user interface window of conversation device 1100, and/or after being translated from voice to text by a third processor 1110 (shown referring to FIG. 11) of conversation device 1100 before sending the first indicator through third input interface 1102 and communication interface 106.

In an operation 204, one or more intents of the text is determined. Illustrative examples with a proper multiple intent interpretation include:
"Normalize column A and add it to column B."
    1. "Normalize column A" and
    2. "Add column A to column B"
"Turn off the light and the computer."
    1. "Turn off the light" and
    2. "Turn off the computer"

"Sally is a manager and lives in Greenville."
1. "Sally is a manager" and
2. "Sally lives in Greenville"

"I have lost my wallet and my keys. Can you help me? Also, my credit card was in my wallet."
1. "I lost my wallet" and
2. "I lost my keys" and
3. "Can you help me?" and
4. "I lost my credit card"

An action or conversational flow corresponding to each intent can be quite different. For example, the results could be to act on all of them in parallel, to queue them up, or to keep the additional information to pre-fill future questions from a conversational agent, etc. In the 1st example, two different operations are designed to be performed sequentially. In the 2nd example, two separate devices are indicated to turn off. The actions could be run in parallel with no intermediate input from the user. In the 3rd example, two pieces of information are provided. This could allow a conversational agent to skip later requests for this information because the user provided additional information here. In the 4th example, the conversational agent could respond to the 3rd intent first, saying "sure, I can help you", and then queue up the different dialogues for what do to when a wallet lost, when keys are lost, and when a credit card is lost. In between, the conversational agent could say "oh, and you said you lost your X. let's take care of that now".

Figure 3:
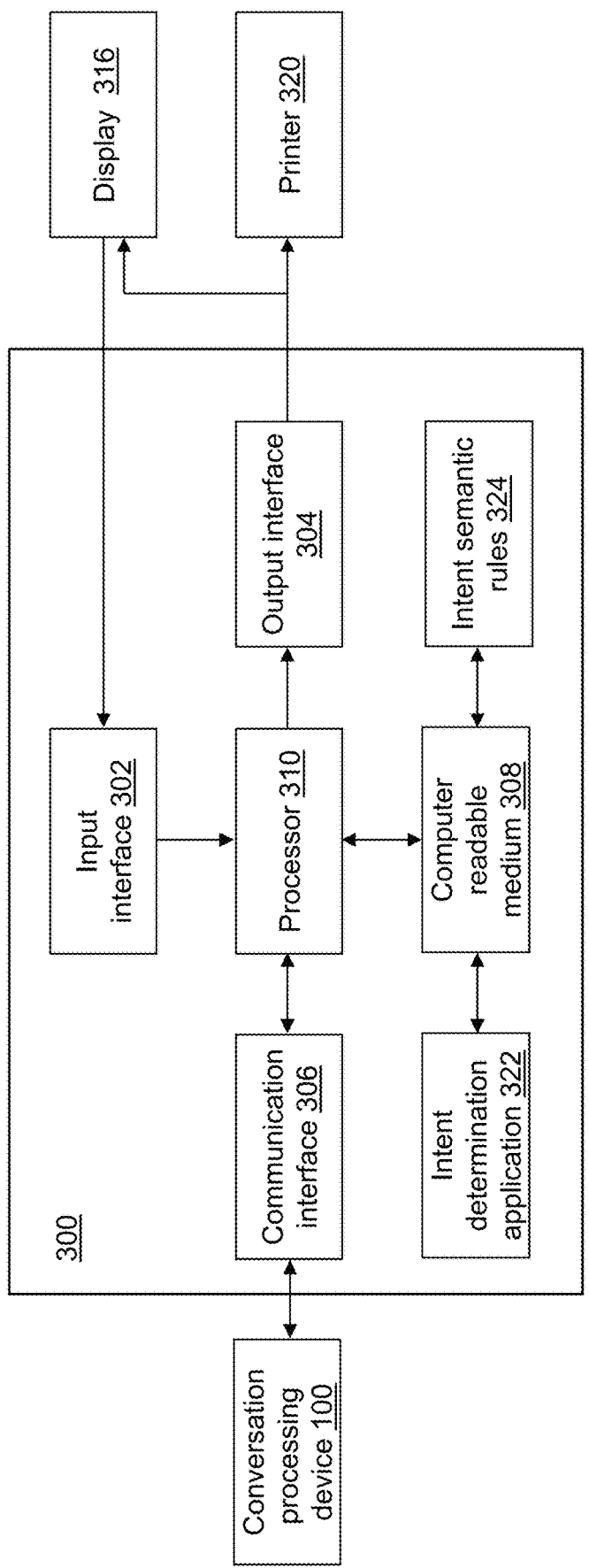
FIG. 3 depicts a block diagram of an intent determination device in accordance with an illustrative embodiment.

For example, referring to FIG. 3, intent determination device 300 determines the intent of the text. Referring to FIG. 3, a block diagram of intent determination device 300 is shown in accordance with an example embodiment. Intent determination device 300 may include a second input interface 302, a second output interface 304, a second communication interface 306, a second non-transitory computer-readable medium 308, a second processor 310, an intent determination application 322, and intent semantic rules 324. Fewer, different, and additional components may be incorporated into intent determination device 300.

Second input interface 302 provides the same or similar functionality as that described with reference to input interface 102 of conversation processing device 100 though referring to intent determination device 300. Second output interface 304 provides the same or similar functionality as that described with reference to output interface 104 of conversation processing device 100 though referring to intent determination device 300. Second communication interface 306 provides the same or similar functionality as that described with reference to communication interface 106 of conversation processing device 100 though referring to intent determination device 300. Data and messages may be transferred between intent determination device 300 and conversation processing device 100 using second communication interface 306. Second computer-readable medium 308 provides the same or similar functionality as that described with reference to computer-readable medium 108 of conversation processing device 100 though referring to intent determination device 300. Second processor 310 provides the same or similar functionality as that described with reference to processor 110 of conversation processing device 100 though referring to intent determination device 300.

Intent determination application 322 performs operations associated with determining the intent of the text. Modern task-based dialog systems are based on a domain ontology, a knowledge structure that represents the kinds of intentions the system can extract from user sentences. The ontology defines one or more frames, each a collection of slots, and defines the values (fillers) that each slot can take. The frame is a set of relations between objects, events, and concepts. For example, in the sentence: "John bought an apple from Sally", the frame could be named "selling an item". The frame could contain the following relations, events, and concepts:

The buyer (John)
The seller (Sally)
The product (an apple)
The buyer bought something (John bought an apple)
The seller sold something (Sally sold an apple)
The buyer bought from the seller (John bought from sally).

The role of frame-based NLU is to identify the intent and fill the slots associated with one or more of the intent's frames. Intent determination application 322 applies a new approach to determining intents using intent semantic rules 324. The operations may be implemented using hardware, firmware, software, or any combination of these methods. Referring to the example embodiment of FIG. 3, intent determination application 322 is implemented in software (comprised of computer-readable and/or computer-executable instructions) stored in second computer-readable medium 308 and accessible by second processor 310 for execution of the instructions that embody the operations of intent determination application 322. Intent determination application 322 may be written using one or more programming languages, assembly languages, scripting languages, etc. Intent determination application 322 may be implemented as a Web application.

Figure 4:
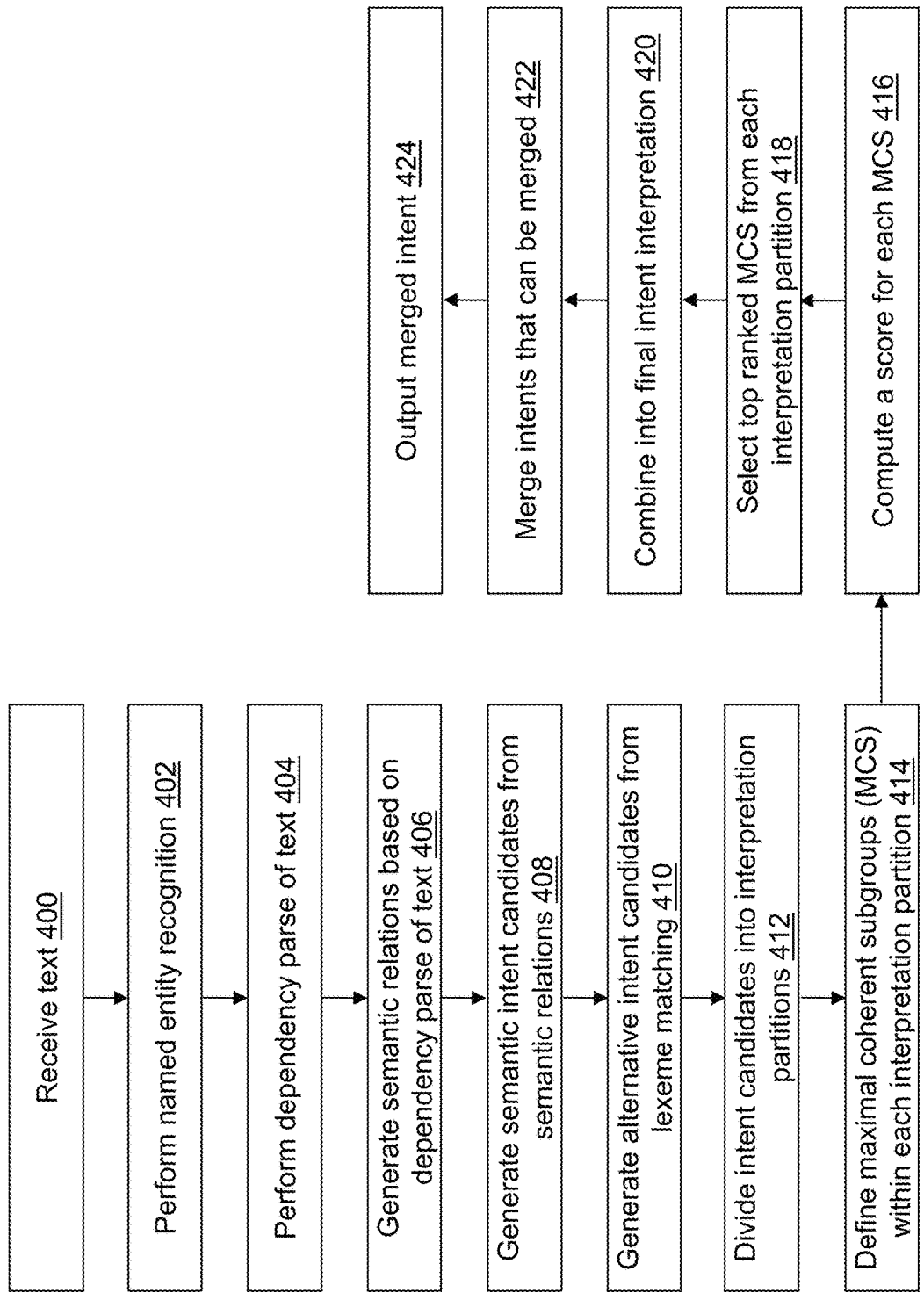
FIG. 4 depicts a flow diagram illustrating examples of operations performed by the intent determination device of FIG. 3 in accordance with an illustrative embodiment.

Referring to FIG. 4, example operations associated with intent determination application 322 are described. Additional, fewer, or different operations may be performed depending on the embodiment. The order of presentation of the operations of FIG. 4 is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads or a plurality of computing devices such as a grid or a cloud of computing devices.

In NLU, entities are classes of words, like person, location, or moving. An instance of an entity person could be a word like "John". Entities are contiguous spans of text. For a sentence such as "John walked to the store", an interpretation may contain any number of intents, where an instance of an intent can be thought of as a simple logical fact like walkedTo(John, store) though the definition is more generic such as walkedTo(X, Y) where X is matched to the entity type person, and Y is matched to the entity type location. An intent is not necessarily contiguous. X and Y above are parameters of the intent. An intent can have any number of parameters. "walkedTo" is the intent name. Parameters are assigned to specific entities.

In an operation 400, the text is received from conversation processing device 100. For example, the text may be received in a calling argument.

In an operation 402, named entity recognition is performed, for example, using regular expression (regex) matching, lemma matching, machine learning based sequence labeling, parsing (in the case of matching and interpreting dates and complex number representations), exact matching from a collection of words, etc.

Figure 23:
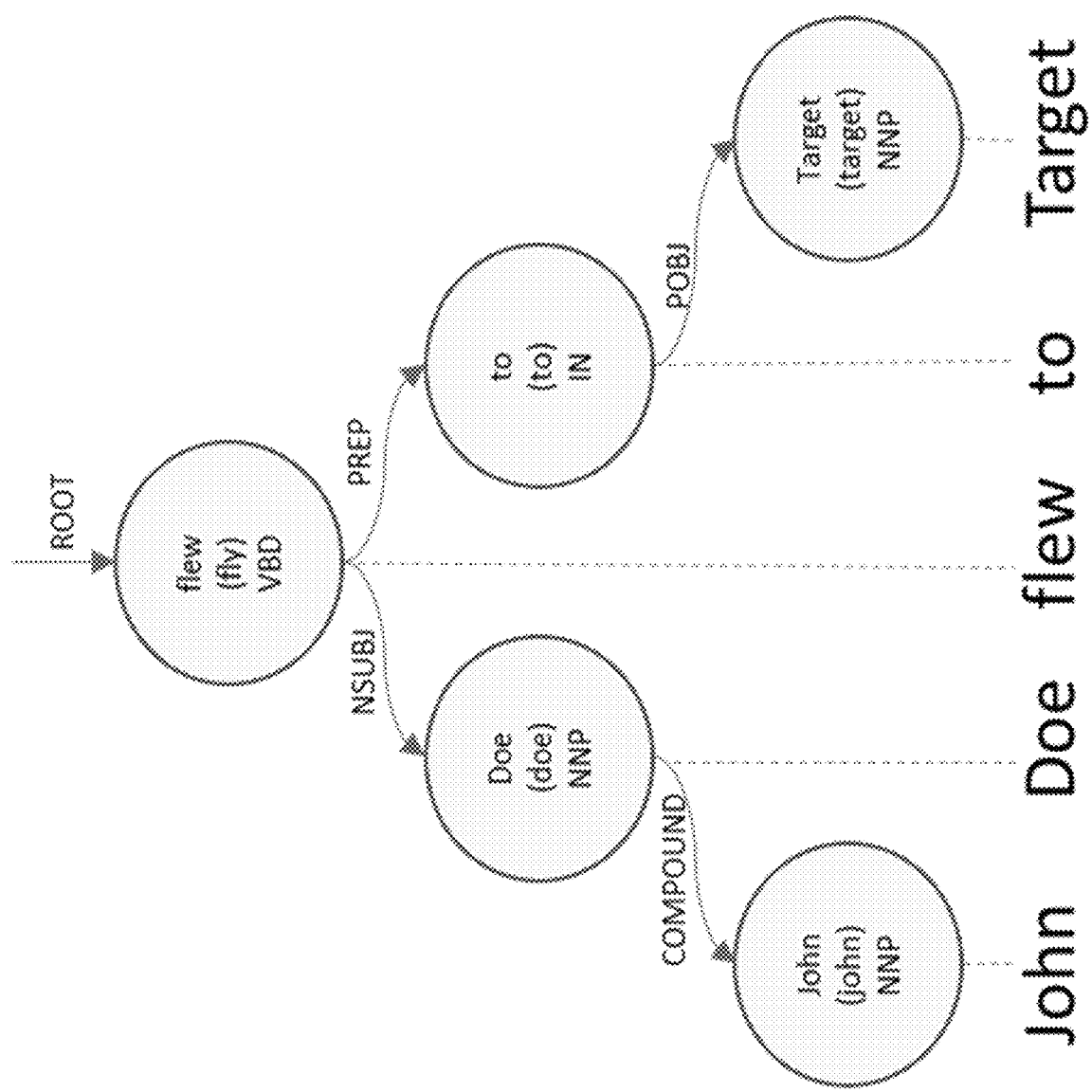
FIG. 23 graphically illustrates a dependency parse of a sentence in accordance with an illustrative embodiment.

In an operation 404, a dependency parse is performed on the received text. For illustration, Chapter 15 of Speech and Language Processing by Daniel Jurafsky & James H. Martin (2019) describes dependency parsing. Illustrative dependency parsers include NLP4J provided by Emory NLP of Atlanta Ga., USA, Stanford parser provided by Stanford NLP of Stanford Calif., USA, XSG parser provided by IBM of Yorktown Heights NY, USA, Parsey McParseFace provided by Google of Mountain View Calif., USA. For example, referring to FIG. 23, the sentence "John Doe flew to Target" may be parsed to determine the syntactic relationships as summarized in the following:

John Doe flew to Target {
  ROOT->flew(VBD)[fly]-2{9,13}
    NSUBJ->Doe(NNP)[doe]-1{5,8}
      COMPOUND->John(NNP)[john]-0{0,4}
    PREP->to(IN)[to]-3{14,16}
      POBJ->Target(NNP)[target]-4{17,23}
}

For illustration, in the line NSUBJ->Doe(NNP)[doe]-1{5, 8}, NSUBJ is a dependency label. Doe is a surface form of the word, where the surface form is the actual word from the text. NNP is a part-of-speech tag as defined by the Penn Treebank Project part-of-speech tags provided by the University of Pennsylvania. "doe" is the lemma form (or dictionary form) of the word. "1" is the word index, which is the order in which the word appears in the sentence. The word index may be zero based so the first word has word index "0". "9,13" are the character indexes for the first and last letters of the word.

Semantic relationships define the meaning of text. Syntactic relationships define the structure of the text. The dependency parse represents syntactic dependencies. Semantic relationships can be domain independent or domain dependent.

In an operation 406, semantic relationships are generated from the dependency parsed text using intent semantic rules 324 that may be generated using some or all of the operations described in FIGS. 14, 15, 17, 19A, 19B, 24A, 24B, and 25. The semantic relationships result in a set of matches, where each match is a map of identifiers to nodes. Some of these are slot identifiers and some of these are filler identifiers. Postprocessing ensures that there is only one identifier per node. Each map, when associated with an intent name, is a semantic relationship. Semantic intent rules 324 define subgraph matching constraints, specifying node properties, edge labels, etc., with labels specifying roles for each node, composed with logical operators like "and", "or", "not", etc. A parallelized depth-first unification search algorithm may be used to apply semantic intent rules 324 to the dependency parsed text to derive the mapping of identifiers to nodes.

In an operation 408, semantic intent candidates are generated from the generated semantic relationships. Each generated semantic relation has its slots associated with appropriate lexeme matches. If a slot does not have an appropriate lexeme present, a candidate is not produced. Any labeled nodes that are not slot labeled get added to a set of additional nodes claimed by the semantic candidate. The product from each semantic relation, the combination of lexeme matches, and node claims is a semantic candidate. Each of the semantic relations extracted using semantic intent rules 324 have an intent label, as well as slot labels. From the intent utterance examples, it is known that certain slots are supposed to be filled by certain lexemes that is enforced to filter out relations that fail to have a slot filled appropriately.

Figure 5:
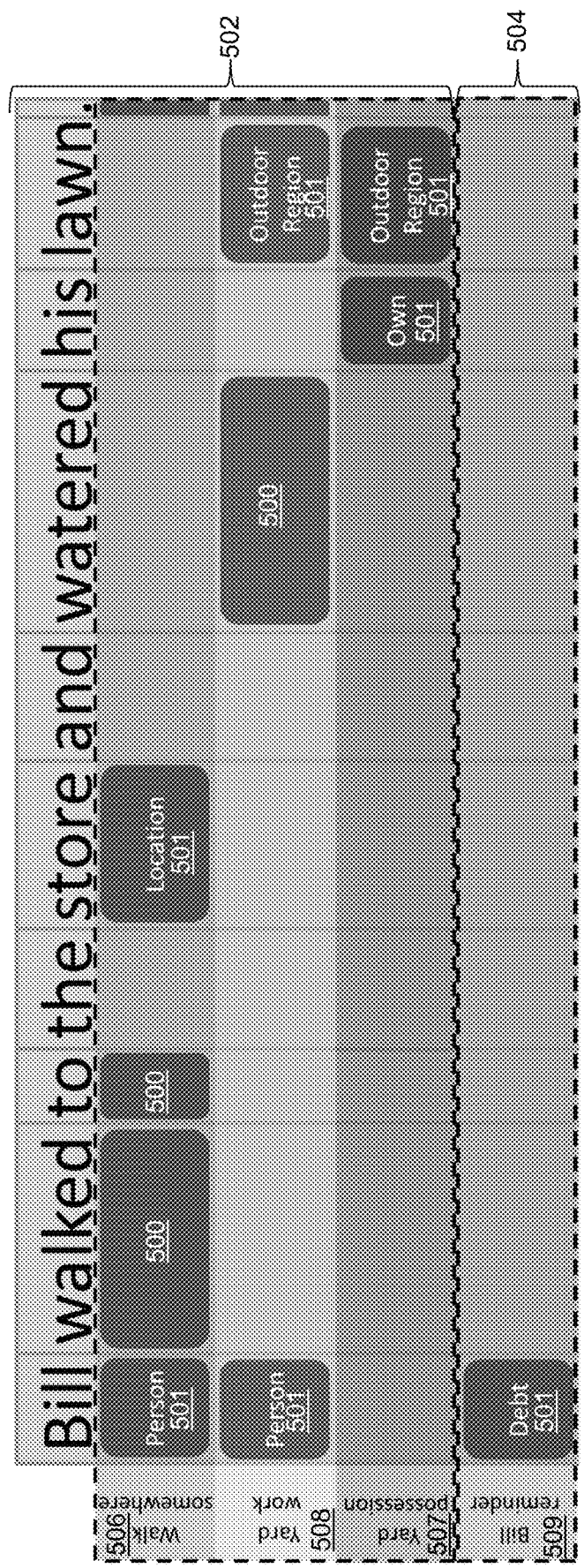
FIGS. 5 to 9 depict semantic candidates for various text sentences for which a set of intents is to be determined that make up an interpretation in accordance with an illustrative embodiment.
Figure 6:
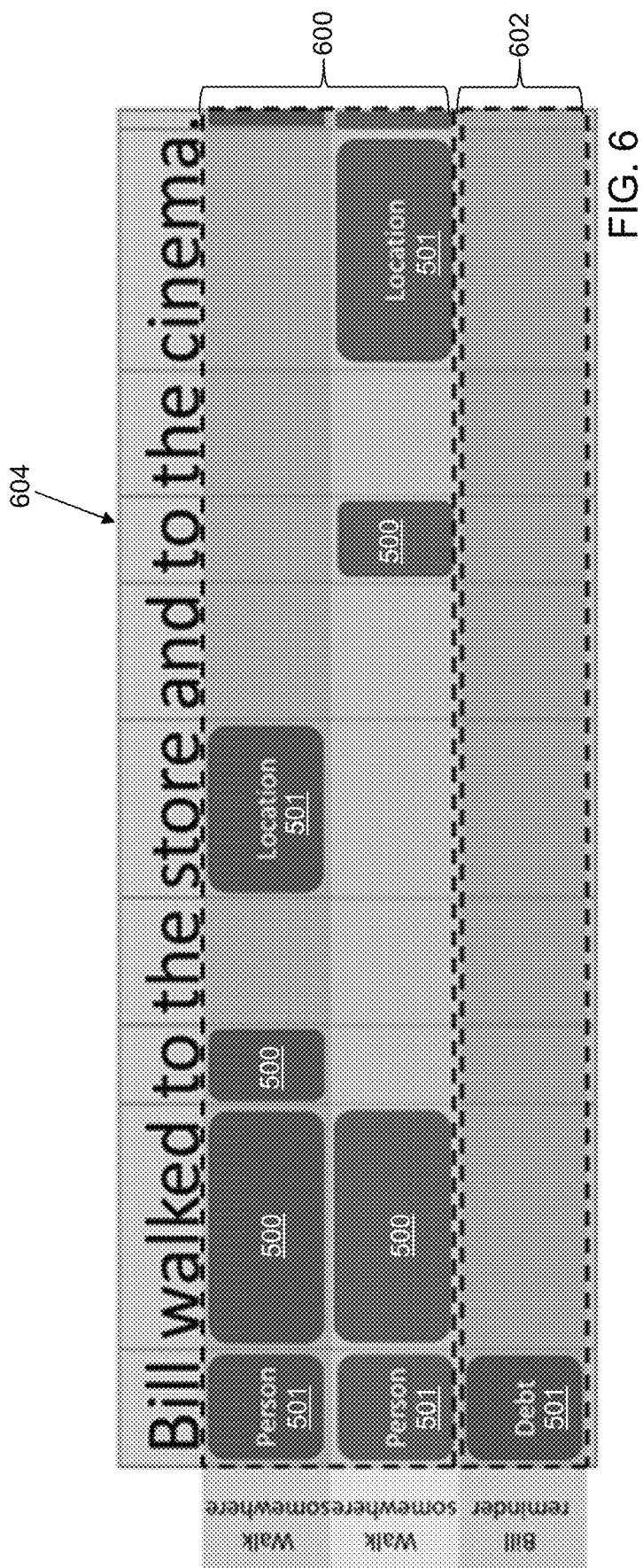

For illustration, referring to FIGS. 5 and 6, boxes 500 are examples of labeled nodes that are not slot labeled and that are added to a set of additional nodes claimed by the semantic candidate; whereas, boxes 501 are labeled nodes.

FIGS. 5 and 6 show intent and term hits for the sentence "Bill walked to the store and watered his lawn."

Referring again to FIG. 4, in an operation 410, alternative candidates are generated from by lexeme matching as an extensible position for generation of fallback candidates, for example, using order-based sequence labeling.

In an operation 412, the generated semantic candidates and alternative candidates are divided into separately solvable partitions called interpretation partitions. Each generated semantic candidate and alternative candidate is an intent hit that has an intent name, slot and lexeme labeled domain terms, and a list of spans semantically involved in the intent hit. The generated semantic candidates and alternative candidates are divided into partitions of overlapping parse nodes that define an interpretation partition. Each interpretation partition defines a split of the distinct non-subsumable intent hits into groups with overlapping semantic content as opposed to just domain terms. Interpretation partitions enable the problem to be separable so that each interpretation partition can be solved separately.

For illustration, interpretation partitions can be defined using the following algorithm:

Let S be the set of all distinct candidates. Let MS be a mapping from a candidate to all candidates it is incompatible with; more specifically, it is derived as follows:

For every s in S, consider every other k in S:
1. If there exists some term t1 in s and some term t2 in k, such that t1 and t2 are overlapping and at least one of the following is true:
   a. t1 and t2 have different spans, or
   b. t1 and t2 have incompatible labels, meaning they are not the same and one is not a type ancestor of the other in a type hierarchy
2. record that s is incompatible with k and vice versa.

Let MC be a mapping from domain term to candidates that use that domain term. Derive C, the set of all interpretation partitions:

1. Let C be the set of interpretation partitions, initially empty.
2. Let queue Q be initially filled with every element of S.
3. While Q is not empty:
  a. Let P be an interpretation partition, initially empty.
  b. Let V be a queue, initially empty.
  c. Pop off the first element of Q and add it to V
  d. While V is not empty:
    i. Pop off the first element of V and call it n.
    ii. If P does not contain n,
      1. Add n to P.
      2. For every domain term/lexeme/entity d in n, lookup n in MC and add every candidate indexed by d to V.
      3. Lookup n in MS and add every candidate indexed by n to V.
  e. Remove all elements of P from Q.
  f. Add P to C.

Figure 7:
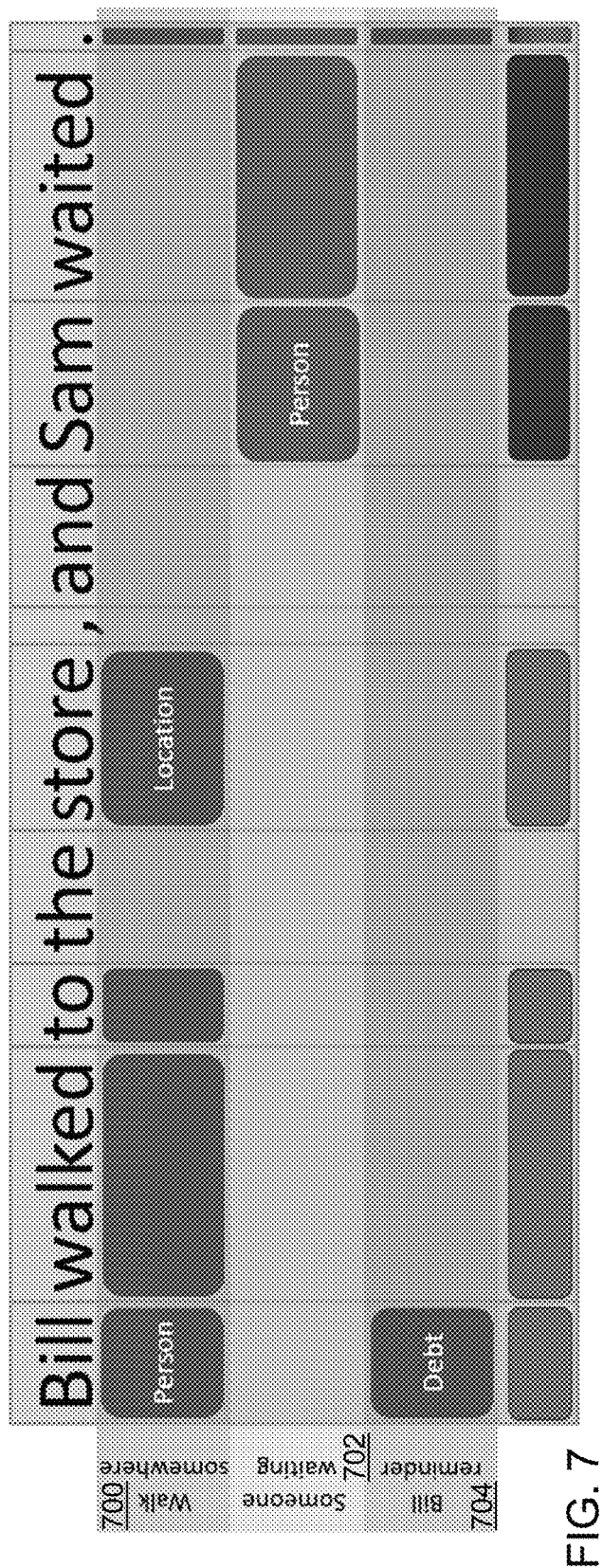

For illustration, referring to FIG. 7, a first intent match 700 identified as "Walk somewhere", a second intent match 702 identified as "Someone waiting", and a third intent match 704 identified as "Bill reminder" are example matching intents created from the sentence "Bill walked to the store, and Sam waited." There is disagreement about the meaning of the span "Bill" so an interpretation partition is created from all intents that cover "Bill". In this way, first intent match 700 identified as "Walk somewhere" and third intent match 704 identified as "Bill reminder" are included in a first interpretation partition, but second intent match 702 identified as "Someone waiting" is included in a second interpretation partition that is different from the first interpretation partition. The first interpretation partition may include first intent match 700 and third intent match 704 due to the overlapping conflicting entities "person" and "debt" for Bill.

Figure 9:
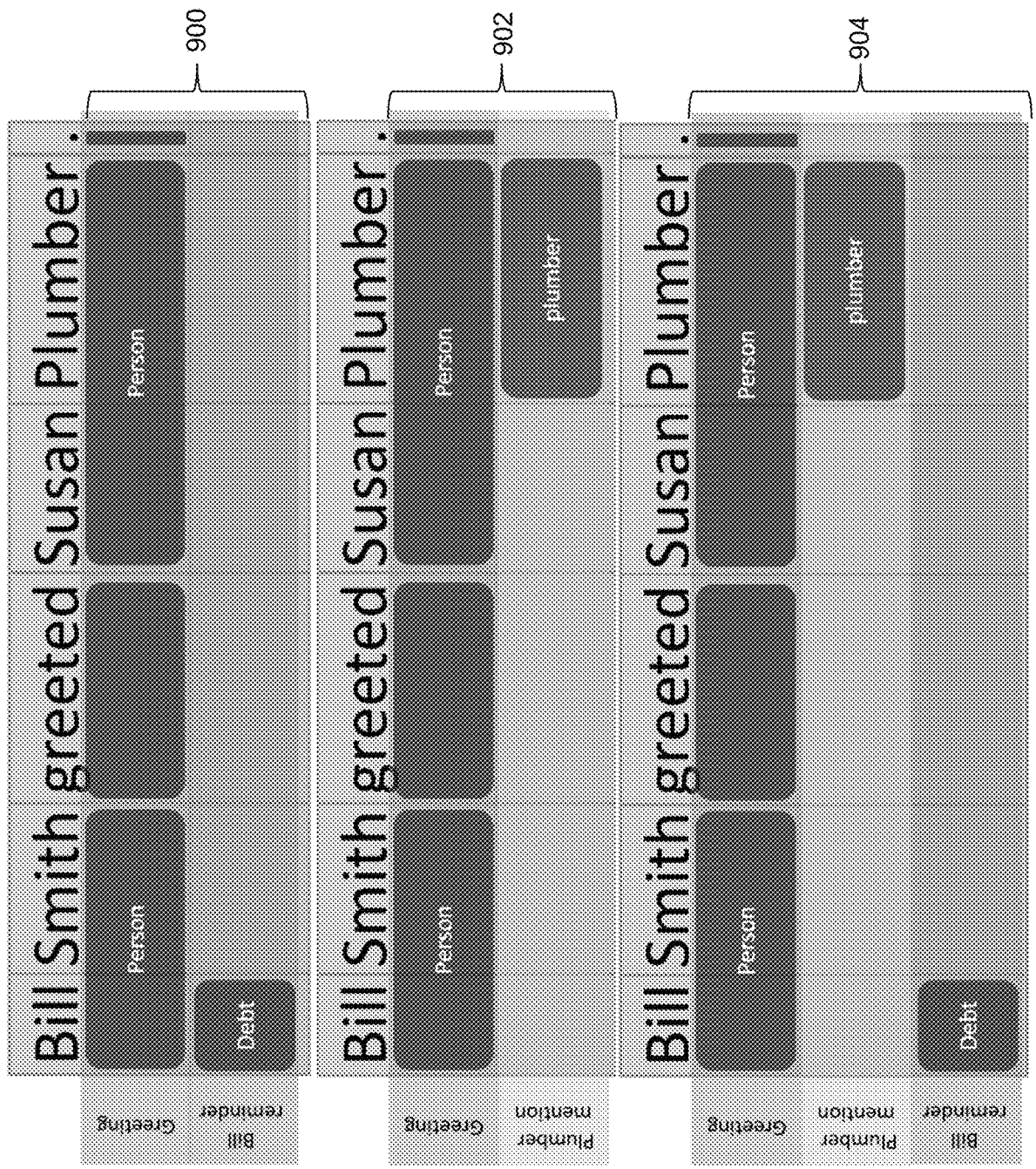

If an intent appears in more than one interpretation partition, sharing a disputed word with other members, those interpretation partitions are combined. For illustration, referring to FIG. 9, a third interpretation partition 900 includes the same intent hit "Greeting" as a fourth interpretation partition 902. As a result, third interpretation partition 900 and fourth interpretation partition 902 are replaced by a fifth interpretation partition 904.

Referring again to FIG. 4, in an operation 414, within each interpretation partition, maximal coherent groups are defined from the interpretation partitions' candidate intents to form a list of maximal coherent groups of candidates for each interpretation partition. Maximal because there are no more candidates from the interpretation partition to add while maintaining coherence. A coherent set of intents is a set of intents that are not in disagreement concerning the entity assignments of shared spans. Coherence results when none of the candidates in the group disagree on the lexical type of a node they contain.

For convenience, a phrase A supersedes B to mean that A is a set that contains every element of set B. A compatible group (CG) is a set S, such that every element of S is compatible with every other element in S. A maximal compatible subgroup (MaxCS) (maximal coherent subgroups indicates that the compatibility requirement is coherence) is a compatible subgroup S of set T, such that no other elements of T are compatible with every element of S—in other words, nothing else from T can be added to S without making S no longer a CG. This also means that a MaxCS of T is a CG that cannot be superseded by any other CG of T.

Two data structures encapsulate the data and some functionality: 1) A singly-linked list (SLL) and 2) a maximal record (MR). The SLL knows only the previous SLL node from each SLL node allowing for efficiently recording tree structures, traversable from the leaves. Whenever a node is added to an SLL, a new node holding an element and a reference to the previous node is created. The MR holds a dynamic set of intermediate CGs (SCG), and enforces that no element of the MR supersedes any other element of the MR. At the conclusion, the MR contains only all possible MaxCSs of the set T. When a new CG is offered to the MR, if any element of the SCG supersedes the offered CG, the CG is not recorded and the remaining operations are skipped. All elements of the SCG are collected that are superseded by the offered CG and removed from the SCG, and the offered CG is added to the SCG.

For illustration, a recursive function R with the parameters of an SLL called CURRENT, a set of elements of set T called REMAINING, a map from each element of T to every element of T it is incompatible with called INCOMPATIBILITIES, and a MR called RESULT is defined to identify MCS within each interpretation partition. R is initially called with the arguments of an empty SLL, the set T, the incompatibilities map for set T, and an empty MR. Pseudo-code for the recursive function R is provided below:

1. If REMAINING is empty, offer CURRENT to RESULT and return.
2. Find all elements of REMAINING that are not incompatible with any other element of REMAINING, and call this set SF.
3. Find the element of REMAINING that is incompatible with the highest number of other elements in REMAINING. Call that element SPLITTER. Call the set of elements compatible with SPLITTER COMPATIBLE.
4. Add every element of SF to CURRENT, and remove every element of SF from REMAINING and COMPATIBLE.
5. If REMAINING is empty, offer CURRENT to RESULT and return.
6. Remove SPLITTER from COMPATIBLE and REMAINING.
7. If a size of the set COMPATIBLE is less than a size of the set REMAINING, call R with the arguments: CURRENT, a new copy of REMAINING, INCOMPATIBILITIES, and RESULT.
8. Call R with the arguments: a new SLL that is SPLITTER added to CURRENT, COMPATIBLE, INCOMPATIBILITIES, and RESULT.
9. After root call of R is complete, RESULT holds only all the MaxCSs of set T.

For illustration, referring again to FIG. 5, four intents are shown with a first MaxCS 502 and a second MaxCS 504. For the purpose of MaxCS as defined above, a "Walk somewhere" intent hit 506, a "Yard work" intent hit 508, and a "Yard possession" intent hit 507 are compatible with each other because, for each set of overlapping spans, the elements of those sets have compatible labels with each other. "Yard possession" intent hit 507 and a "Bill reminder" intent hit 509 are compatible because they do not contain any overlapping node types meaning another MaxCS could be formed to include them. "Walk somewhere" intent hit 506 and "Yard work" intent hit 508 are not coherent with "Bill reminder" intent hit 509 because they disagree on the meaning of the span "Bill". "Walk somewhere" intent hit 506 and "Yard work" intent hit 508 assert that Bill is a "Person", while "Bill reminder" intent hit 509 asserts that Bill is "Debt". As a result, "Walk somewhere" intent hit 506 and "Yard work" intent hit 508 cannot be joined in the same MaxCS with "Bill reminder" intent hit 509.

As another illustration, referring again to FIG. 6, a third MaxCS 600 and a fourth MaxCS 602 are example MaxCS's for a sixth interpretation partition 604 created from the sentence "Bill walked to the store and to the cinema." The intent hits "Walk somewhere" are compatible with each other; whereas, the intent hit "Bill reminder" is not compatible with either "Walk somewhere" intent hit.

Figure 8:
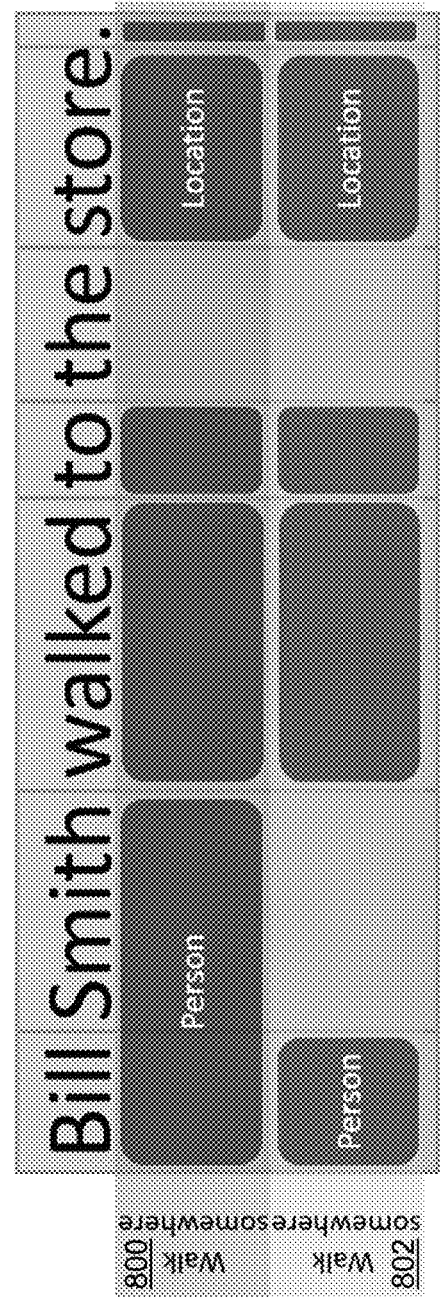

Referring to FIG. 8, a first "Walk somewhere" intent hit 800 disagrees on the span of "Person" with a second "Walk somewhere" intent hit 802 meaning these two intents are not a coherent set and so cannot be joined in the same maximal coherent group. However, a first intent hit is filtered if there exists a second intent hit such that every intent in the first intent hit is present in the second intent hit, or the first intent hit can be consumed by an intent in the second intent hit. The second intent hit consumes the first intent hit if they have the same intent names and for every parameter span in the first intent hit, the same parameter span or a superspan exists in the second intent hit. For example, first "Walk somewhere" intent hit 800 consumes second "Walk somewhere" intent hit 802 because the spans for "Location" are the same, and the "Person" span of first "Walk somewhere" intent hit 800 is a super span of the "Person" span of second "Walk somewhere" intent hit 802.

Referring again to FIG. 4, in an operation 416, a score value is computed for each formed MCS of each interpretation partition. Each MCS is scored optionally based on a number of factors including term match scores, a parsimony score biasing against many small intent hits versus fewer large intent hits, intent score, a total group textual coverage score of the sentence, etc. The set of additional nodes claimed by the semantic candidate identify the nodes that are part of the candidate interpretation. In general, the more of a sentence's content an interpretation group covers, the higher the score because the greater amount of text covered heuristically indicates a greater alignment with the sentence's meaning. Parsimony is the principle that simpler answers are better, so in accordance with that, while greater textual coverage is rewarded, a MaxCS's score may be penalized based on a number of intents in the maximal coherent group. This essentially means that if two intent sets have the same coverage, but one provides that textual coverage with fewer intents, the computed score is biased towards the intent set with fewer intents.

Aggregating the parsimony score, textual coverage score, and other features into a scoring function can be done multiple ways, heuristically or via machine learning or other statistical methods. For illustration, let S be the maximal coherent group to be scored, let T be the set of all terms covered in the maximal coherent group, and let set P be the subset of T that are present and playing the same role in the training data for the relevant intents, either by being a required entity or by being a lemma of a non-entity in the training data. The score can be computed as intentSetScore=parsimonyScore·termScore where parsimonyScore=$|S|^{-0.1}$ and termScore=$\Sigma_{t \in T}$(len(t)·matchScore(t)·W), where |S| indicates a size of set S. For each term in T, compute a value of the term's length len(t) multiplied by its match score matchScore(t) multiplied by a weight value W defined by $$W = \begin{cases} 1 & \text{if } t \in P \\ 0.4 & \text{otherwise} \end{cases}.$$

The weight value W is a reward based on whether the term was present in the training data $t \in P$ or not. The termScore is a summation of the computed value for each term in T.

The matchScore(t) of a term t is the score that the named entity recognizer or domain term matcher algorithm determined that identified the entity. The matchScore(t) of a term t may be computed in various ways depending on the matcher. For example, a word embeddings based matcher may take a cosine similarity of the original word in training data to the term t. Another matcher might use edit distance. Another matcher might use the output of a neural network. The only assumption is that these values range from 0 (meaning not a good match) to 1.0 (meaning a good match).

The set P is determined by finding the subset of T that is represented in the training data for the intent, either by being the entity/lexeme/domain term required by the training data or by being a lemma of a non-entity in the training data. Any other element of T is not included in P.

In an operation 418, a top ranked group is selected from the MCSs included in each interpretation partition based on the computed score value. For example, a highest or a lowest score value may be identified and the MCS associated with the highest or the lowest score value may be selected as the top ranked group for a respective interpretation partition.

In an operation 420, the selected top ranked group and its set of intents from each interpretation partition are combined and added to define a final intent interpretation. In other words, one MaxCS is chosen from each interpretation partition to together form the final interpretation. For example, after starting with predicted intents shown referring to FIG. 5, the final intent interpretation may include "Walk somewhere" intent hit 506 and "Yard work" intent hit 508 as the highest ranked MCS for each interpretation partition defined from the predicted intents.

In an operation 422, any of the intents included in the final intent interpretation are merged if possible. NLG may apply the final intent interpretation to the training sentences to generate a natural language representation of the intent hit though other processing may be performed in alternative embodiments.

In an operation 424, the merged intents are output as the intent of the text, and processing continues in operation 206 of FIG. 2.

Intent determination application 322 integrates multiple intents into a multiple intent interpretation given a set of intent hits that were labeled true. The intent hits are partitioned into lexically independent groups from which maximal coherent subgroups of hits within each interpretation partition are formed. Each subgroup is ranked based on a score computed based on sentence coverage, parsimony, intent scores, etc. The top subgroup in each interpretation partition is aggregated into a multiple intent interpretation.

Though shown as a distinct device, in the illustrative embodiment, intent determination device 300 and conversation processing device 100 may be the same device. Additionally, intent determination application 322 may be embedded in conversation processing application 122 or may be called by or otherwise integrated with conversation processing application 122, for example, using an application programming interface.

Referring again to FIG. 2, in an operation 206, an action is determined based on the determined intent, for example, as described in Dan Jurafsky and James H. Martin, Speech and language processing: an introduction to natural language processing, computational linguistics, and speech recognition, Pearson Prentice Hall, Upper Saddle River, N.J., Second edition, Ch. 9, 285-334 (2009); by Allen, J., Natural language understanding, Redwood City, Calif.: The Benjamin Cummings (1995); or by McTear, M. F., Spoken dialogue technology, Toward the conversational user interface, Springer (2004). A dialogue management engine may be embedded in conversation processing application 122 or may be called by or otherwise integrated with conversation processing application 122.

In an operation 208, a response is generated based on the determined action, for example, as described by Baptist, L., and Seneff, S., GENESIS-II: A versatile system for language generation in conversational system applications, Proceedings of the 6th International Conference on Spoken Language Processing (ICSLP '00), 3, 271-274 (2000). An NLG engine may be embedded in conversation processing application 122 or may be called by or otherwise integrated with conversation processing application 122.

In an operation 210, the generated response is converted to voice using a text to speech synthesizer, for example, as described in Dan Jurafsky and James H. Martin, *Speech and language processing: an introduction to natural language processing, computational linguistics, and speech recognition*, Pearson Prentice Hall, Upper Saddle River, N.J., Second edition, Ch. 8, 249-284 (2009).

In an operation 212, the synthesized voice is sent or returned to conversation device 1100. As an example, the synthesized voice may be sent by conversation processing application 122 through communication interface 106 and third communication interface 1106 of conversation device 1100 for presentation by a second speaker 1118 (shown referring to FIG. 11). In an alternative embodiment, the generated response in text may be sent by conversation processing application 122 through communication interface 106 and third communication interface 1106 of conversation device 1100 for presentation using third display 1116 instead of voice using second speaker 1118, and no conversion is performed.

In an operation 214, a determination is made concerning whether another conversation element is received. When another conversation element is received, processing continues in operation 200 to process the conversation element. When another conversation element is not received, processing continues in an operation 216. For example, conversation processing application 122 may use a timer to wait for receipt of another conversation element. If no conversation element is received before the timer expires, conversation processing application 122 may automatically determine that another conversation element is not received. As another option, execution of conversation processing application 122 may be stopped under control of a user.

In an operation 216, conversation processing is done.

Figure 10:
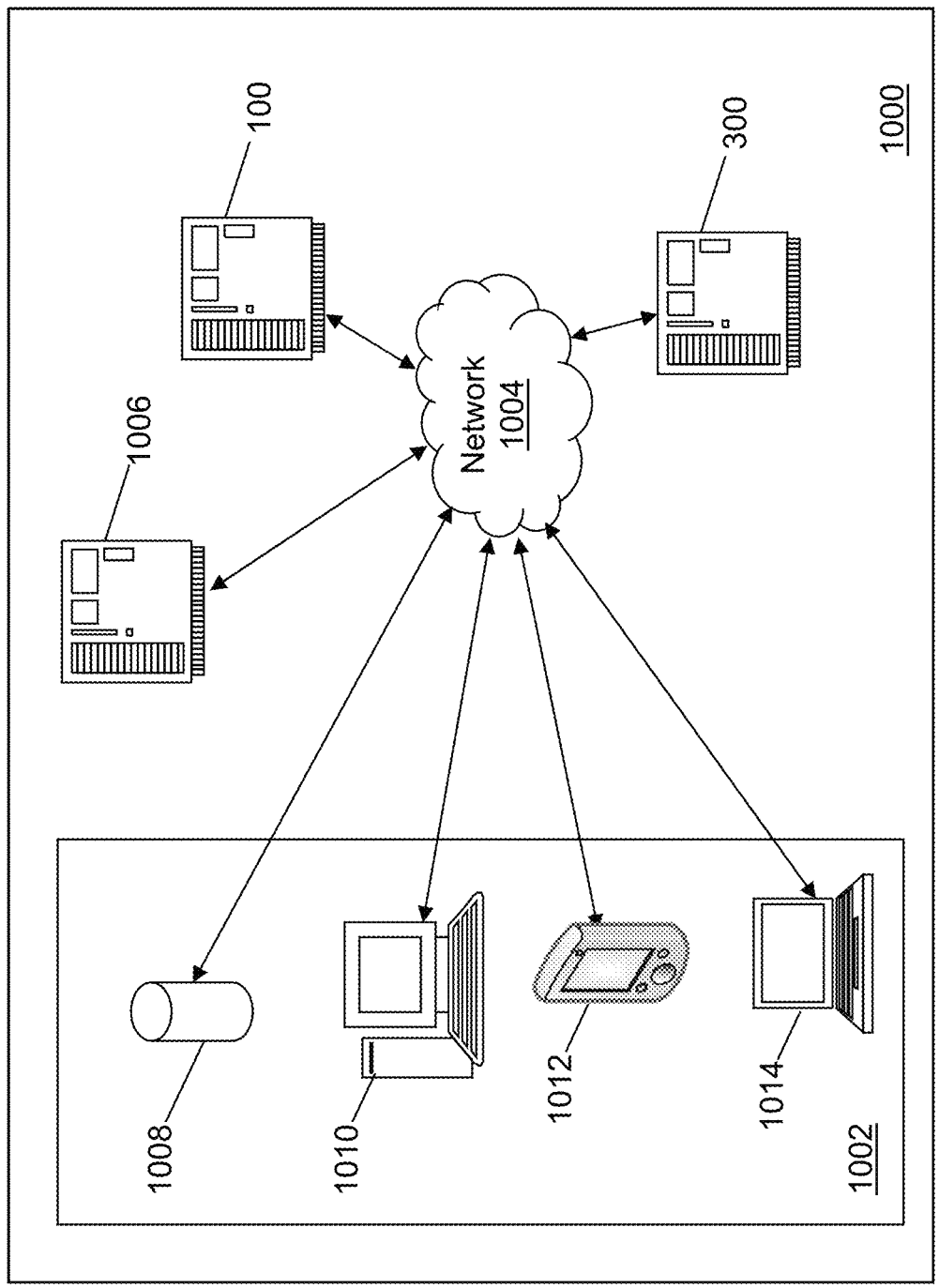
FIG. 10 depicts a block diagram of a conversation processing system in accordance with an illustrative embodiment.

Referring to FIG. 10, a block diagram of a conversation processing system 1000 is shown in accordance with an illustrative embodiment. In an illustrative embodiment, conversation processing system 1000 may include a user system 1002, conversation processing device 100, intent determination device 300, a semantic rules development device 1006, and a network 1004. Each of user system 1002, conversation processing device 100, intent determination device 300, and semantic rules development device 1006 may be composed of one or more discrete devices in communication through network 1004. User system 1002, conversation processing device 100, and/or intent determination device 300 further may be integrated on the same computing device or different computing devices. Semantic rules development device 1006 further may be used as part of a pre-processing system to define intent semantic rules 324.

Network 1004 may include one or more networks of the same or different types. Network 1004 can be any type of wired and/or wireless public or private network including a cellular network, a local area network, a wide area network such as the Internet or the World Wide Web, etc. Network 1004 further may comprise sub-networks and consist of any number of communication devices.

The one or more computing devices of user system 1002 may include computing devices of any form factor such as a voice interaction device 1008, a desktop 1010, a smart phone 1012, a laptop 1014, a personal digital assistant, an integrated messaging device, a tablet computer, a point of sale system, a transaction system, etc. User system 1002 can include any number and any combination of form factors of computing devices that may be organized into subnets. The computing devices of user system 1002 send and receive signals through network 1004 to/from another of the one or more computing devices of user system 1002 and/or to/from conversation processing device 100. The one or more computing devices of user system 1002 may communicate using various transmission media that may be wired and/or wireless as understood by those skilled in the art. The one or more computing devices of user system 1002 may be geographically dispersed from each other and/or co-located. Each computing device of the one or more computing devices of user system 1002 may be executing conversation application 1122 of the same or different type.

Conversation processing device 100 can include any form factor of computing device. For illustration, FIG. 10 represents conversation processing device 100 as a server computer. In general, a server computer may include faster processors, additional processors, more disk memory, and/or more RAM than a client computer and support multi-threading as understood by a person of skill in the art. Conversation processing device 100 sends and receives signals through network 1004 to/from user system 1002 and/or to/from intent determination device 300. Conversation processing device 100 may communicate using various transmission media that may be wired and/or wireless as understood by those skilled in the art. Conversation processing device 100 may include a plurality of computing devices of the same or different type that may support failover processing.

Intent determination device 300 can include any form factor of computing device. For illustration, FIG. 10 represents intent determination device 300 as a server computer. Intent determination device 300 sends and receives signals through network 1004 to/from user system 1002 and/or to/from conversation processing device 100. Intent determination device 300 may communicate using various transmission media that may be wired and/or wireless as understood by those skilled in the art. Intent determination device 300 may include a plurality of computing devices of the same or different type that may support failover processing.

Figure 11:
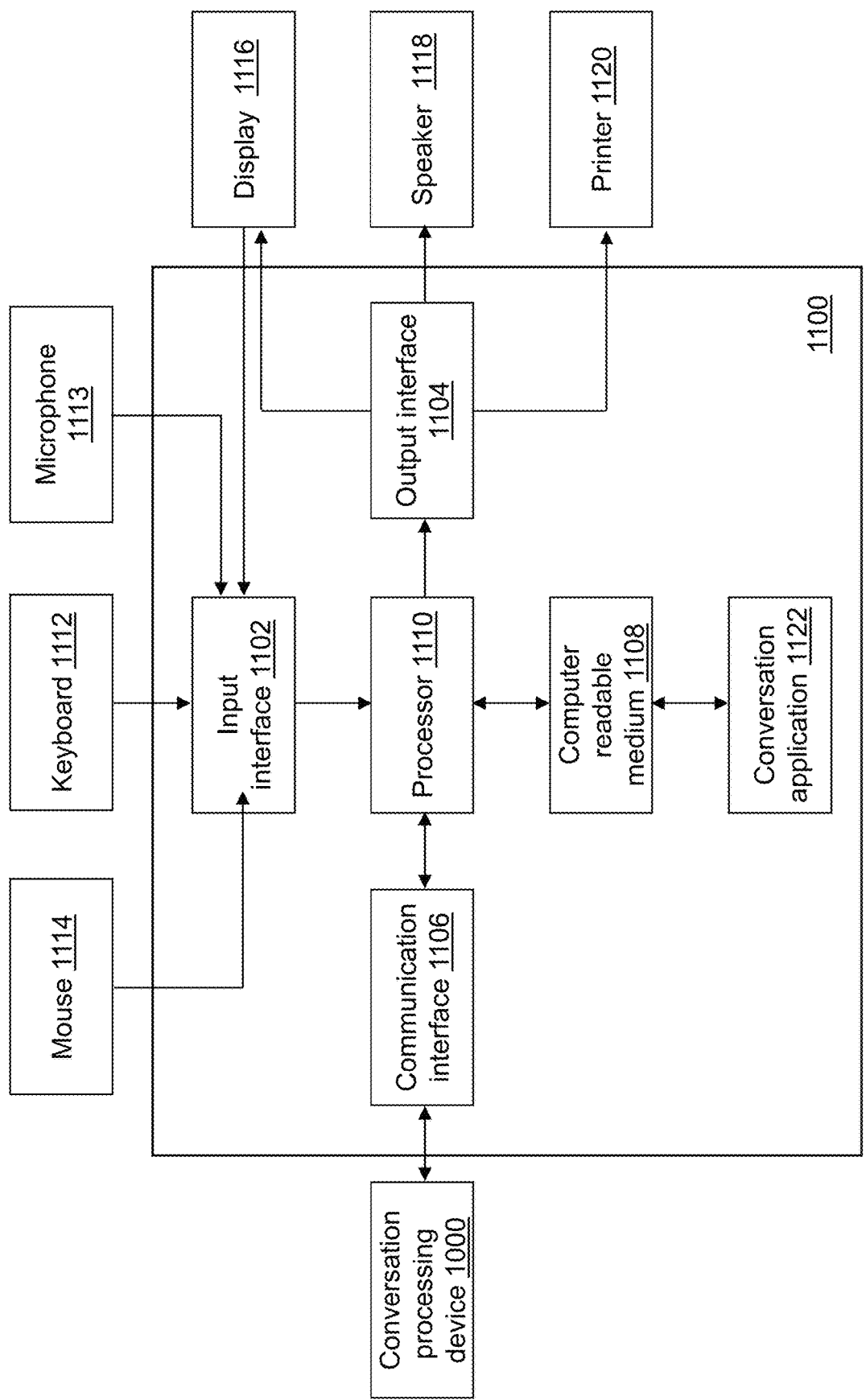
FIG. 11 depicts a block diagram of a conversation device of the conversation processing system of FIG. 10 in accordance with an illustrative embodiment.

Referring to FIG. 11, a block diagram of conversation device 1100 of user system 1002 is shown in accordance with an example embodiment. Conversation device 1100 is an example computing device of user system 1002. For example, each of voice interaction device 1008, desktop 1010, smart phone 1012, and laptop 1014 may be an instance of conversation device 1100. Conversation device 1100 may include third input interface 1102, a third output interface 1104, third communication interface 1106, a third non-transitory computer-readable medium 1108, a third processor 1110, and conversation application 1122. Each conversation device 1100 of user system 1002 may include the same or different components and combinations of components. Fewer, different, and additional components may be incorporated into conversation device 1100.

Third input interface 1102 provides the same or similar functionality as that described with reference to input interface 102 of conversation processing device 100 though referring to conversation device 1100. Third output interface 1104 provides the same or similar functionality as that described with reference to output interface 104 of conversation processing device 100 though referring to conversation device 1100. Third communication interface 1106 provides the same or similar functionality as that described with reference to communication interface 106 of conversation processing device 100 though referring to conversation device 1100. Data and messages may be transferred between conversation device 1100 and conversation processing device 100 using third communication interface 1106. Third computer-readable medium 1108 provides the same or similar functionality as that described with reference to computer-readable medium 108 of conversation processing device 100 though referring to conversation device 1100. Third processor 1110 provides the same or similar functionality as that described with reference to processor 110 of conversation processing device 100 though referring to conversation device 1100.

Conversation application 1122 performs operations associated with receiving a conversation element such as a question, comment, statement, command, etc., for example, from a user, and requesting a response to the conversation element. The conversation element may not be in the form of a question and may be comprised of keywords and/or natural language. The operations may be implemented using hardware, firmware, software, or any combination of these methods. Referring to the example embodiment of FIG. 11, conversation application 1122 is implemented in software (comprised of computer-readable and/or computer-executable instructions) stored in third computer-readable medium 1108 and accessible by third processor 1110 for execution of the instructions that embody the operations of conversation application 1122. Conversation application 1122 may be written using one or more programming languages, assembly languages, scripting languages, etc. Conversation application 1122 may be implemented as a Web application. Conversation application 1122 may be or may be integrated with an existing browser application such as Internet Explorer, Microsoft Edge, Google Chrome, Mozilla Firefox, etc.

Figure 12:
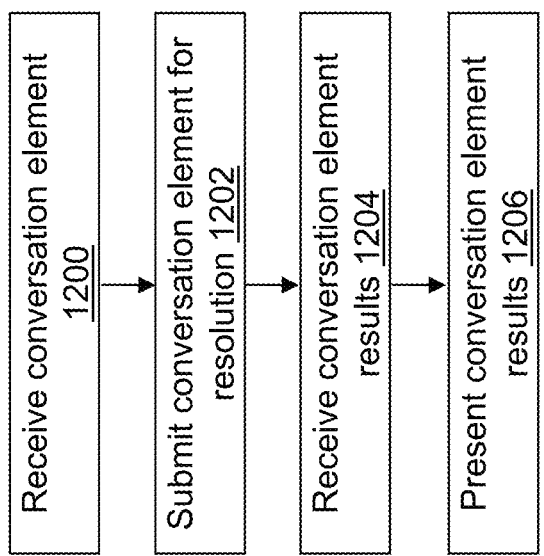
FIG. 12 depicts a flow diagram illustrating examples of operations performed by the conversation device of FIG. 11 in accordance with an illustrative embodiment.

Referring to FIG. 12, example operations associated with conversation application 1122 are described. Additional, fewer, or different operations may be performed depending on the embodiment. The order of presentation of the operations of FIG. 12 is not intended to be limiting. A user can interact with one or more user interface windows presented to the user in third display 1116 under control of conversation application 1122 using second keyboard 1112, second microphone 1113, second mouse 1114, second speaker 1118, etc. independently or through a browser application in an order selectable by the user, and/or the user can interact with control of conversation application 1122 using second microphone 1113 and second speaker 1118 independently or through a browser application in an order selectable by the user. Although some of the operational flows are presented in sequence, the various operations may be performed in various repetitions, concurrently, and/or in other orders than those that are illustrated. For example, a user may execute conversation application 1122, which causes presentation of a first user interface window, which may include a plurality of menus and selectors such as drop-down menus, buttons, text boxes, hyperlinks, etc. associated with conversation application 1122 as understood by a person of skill in the art. As another example, a user may trigger execution of conversation application 1122 by stating a command word associated with conversation application 1122 as understood by a person of skill in the art. Unless off, conversation application 1122 may be continually monitoring sounds received through second speaker 1118. As further understood by a person of skill in the art, various operations may be performed in parallel, for example, using a plurality of threads or a plurality of computing devices such as a grid or a cloud of computing devices.

In an operation 1200, a conversation element is received. For example, the conversation element may be received after entry by a user into a text box or other user interface window presented under control of conversation application 1122 using second keyboard 1112, second mouse 1114, second microphone 1113, etc., after the user speaks to conversation application 1122 using second microphone 1113, etc.

In an operation 1202, the received conversation element is submitted for resolution. For example, the received conversation element is sent to conversation processing device 100 in a request.

In an operation 1204, one or more conversation element results may be received from conversation processing device 100 in a response. The conversation element result may include voice or text. In some cases, the conversation element result may indicate that no response was identified.

In an operation 1206, the received one or more conversation element results are presented to the user. For example, the text may be presented using third display 1116 or a third printer 1120, voice content may be presented using third display 1116 or third printer 1120 after conversion to text or using second speaker 1118, etc.

Figure 13:
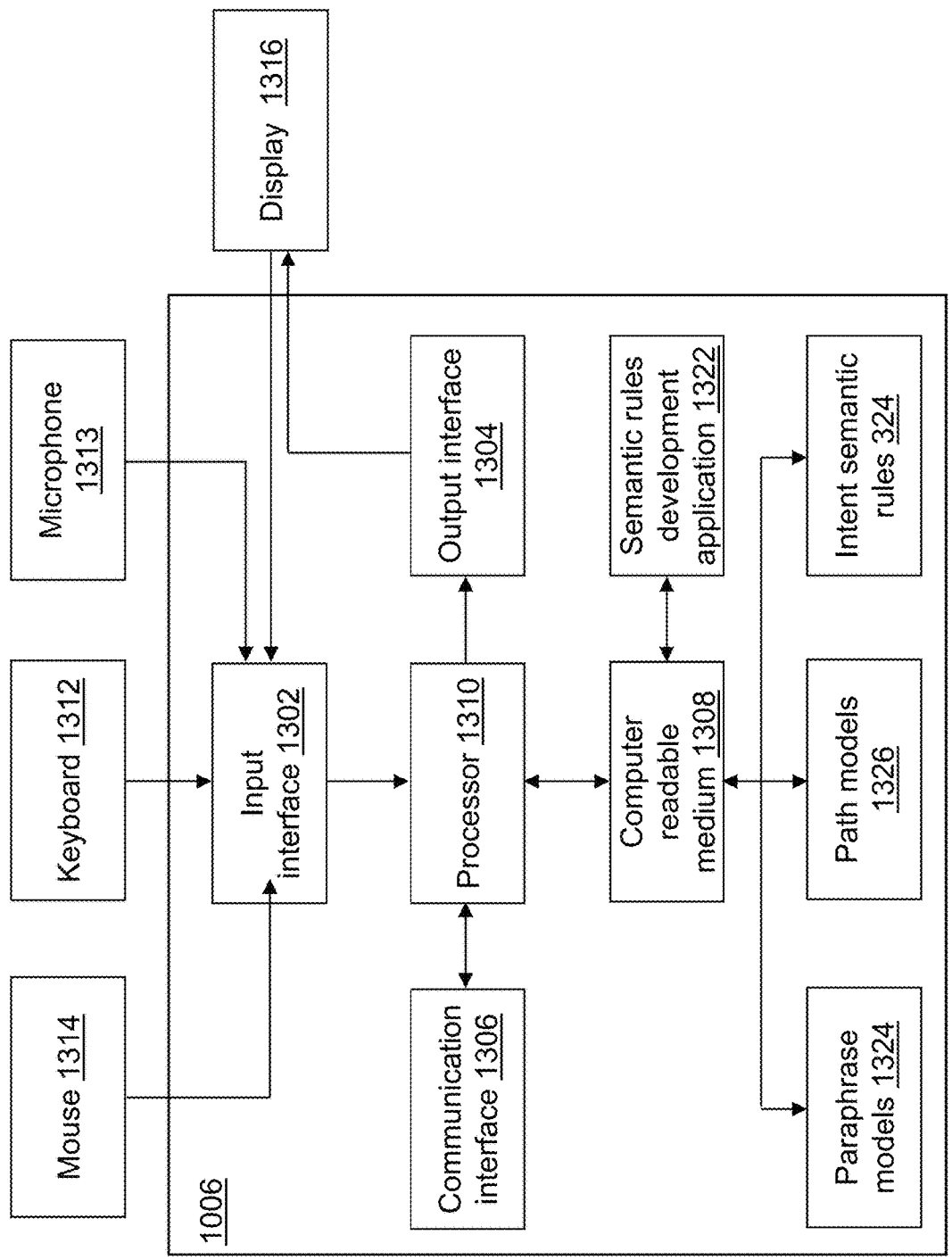
FIG. 13 depicts a block diagram of a semantic rules development device in accordance with an illustrative embodiment.

Referring to FIG. 13, a block diagram of semantic rules development device 1006 is shown in accordance with an example embodiment. Semantic rules development device 1006 may include a fourth input interface 1302, a fourth output interface 1304, a fourth communication interface 1306, a fourth non-transitory computer-readable medium 1308, a fourth processor 1310, a semantic rules development application 1322, paraphrase models 1324, path models 1326, and intent semantic rules 324.

Fourth input interface 1302 provides the same or similar functionality as that described with reference to input interface 102 of conversation processing device 100 though referring to semantic rules development device 1006. Fourth output interface 1304 provides the same or similar functionality as that described with reference to output interface 104 of conversation processing device 100 though referring to semantic rules development device 1006. Fourth communication interface 1306 provides the same or similar functionality as that described with reference to communication interface 106 of conversation processing device 100 though referring to semantic rules development device 1006. Fourth computer-readable medium 1308 provides the same or similar functionality as that described with reference to computer-readable medium 108 of conversation processing device 100 though referring to semantic rules development device 1006. Fourth processor 1310 provides the same or similar functionality as that described with reference to processor 110 of conversation processing device 100 though referring to semantic rules development device 1006.

Semantic rules development application 1322 performs operations associated with creating paraphrase models 1324, path models 1326, and/or intent semantic rules 324. The operations may be implemented using hardware, firmware, software, or any combination of these methods. Referring to the example embodiment of FIG. 13, semantic rules development application 1322 is implemented in software (comprised of computer-readable and/or computer-executable instructions) stored in fourth computer-readable medium 1308 and accessible by fourth processor 1310 for execution of the instructions that embody the operations of semantic rules development application 1322. Semantic rules development application 1322 may be written using one or more programming languages, assembly languages, scripting languages, etc. Conversation application 1122 may be implemented as a Web application.

Figure 14:
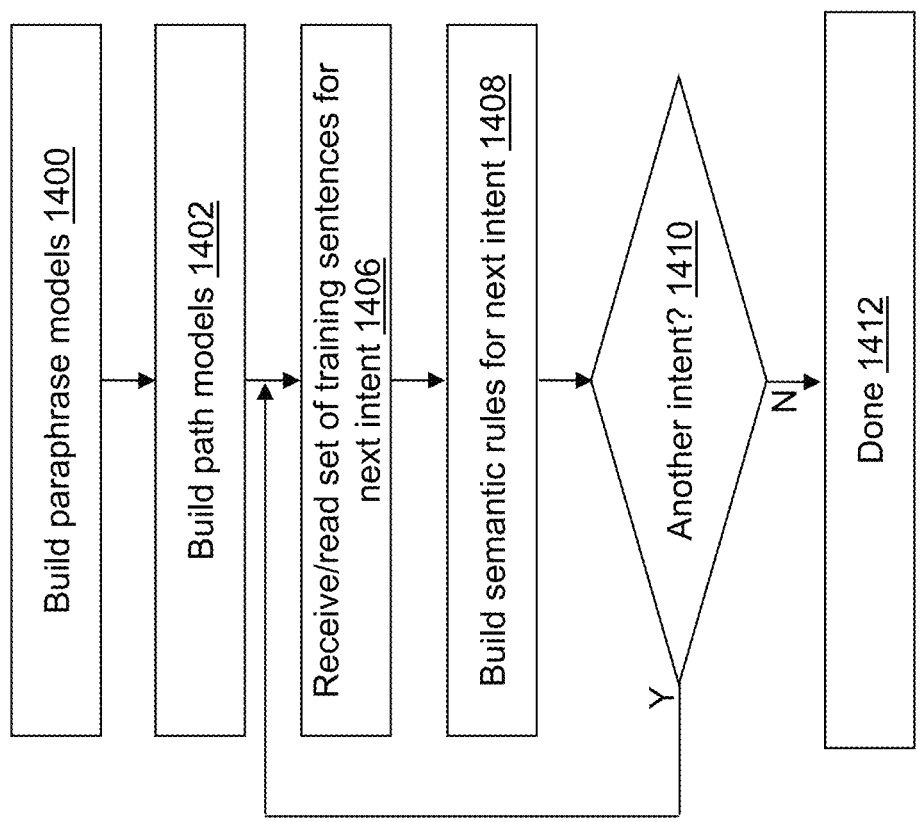
FIG. 14 depicts a flow diagram illustrating examples of operations performed by the semantic rules development device of FIG. 13 in training intent semantic rules in accordance with an illustrative embodiment.

Referring to FIG. 14, example operations associated with semantic rules development application 1322 are described. Additional, fewer, or different operations may be performed depending on the embodiment. The order of presentation of the operations of FIG. 14 is not intended to be limiting. Although some of the operational flows are presented in sequence, the various operations may be performed in various repetitions, concurrently, and/or in other orders than those that are illustrated. For example, a user may execute semantic rules development application 1322, which causes presentation of a first user interface window, which may include a plurality of menus and selectors such as drop-down menus, buttons, text boxes, hyperlinks, etc. associated with semantic rules development application 1322 as understood by a person of skill in the art. As further understood by a person of skill in the art, various operations may be performed in parallel, for example, using a plurality of threads or a plurality of computing devices such as a grid or a cloud of computing devices.

Figure 15:
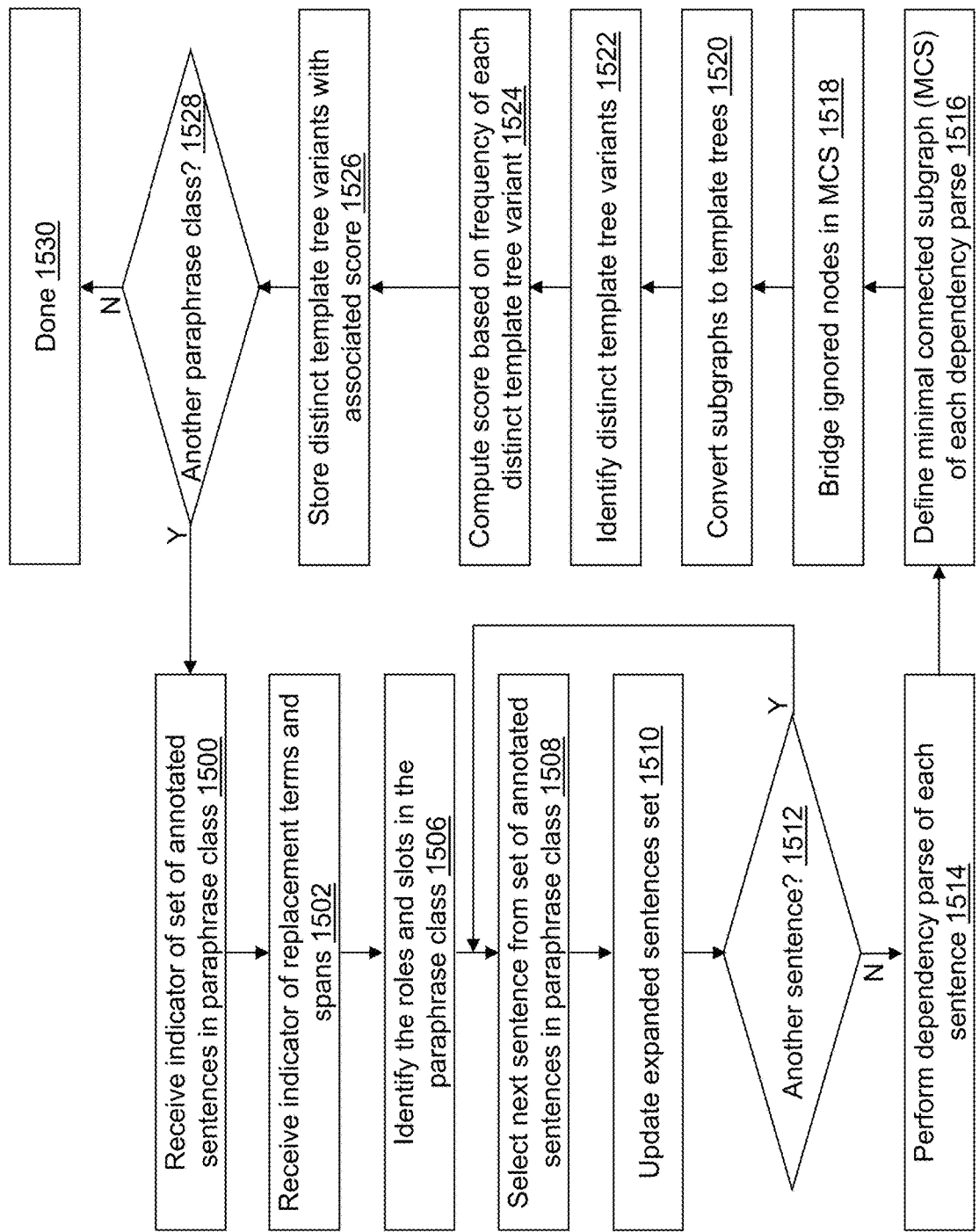
FIG. 15 depicts a flow diagram illustrating examples of operations performed by the semantic rules development device of FIG. 13 in building a paraphrase model in accordance with an illustrative embodiment.

In an operation 1400, paraphrase models 1324 are built. For example, referring to FIG. 15, example operations associated with semantic rules development application 1322 in building paraphrase models 1324 are described. Additional, fewer, or different operations may be performed depending on the embodiment. The order of presentation of the operations of FIG. 15 is not intended to be limiting. Referring to FIGS. 16A to 16E, aspects of building paraphrase models 1324 are illustrated graphically in accordance with an illustrative embodiment. Paraphrase models 1324 define sets of minimal, domain independent, semantically equivalent dependency parse subtree templates that include a genericized part-of-speech tag at root, dependency labels throughout, lemmas of non-ignored non-slot nodes, identifiers for all used nodes, and special identifiers for nodes corresponding to a slot that lacks a lemma constraint. The slot identifiers are common across the template trees within a paraphrase class to allow a translation between the different trees. Paraphrase models 1324 are built in a way that makes them misparse tolerant.

Referring to FIG. 15, in an operation 1500, a second indicator may be received that indicates a set of annotated sentences in a paraphrase class. A label may be defined for each paraphrase class. As an example, the second indicator may be received by semantic rules development application 1322 after receipt from third microphone 1313, third keyboard 1312, third mouse 1314, or fourth display 1316 or through fourth communication interface 1306, etc. For example, a linguist or developer creates language specific, but domain independent paraphrase classes and a set of annotated sentences for each domain independent paraphrase class. Each sentence in a paraphrase class expresses the same semantic relation between slots, but has different dependency relations between those slots. For a given slot, terms with the same lemma across the sentences are used.

Each sentence may include zero or more ignored spans that are useful for dependency context, but not meaning. An ignored span may be used during dependency parsing, but its nodes may not be included in extracting templates, except in certain cases described below. A span can be set apart as a logical "OR" of two or more spans. An annotated sentence that includes an indication of an "OR" of two or more spans is multiplied, replacing the span in each case with one of the associated replacement spans. This is useful for representing phrasal variation succinctly. For example, "I walked (home|to home)" can be expanded to "I walked home" and "I walked to home".

In an operation 1502, a third indicator may be received that indicates a set of replacement terms. As an example, the third indicator may be received by semantic rules development application 1322 after receipt from third microphone 1313, third keyboard 1312, third mouse 1314, or fourth display 1316 or through fourth communication interface 1306, etc. The set of replacement terms define a set of surface forms and their replacements used to expand out a single sentence to many others, with those terms substituted while keeping the slot assignments. The set of replacement terms may be extracted from a dictionary and stored in a location defined by the third indicator. The set of replacement terms are used to capture dependency misparse scenarios resulting from different types of slot fillers (nouns that could also be verbs, verbs that can also be adjectives, etc.) or different sentence contexts. One or more replacement terms may be included in each sentence included in the set of annotated sentences 1600.

Figure 16A:
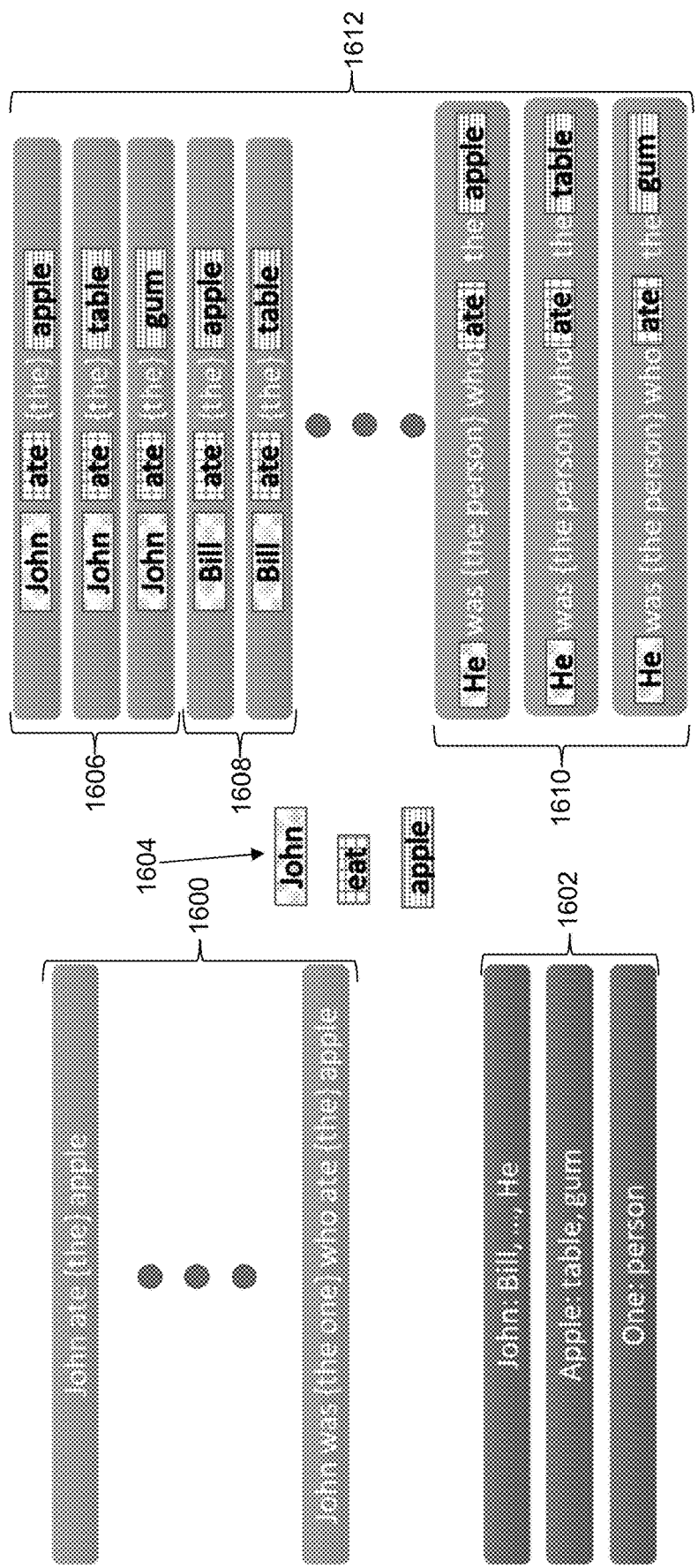
FIGS. 16A to 16E graphically illustrate aspects of building the paraphrase model in accordance with an illustrative embodiment.
Figure 16B:
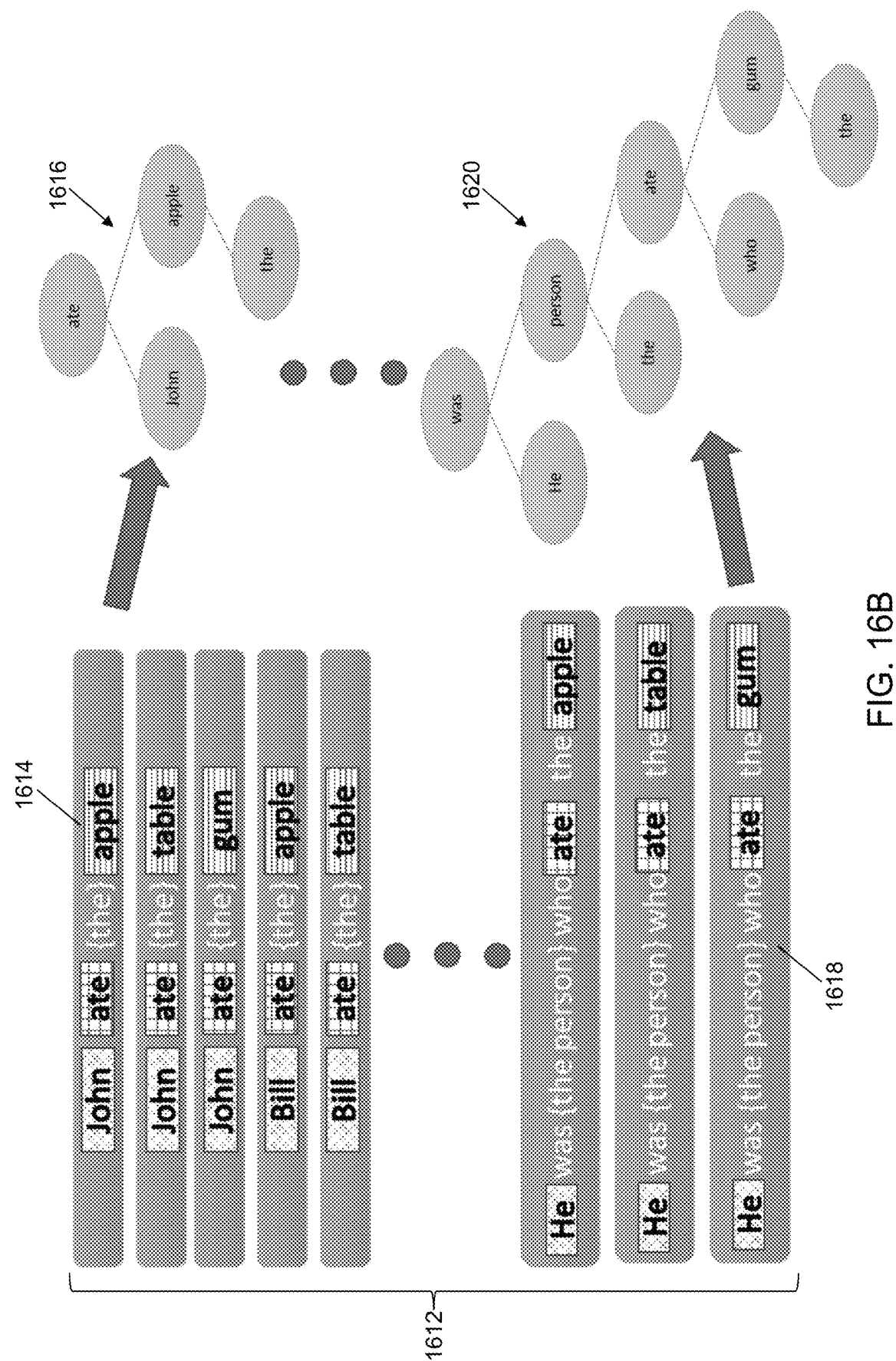
Figure 16C:
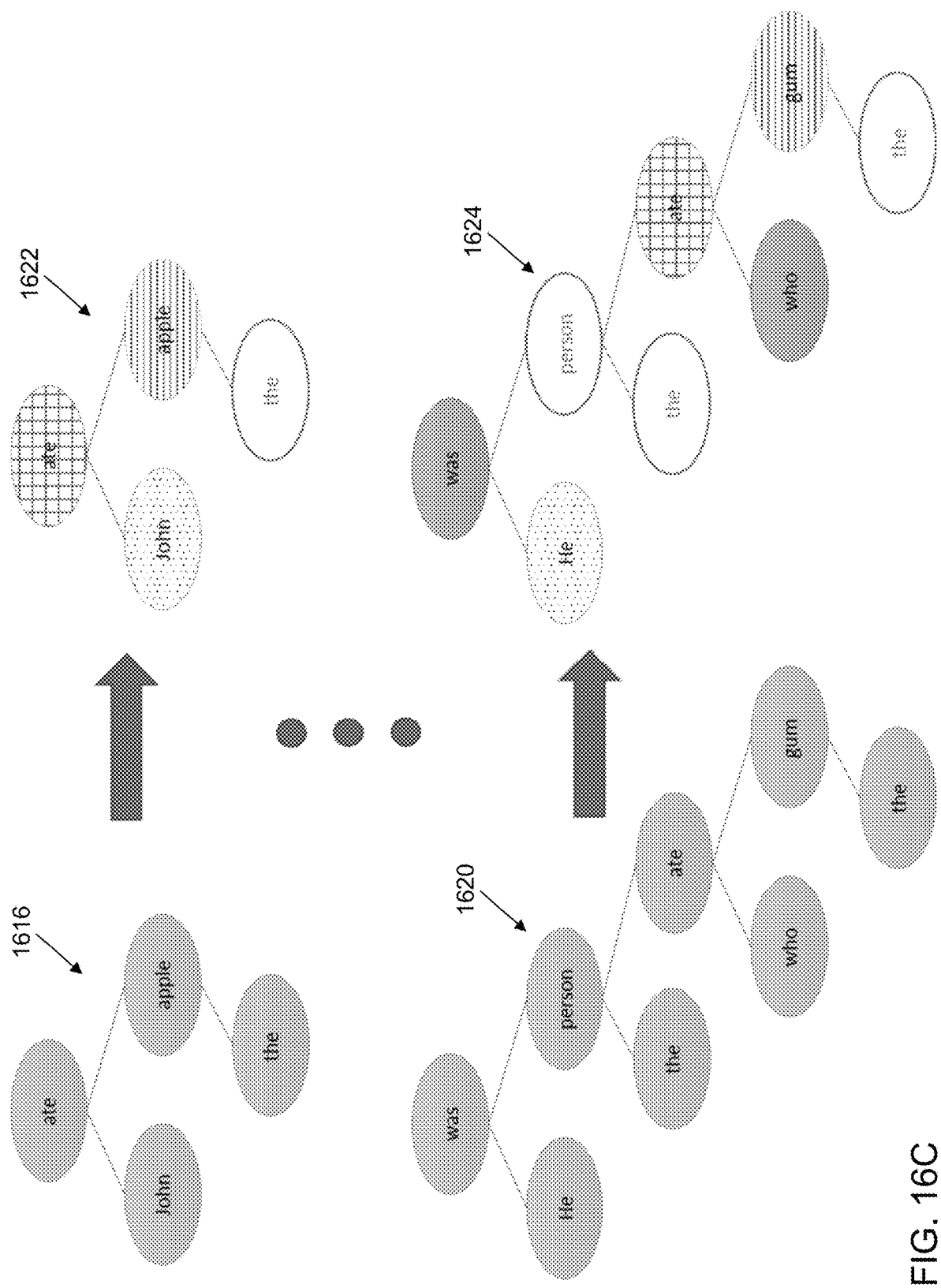
Figure 16D:
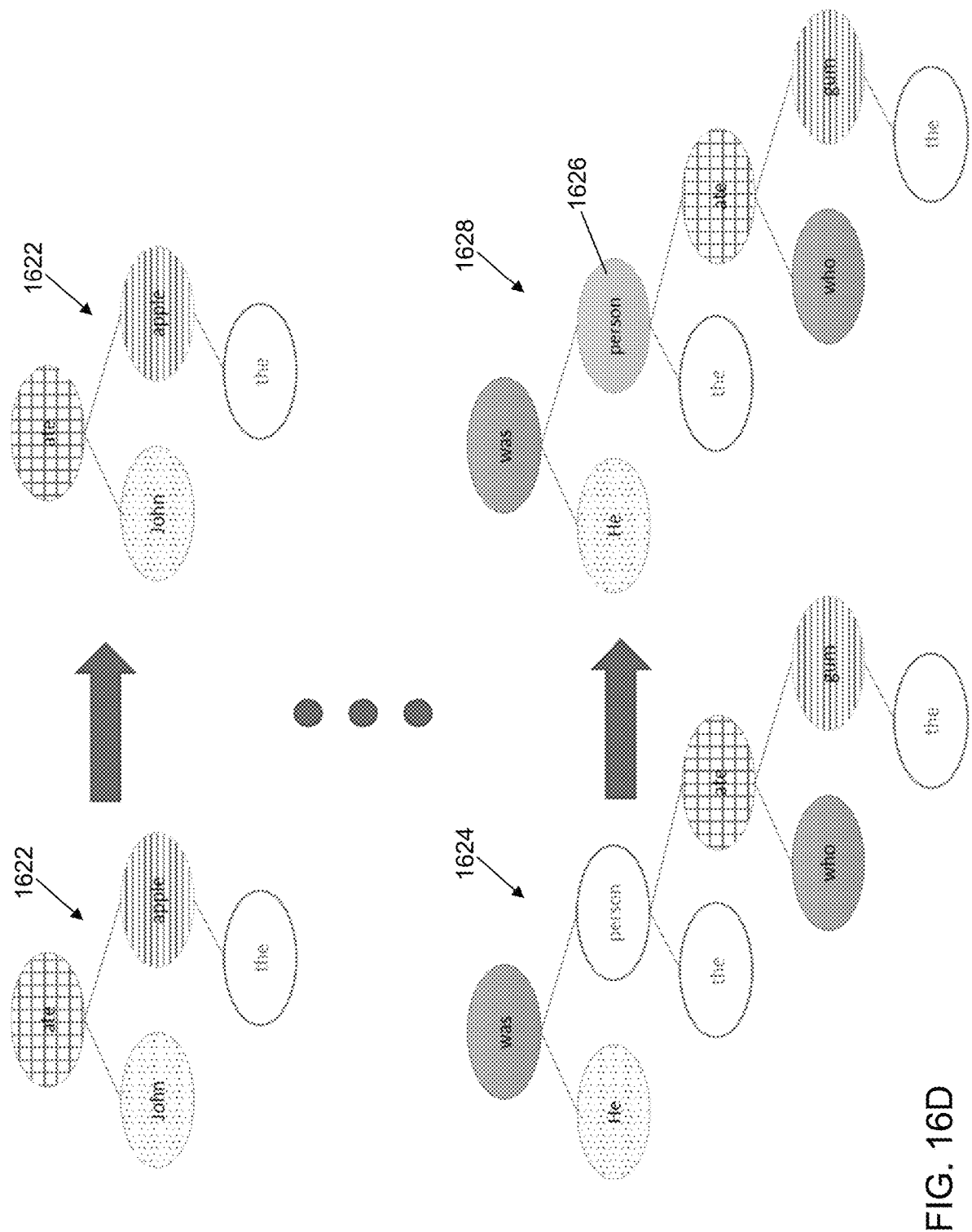
Figure 16E:
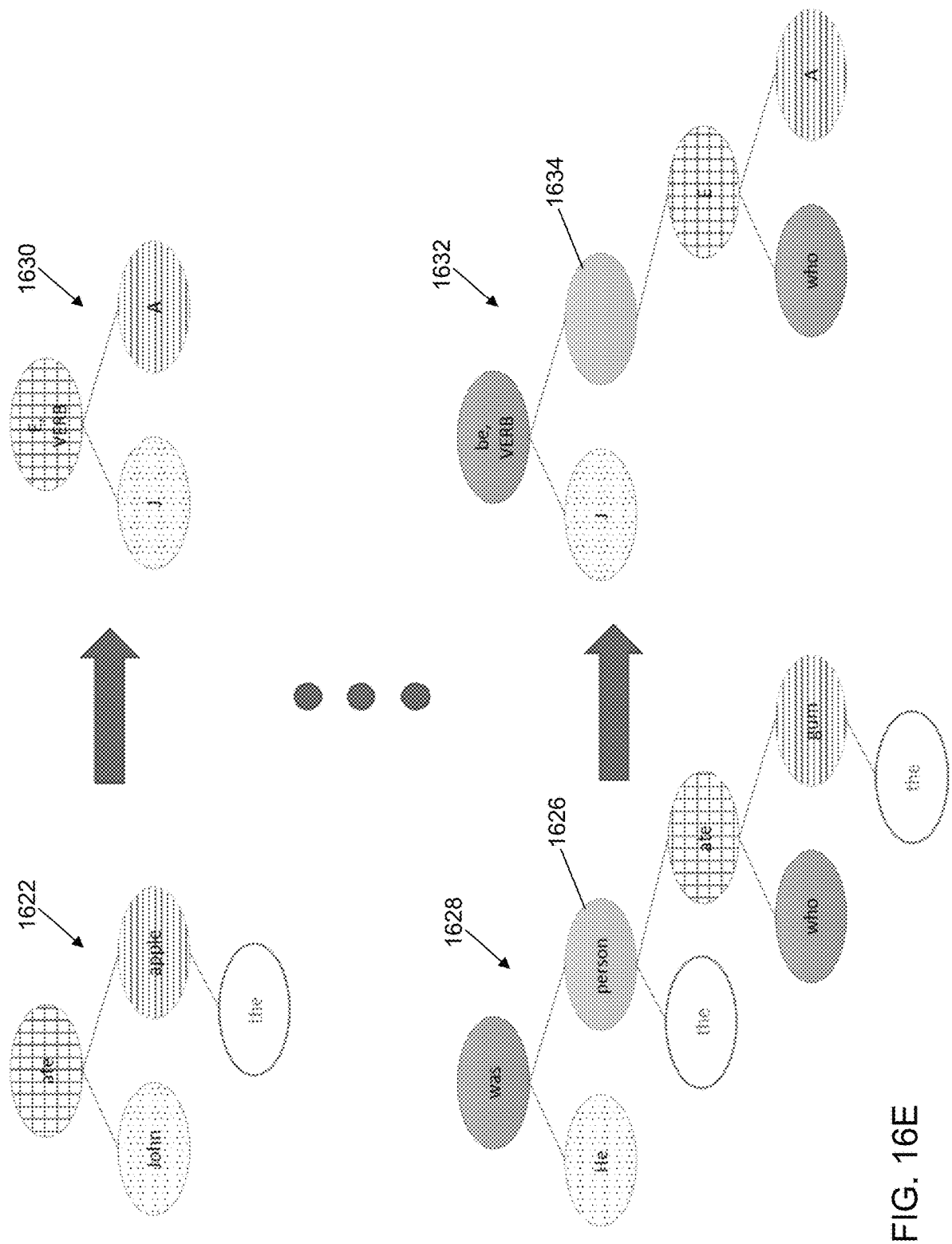

For example, referring to FIG. 16A, the set of annotated sentences 1600 and replacement terms 1602 in a first paraphrase class are shown where terms included in "{ }" are ignored spans. For illustration, the term "John" is associated with a list of replacement terms "Bill, . . . , He" as indicated by "John: Bill, . . . , He". Similarly, the term "Apple" is associated with a list of replacement terms "table, gum", and the term "One" is associated with a single replacement term "person".

Referring again to FIG. 15, in an operation 1506, roles and slots are identified for the paraphrase class. A role set from correspondence within the set of annotated sentences, and a mapping of the role set to nodes in each sentence included in the set of annotated sentences is identified. Slots are implicitly identified within a paraphrase class by discovering non-ignored tokens/lemmas common across all sentences in the paraphrase set, or they may be explicitly identified using a markup scheme. In unusual cases, a slot may be explicitly labeled when a different word has to be used or if for some reason lemmatization fails to find a common lemma.

Referring again to FIG. 15, in an operation 1508, a sentence is selected from the set of annotated sentences.

In an operation 1510, an expanded sentences set is updated to include the selected sentence and permutations of the selected sentence created using the replacement terms and spans. A mapping is maintained between old and new spans and roles in each variant sentence.

In an operation 1512, a determination is made concerning whether the set of annotated sentences includes another sentence. When the set of annotated sentences includes another sentence, processing continues in operation 1508 to select a next sentence. When all of the sentences included in the set of annotated sentences have been expanded, processing continues in an operation 1514.

For example, referring again to FIG. 16A, a first expanded sentence set 1606 includes the first sentence included in the set of annotated sentences 1600 and additional sentences created by replacing "apple" in a first sentence with each associated replacement term in successive sentences. A second expanded sentence set 1608 includes the first sentence included in the set of annotated sentences 1600 and additional sentences created by replacing "John" in the first sentence with a first replacement term "Bill" and replacing "apple" in the first sentence with each associated replacement term in successive sentences. A last expanded sentence set 1610 includes a last sentence included in the set of annotated sentences 1600 and additional sentences created by replacing "apple" in the last sentence with each associated replacement term in successive sentences with "John" replaced in the last sentence with its last associated replacement term and with "one" replaced in the last sentence with its last associated replacement term. An expanded sentences set 1612 is a final updated expanded sentences set. Expanded sentences set 1612 includes each permutation of each replacement term in each annotated sentence.

Referring again to FIG. 15, in operation 1514, a dependency parse of each sentence included in the updated expanded sentences set is performed. Where the sentence includes a plurality of sentences, for example, joined by "and", a plurality of ordered dependency parses is created. A variety of structures may be received due to an inherent brittleness of dependency parsers. For example, referring to FIG. 16B, a first sentence 1614 of expanded sentences set 1612 is dependency parsed as shown by a first dependency parse graph 1616 that forms a sentence diagram, and a last sentence 1618 of expanded sentences set 1612 is dependency parsed as shown by a second dependency parse graph 1620.

Referring again to FIG. 15, in an operation 1516, a minimal connected subgraph (MinCS) is defined for the dependency parse of each sentence included in the updated expanded sentences set. A MinCS contains all slot nodes and non-ignored nodes. An ignored node is a node that included in an ignored span. "slot" and "role" are often used synonymously; the slot node fills a slot/role and corresponds to a role/slot span. For illustration, consider the annotated sentence set:

1. John built {the} house {on Tuesday}
2. {Sally bought the} John-built house
3. {The} house was built by John
4. John, build, and house would be extracted as roles/slots.

In the 3rd sentence, "The" is an ignored span, and its node is thus an ignored node; "house", "built", and "John" are role/slot spans, so their nodes are the slot nodes; "was" and "by" are neither slot/role spans nor ignored spans, so their nodes are non-slot, non-ignored nodes.

A smallest number of nodes and edges that connect all the slot nodes and non-ignored nodes is defined, as well as all nodes required to connect them, by taking all of the paths from required nodes to a parse root, finding a lowest common node, and truncating everything above that from all of the paths. For example, referring to FIG. 16C, a first MinCS 1622 is defined for first dependency parse graph 1616, and a second MinCS 1624 is defined for second dependency parse graph 1620.

Referring again to FIG. 15, in an operation 1518, the MinCS for the dependency parse of any sentence including ignored nodes may be updated to include a bridge designation for each ignored node to include some nodes from the ignored nodes in the MinCS. For example, referring to FIG. 16D, first MinCS 1622 does not include any ignored nodes and remains unchanged, but second MinCS 1624 includes an ignored node at a first node 1626 labeled "person" to define an updated second MinCS 1628. First node 1626 labeled "person" is an ignored node because "person" replaced the term "one" that was included in an ignored span in the set of annotated sentences.

Referring again to FIG. 15, in an operation 1520, each MinCS is converted to a template tree. The ignored spans except those indicated as a bridge node are not included in the template tree. Each MinCS is converted into a template tree containing some subset of features of the MinCS. These are a general part of speech constraint on root, dependency label constraints throughout, lemma constraints on all non-ignored, non-slot nodes, and identifiers on all nodes. The template trees for a plurality of ordered dependency parses are defined by a template root that is a container for an ordered list of template trees. For example, referring to FIG. 16E, first MinCS 1622 is converted to a first template tree 1630, and updated second MinCS 1628 is converted to a second template tree 1634. First node 1626 becomes an empty node 1634 because sometimes text may be parsed into multiple dependency parses. Empty node 1634 can contain these in order. The identifiers for slots/nodes were generified to "J", "E", and "A" so that they no longer have reference to "John", "eat", and "apple" or depend on their text.

Referring again to FIG. 15, in an operation 1522, distinct template tree variants are identified from the template trees. Each distinct template tree variant may be genericized by removing the parts of speech from all nodes except root, and removing surface forms on all role nodes and ignored nodes, and converting surface forms on all non-role non-ignored nodes to lemma. For example, if there are 30 trees and 10 are the same as each other, another 15 are the same as each other, and the remaining 5 are all different from each other, there will be 7 distinct template trees. Two trees are distinct if they aren't identical/equivalent.

In an operation 1524, a normalized frequency score is computed for each distinct template tree variant based on a frequency of each respective template tree variant relative to the template trees. For example, for each sentence included in the set of annotated sentences, each of its distinct variant template trees are counted by frequency among the variant sentences to compute the score. This supports application of a threshold based on how many variants appear or how aggressively to match on less likely dependency parses, which helps to control misparse coverage, as well as improve runtime performance. For example, first template tree 1630 and second template tree 1634 may each have a normalized frequency score value of one. For example, the score may be a number of times a template tree appeared divided by a total number of template trees found for from all variants of the sentence.

In an operation 1526, each distinct template tree variant and its associated score is stored in paraphrase models 1324. The distinct template tree variants and their scores are merged together into one set of semantically equivalent template trees for the paraphrase set. The slot identifiers are also stored to define how to translate between trees. Paraphrase models 1324 include a set of dependency parse subtree forms and the translation key between them (slot identifiers), which can be used to model paraphrase variation of dependency parses in a misparse tolerant way for NLU, NLG, or other applications that use a dependency parse as a source for semantics.

In an operation 1528, a determination is made concerning whether there is another paraphrase class to define. When there is another paraphrase class, processing continues in operation 1500 to define distinct template tree variants and associated scores for another paraphrase class. When there is not another paraphrase class, processing continues in an operation 1530.

In operation 1530, the building of paraphrase models 1324 is complete, and processing continues in an operation 1402.

If the dependency parser is changed either through parse structure scheme changes or through a different model such as when parsing a different language, paraphrase models 1324 is regenerated. Otherwise, as long as the paraphrase classes contained domain independent paraphrases, paraphrase models 1324 are similarly domain independent though domain specific extensions could be included.

Figure 17:
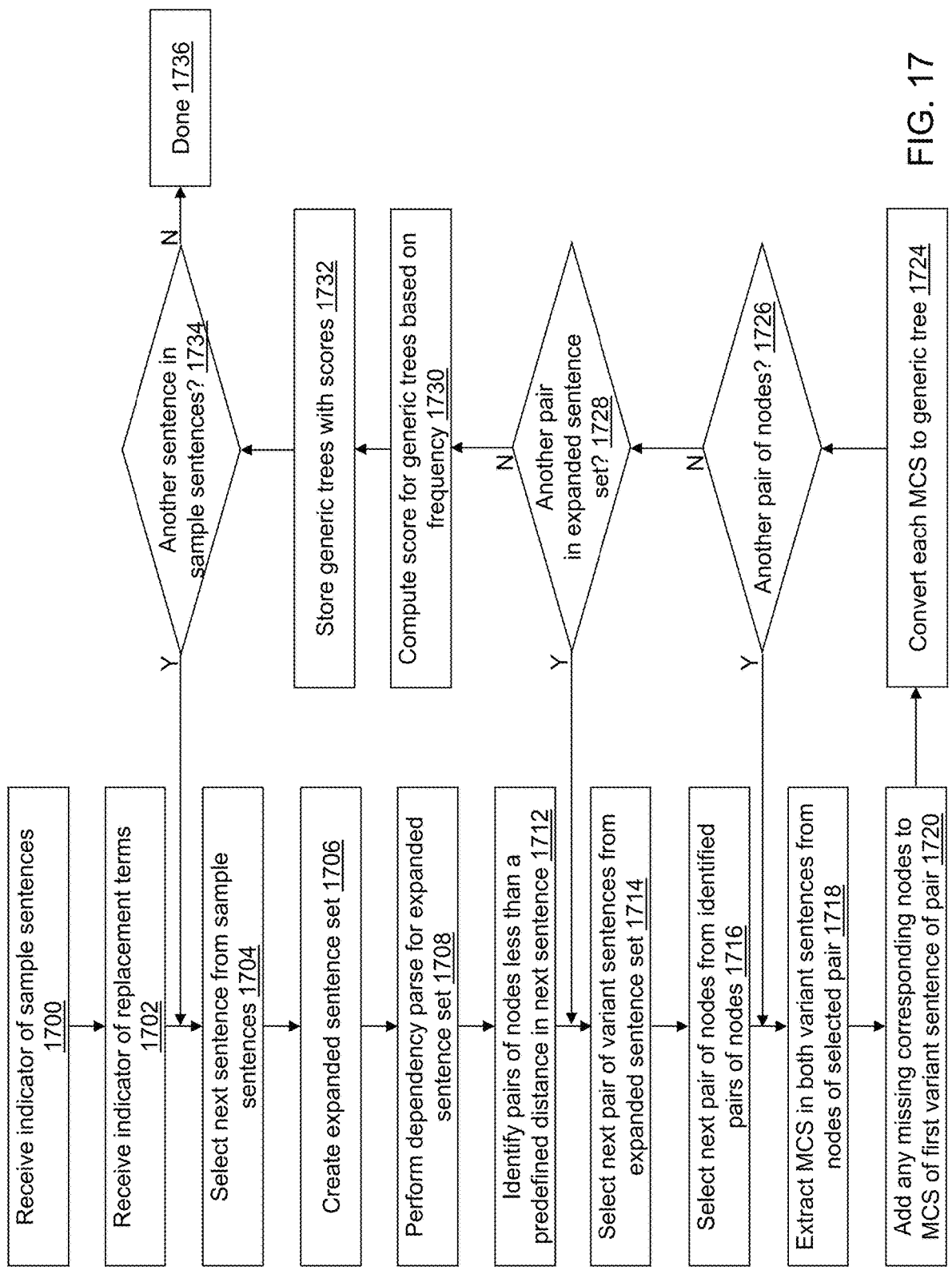
FIG. 17 depicts a flow diagram illustrating examples of operations performed by the semantic rules development device of FIG. 13 in building a path model in accordance with an illustrative embodiment.

Referring again to FIG. 14, in operation 1402, path models 1326 are built. For example, referring to FIG. 17, example operations associated with semantic rules development application 1322 in building path models 1326 are described. Additional, fewer, or different operations may be performed depending on the embodiment. The order of presentation of the operations of FIG. 17 is not intended to be limiting. Referring to FIGS. 18A to 18F, aspects of building path models 1326 are illustrated graphically in accordance with an illustrative embodiment. Path models 1326 are built by swapping words that appear in a sentence for other valid words because sometimes parsers alter the structure of the dependency parse due to ambiguity or training gaps. Path models 1326 thereby capture the variation in paths between nodes that result due to ambiguity or training gaps.

Referring to FIG. 17, in an operation 1700, a fourth indicator may be received that indicates a set of sample sentences. As an example, the fourth indicator may be received by semantic rules development application 1322 after receipt from third microphone 1313, third keyboard 1312, third mouse 1314, or fourth display 1316 or through fourth communication interface 1306, etc. For example, a linguist or developer defines a small list of sentences expressing a variety of sentence structures. No relationship between the sentences is required, and no markup is required of them.

In an operation 1702, a fifth indicator may be received that indicates a set of replacement terms. As an example, the fifth indicator may be received by semantic rules development application 1322 after receipt from third microphone 1313, third keyboard 1312, third mouse 1314, or fourth display 1316 or through fourth communication interface 1306, etc. The replacement terms are used to multiply each sentence out to many variants yielding a variety of structural variations. The mapping for each token and replacement is persisted so that the alignment between the variants is known similar to that described while building paraphrase model 1324. For example, referring to FIG. 18A, the set of sample sentences 1800 and replacement terms 1802 are shown. For illustration, the term "John" is associated with a list of replacement terms "Bill, the pitcher, . . . , it" as indicated by "John: Bill, the pitcher, . . . , it". Similarly, the term "heated up" is associated with a list of replacement terms "cooked, ate". One or more replacement terms may be included in each sentence included in the set of sample sentences 1800.

Referring again to FIG. 17, in an operation 1704, a sentence is selected from the set of sample sentences.

In an operation 1706, an expanded sentence set is created to include the selected sentence and permutations of the selected sentence created using the replacement terms. A mapping is maintained between old and new spans and roles in each variant sentence. For example, referring again to FIG. 18A, a first expanded sentence set 1804 includes a first sentence 1808 included in the set of sample sentences 1800 and additional sentences created by replacing "John" in first sentence 1808 with each associated replacement term in successive sentences because the selected sentence includes the term "John" for which replacement terms are defined. The mapping is maintained between old and new spans and roles in each variant sentence is maintained as indicated by the common shading for various terms between each sentence variant. The expanded sentence set further includes sentences with similar permutations for any other replacement terms included in first sentence 1808. For example, though not shown, first expanded sentence set 1804 further includes first sentence 1808 with "John" replaced with "it" as well as any other replacement term permutations for replacement terms included in first sentence 1808.

On a next iteration of operation 1706, a second sentence is selected as the next sentence, and the expanded sentence set is created to include the second sentence and permutations of the second sentence created using the replacement terms. On a last iteration of operation 1706, a last expanded sentence set 1806 includes a last sentence 1810 included in the set of sample sentences 1800 and permutations of last sentence 1810 created using the replacement terms such as "heated up" in last sentence 1810 with each associated replacement term.

Referring again to FIG. 17, in an operation 1708, a dependency parse of each sentence included in the expanded sentence set is performed. Where the sentence includes a plurality of sentences, a plurality of ordered dependency parses are created. A variety of structures may be received due to an inherent brittleness of dependency parsers. For example, referring to FIG. 18B, first sentence 1808 of first expanded sentence set 1804 is dependency parsed as shown by a first dependency parse graph 1812. A third sentence 1814 of first expanded sentence set 1804 is dependency parsed as shown by a second dependency parse graph 1816. For example, referring to FIG. 18C, a first parse map 1818 is defined for first dependency parse graph 1812, and a second parse map 1820 is defined for second dependency parse graph 1816. Common shading/cross-hatching indicates the dependency parse mapping between common terms.

Referring again to FIG. 17, in an operation 1712, every pair of nodes less than a predefined distance from each other is identified in the selected next sentence. A parameter to this algorithm is a predefined distance D selected based on a desired runtime and/or a desired space performance. The distance between two nodes is a number of edges in the path connecting them. All pairs of nodes where the distance between the nodes is less than the predefined distance D are identified. This can be done in various ways. Merely for illustration, for every node (call it the start node), the parse map may be traversed outward (both up and down) from the start node, the distance may be incremented with each hop between nodes, and the start node and the current node are stored when the distance is less than the predefined distance D. If the distance is equal to or more than the predefined distance D, the start node and the current node are not stored and the traversal is stopped. Once stopped a next start node is selected, and the process is repeated until each node in the selected next sentence is processed.

In an operation 1714, a next variant sentence is selected from the expanded sentence set. For example, on a first iteration of operation 1714, a second sentence is selected from the expanded sentence set because the first sentence is the selected next sentence that was included in the set of sample sentences as opposed to being a first variant created from the first sentence; on a second iteration of operation 1714, a third sentence is selected that is a second variant sentence; and so on.

In an operation 1716, a pair of nodes is selected from the identified pairs of nodes.

In an operation 1718, a first MinCS is extracted for the selected pair of nodes from the selected next sentence, and a second MinCS is extracted for a corresponding pair of nodes from the selected next variant sentence based on the known mapping between nodes of the selected next sentence and the selected next variant sentence to identify a corresponding variant node pair from the selected next variant sentence. The first MinCS and the second MinCS are identified to define the MinCS of the selected pair of nodes and its "translation" in the variant nodes. A MinCS of the selected pair of nodes may contain two or more nodes up to the predefined distance D, though it is still a path between the two nodes of the selected pair of nodes.

Figure 18A:
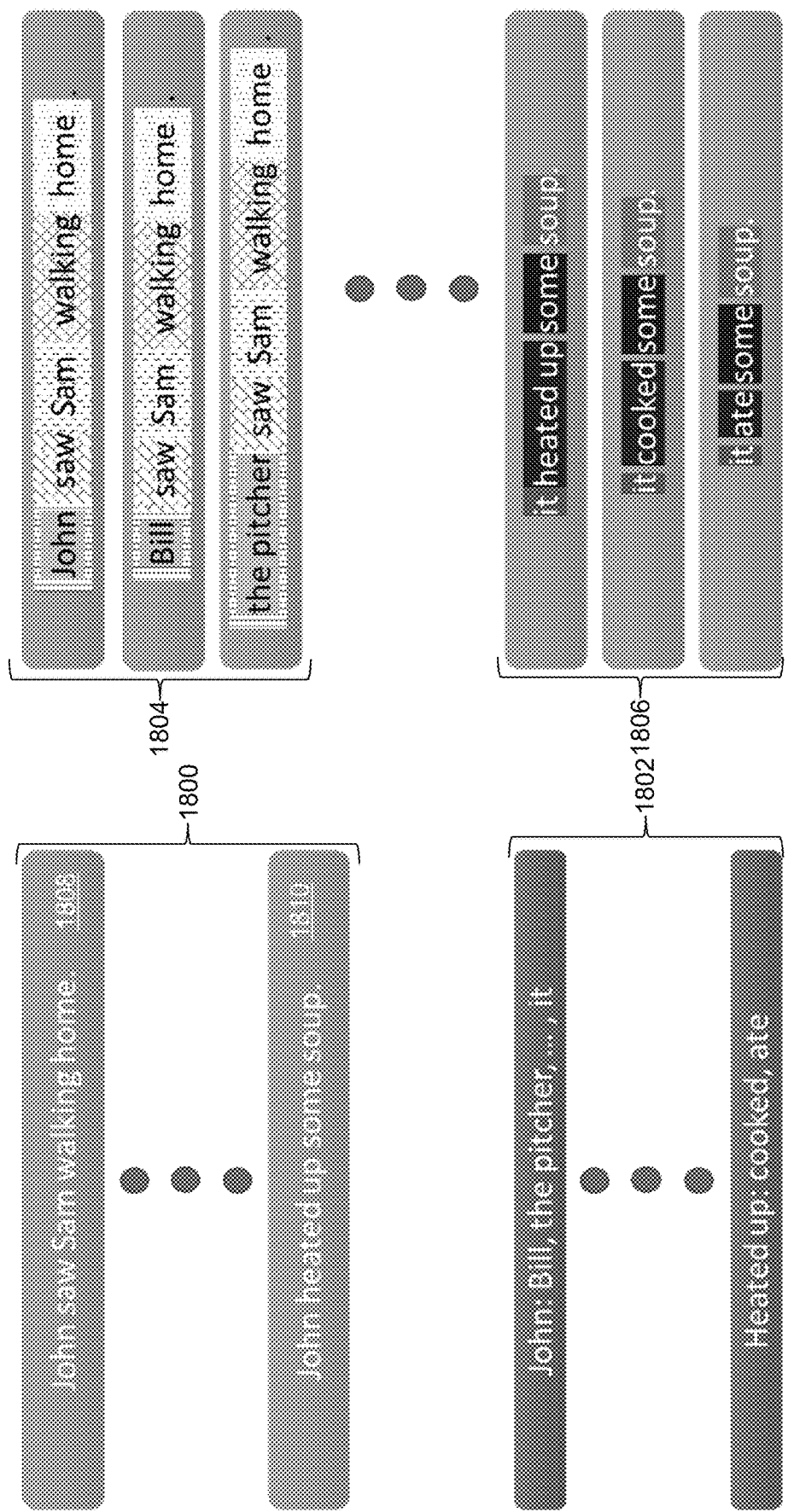
FIGS. 18A to 18F graphically illustrate aspects of building the path model in accordance with an illustrative embodiment.
Figure 18B:
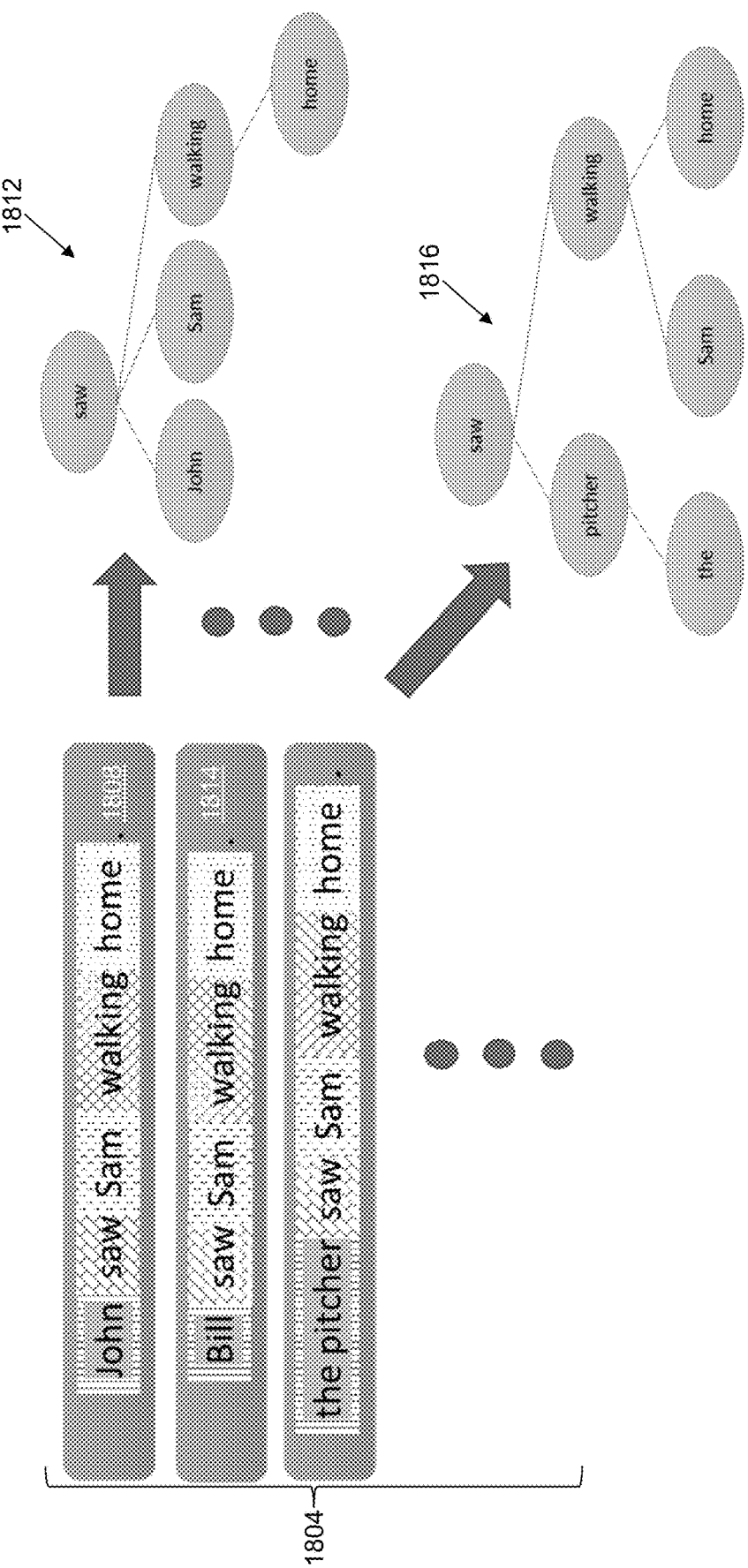
Figure 18C:
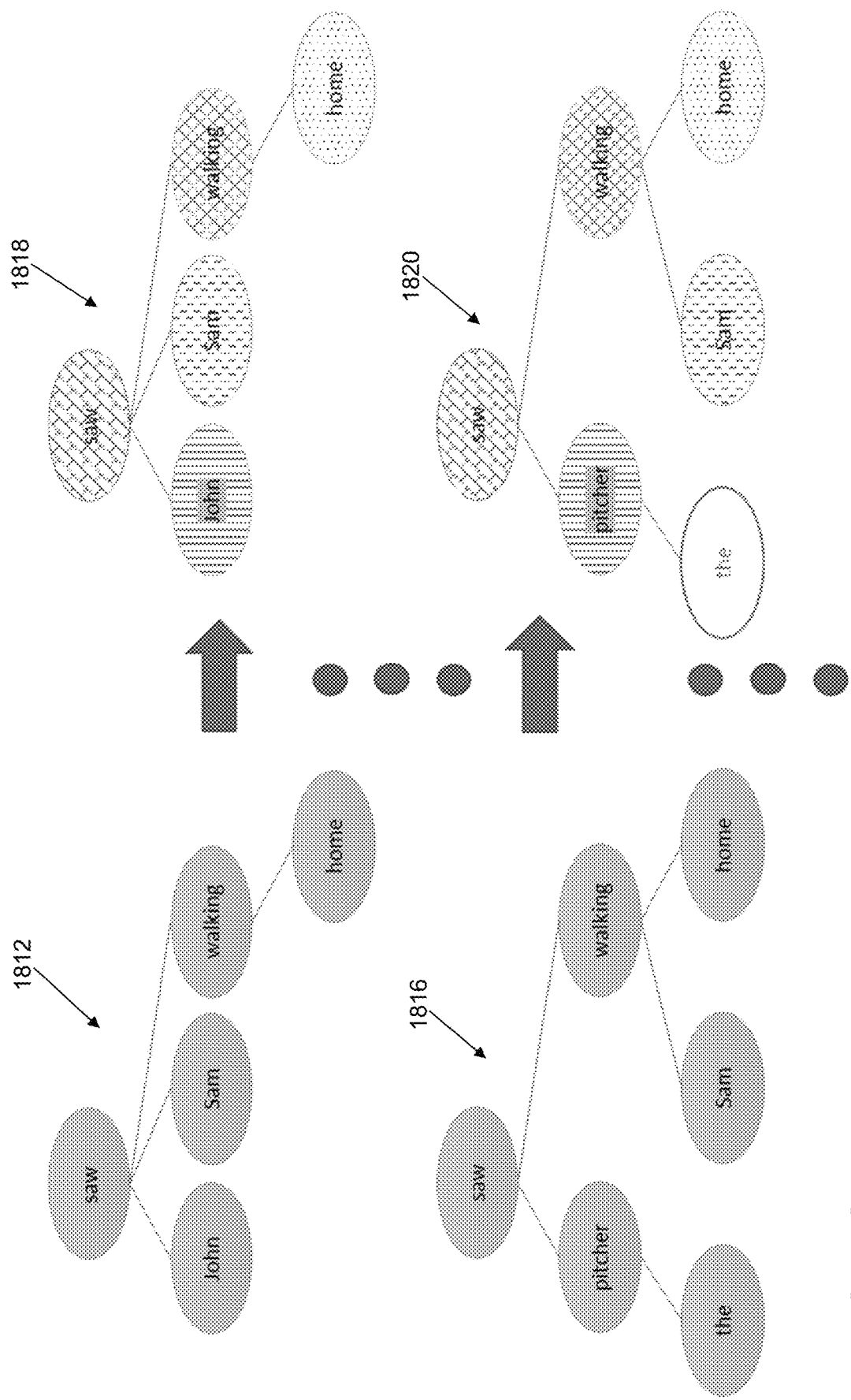
Figure 18D:
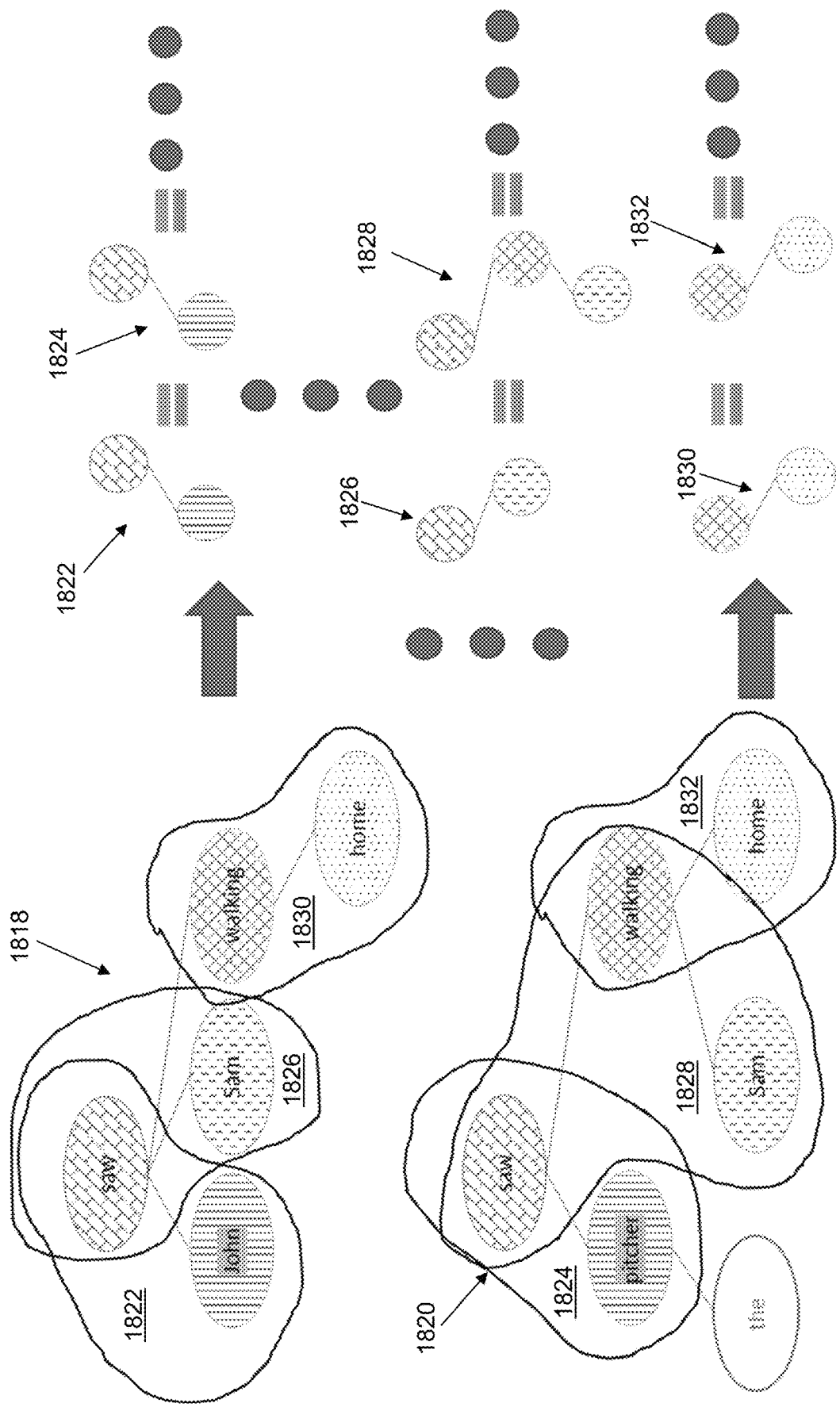
Figure 18E:
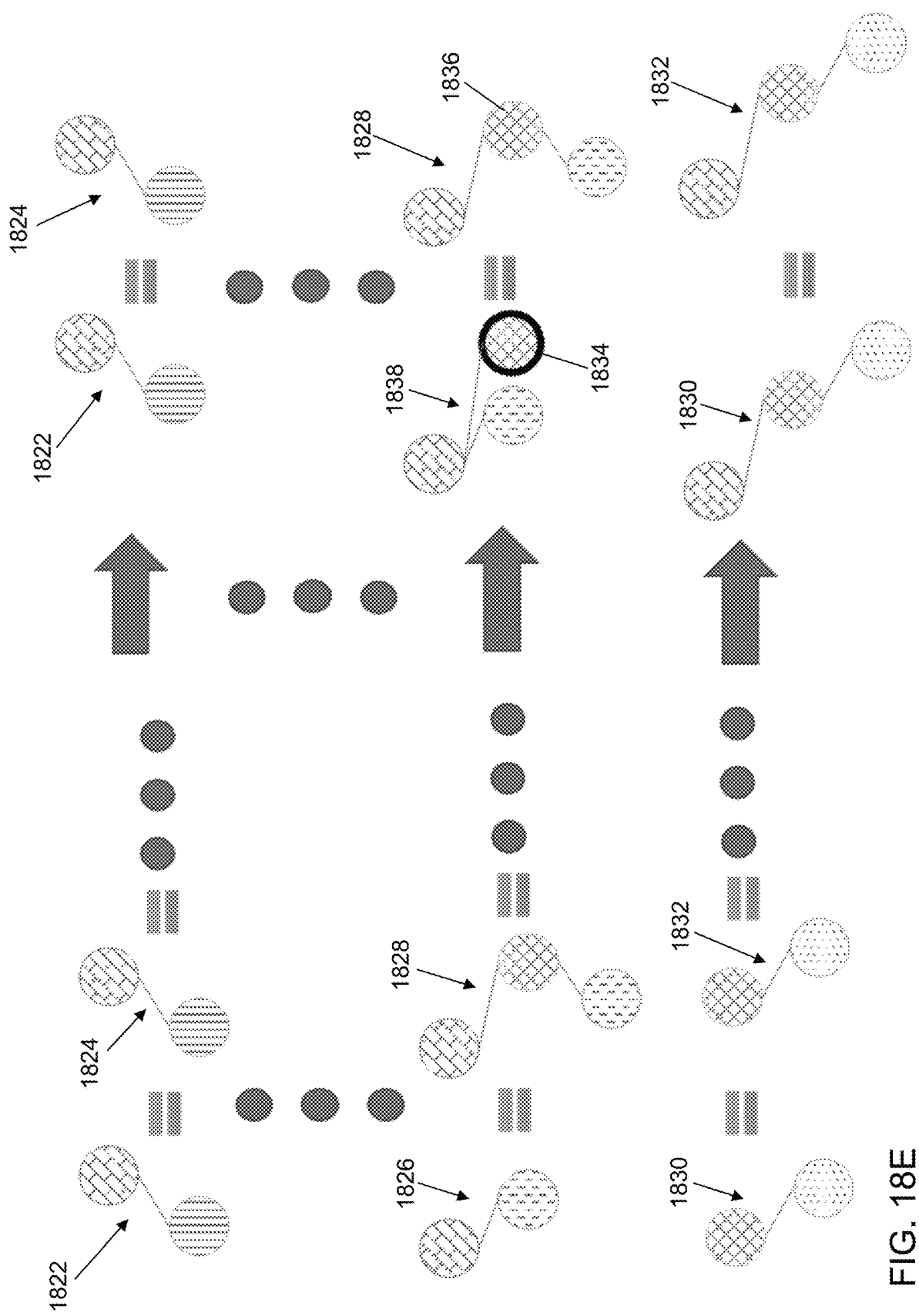
Figure 18F:
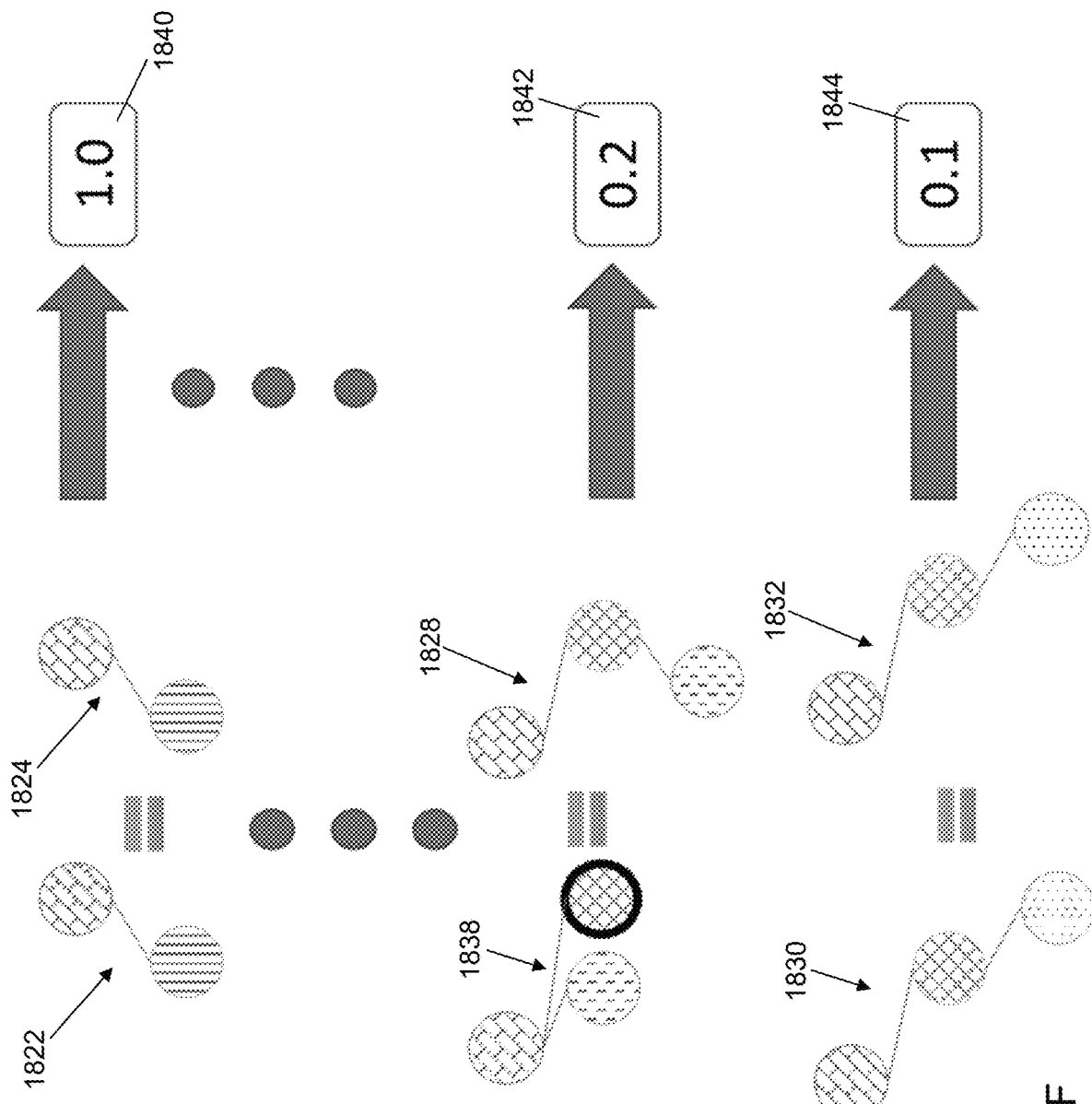

For example, referring to FIG. 18D, a first MinCS of nodes 1822 is derived from the selected pair of nodes from the selected next sentence, and a second MinCS of nodes 1824 is derived from the corresponding set of nodes from the selected next variant sentence that will be considered semantically equivalent. For illustration, on a subsequent iteration of 1716, a third MinCS of nodes 1826 is derived from the selected pair of nodes from the selected next sentence, and a fourth MinCS of nodes 1828 is derived from the corresponding pair of nodes from the selected next variant sentence that will be considered semantically equivalent. For further illustration, on another subsequent iteration of 1716, a fifth MinCS of nodes 1830 is derived from the selected pair of nodes from the selected next sentence, and a sixth MinCS of nodes 1832 is derived from the corresponding pair of nodes from the selected next variant sentence considered semantically equivalent.

Referring again to FIG. 17, in an operation 1720 any node missing in the first MinCS relative to the second MinCS is added to the first MinCS of the selected next sentence, and the first MinCS is rederived with all the required nodes. For example, referring to FIG. 18E, a first node 1834 is added to third set of nodes 1826 because a second node 1836 is missing from third set of nodes 1826, and an updated MinCS 1838 is created for third set of nodes 1826.

Figure 26:
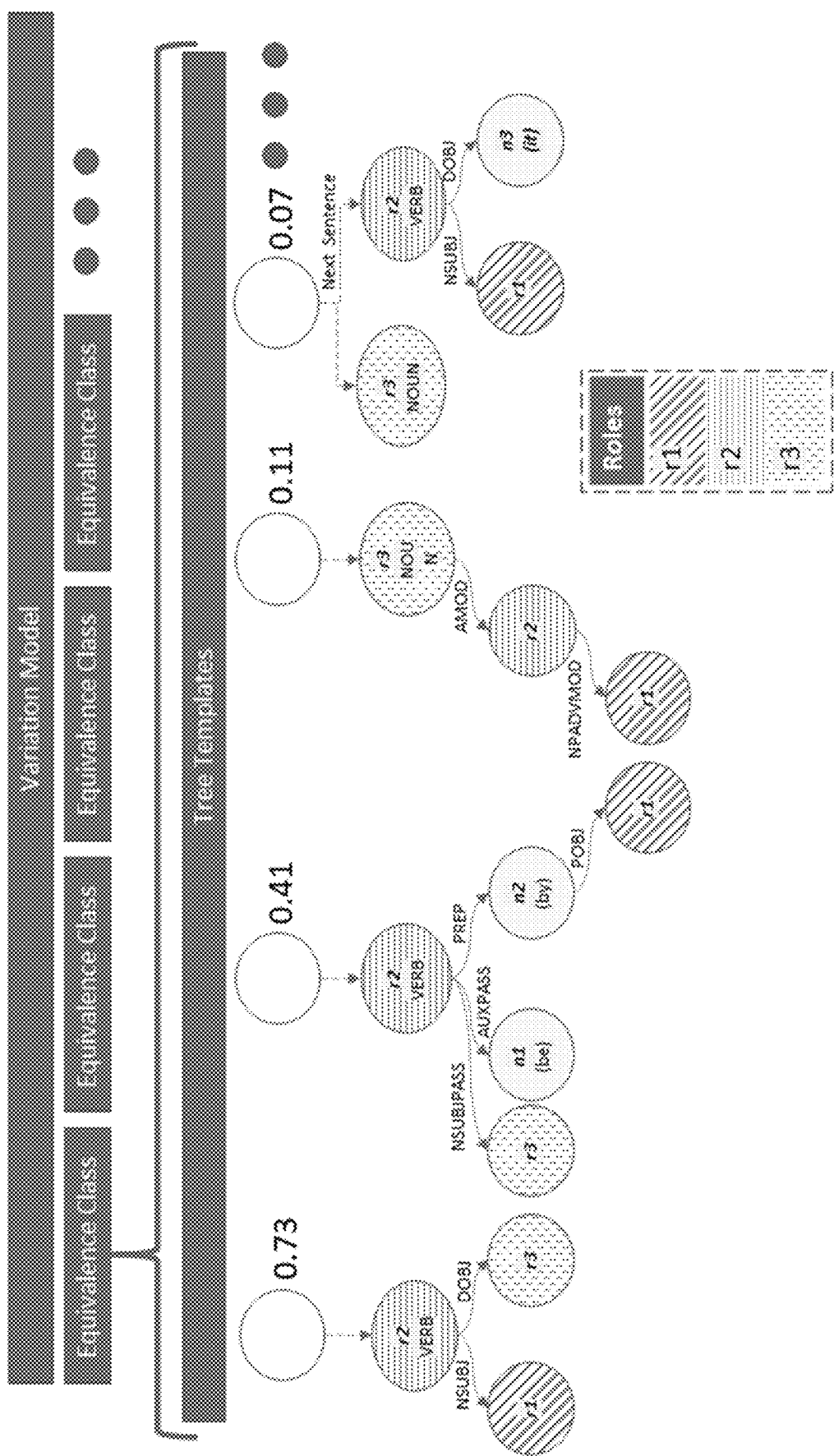
FIG. 26 graphically illustrates how a variation model is structured in accordance with an illustrative embodiment.

Referring again to FIG. 17, in an operation 1724, the first MinCS and the second MinCS are converted to generic trees related as key-template pairs by removing the parts of speech from all nodes except the root and removing all surface forms. This allows all nodes in the next variant sentence to be unified to nodes in the selected next sentence, which is important because the first MinCS can be treated as a lookup key and the second MinCS can be treated as a template. Both the first MinCS and the second MinCS are converted into generic trees that contain only dependency labels except for the root, the part of speech at root, and identifiers to enable translation between the trees. For illustration, referring to FIG. 26 illustrative generic trees are shown. Only the root has a part of speech label, all non-root nodes have a dependency label, and there are common identifiers that label the nodes that are translatable between the trees, as well as unique identifiers for the other nodes.

In an operation 1726, a determination is made concerning whether the identified sets of nodes include another set of nodes. When the identified sets of nodes include another set of nodes, processing continues in operation 1716 to select a next set of nodes for correspondence between the selected next sentence and the selected next variant sentence. When the identified sets of nodes do not include another set of nodes, processing continues in an operation 1728.

In operation 1728, a determination is made concerning whether the expanded sentence set includes another variant sentence. When the expanded sentence set includes another variant sentence, processing continues in operation 1714 to process a next variant sentence. When the expanded sentence set does not include another variant sentence, processing continues in an operation 1730.

In operation 1730, a normalized frequency score is computed for each generic tree related as key-template pair based on a frequency of each respective generic tree variant among the sentences included in the expanded sentence set or based on a relative occurrence of each generic tree in a corpus. For illustration, the score may be a number of times the distinct tree variant appears divided by a total number of all variants. As another illustration using a scoring corpus, the score may be the total times that a distinct variant appears in the corpus divided by the total variants appearing in the corpus or divided by the highest count of any variant. For example, referring to FIG. 18F, first set of nodes 1822 that is equivalent to second set of nodes 1824 has a frequency score of 1.0; updated MinCS 1838 that is equivalent to fourth set of nodes 1828 has a frequency score of 0.2; and fifth set of nodes 1830 that is equivalent to sixth set of nodes 1832 has a frequency score of 0.1.

Referring again to FIG. 17, in an operation 1732, each generic tree related as key-template pair and its associated score are stored in path models 1326.

In an operation 1734, a determination is made concerning whether the set of sample sentences includes another sentence. When the set of sample sentences includes another sentence, processing continues in operation 1704 to select a next sentence. When all of the sentences included in the set of sample sentences have been processed, processing continues in an operation 1736.

In an operation 1736, the building of path models 1326 is complete, and processing continues in an operation 1406 shown referring again to FIG. 14. Path models 1326 provide a dependency parse path variation that can be used to lessen path brittleness in NLU and NLG or other fields that use dependency parse paths.

Referring again to FIG. 14, in an operation 1406, a set of training sentences or utterances is received for a next intent to be processed. For example, the set of training sentences may be received using a third mouse 1314, a third keyboard 1312, a third microphone 1313, and/or a fourth display 1316.

Figure 19A:
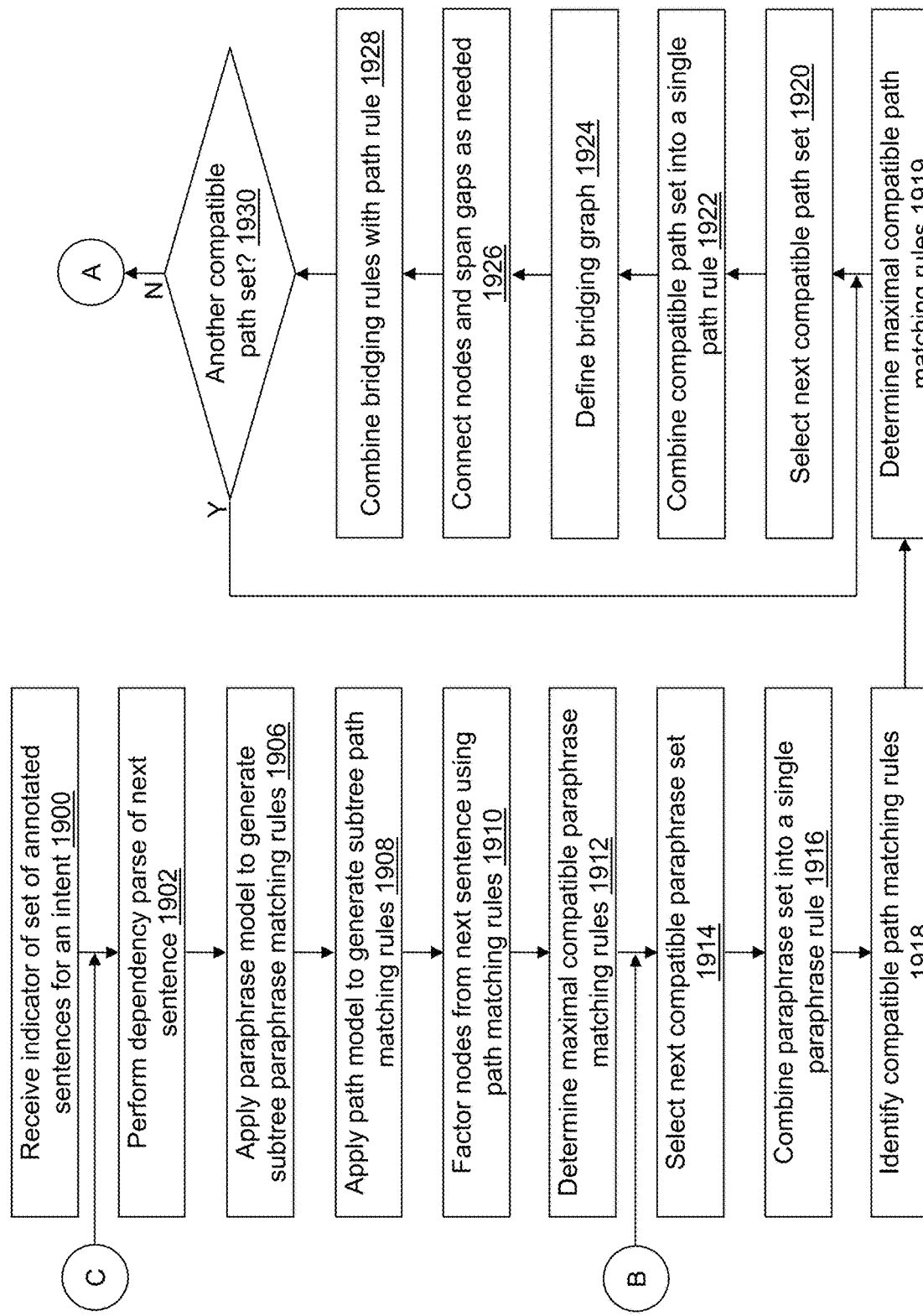
FIGS. 19A and 19B depict a flow diagram illustrating examples of operations performed by the semantic rules development device of FIG. 13 in building the intent semantic rules in accordance with an illustrative embodiment.
Figure 19B:
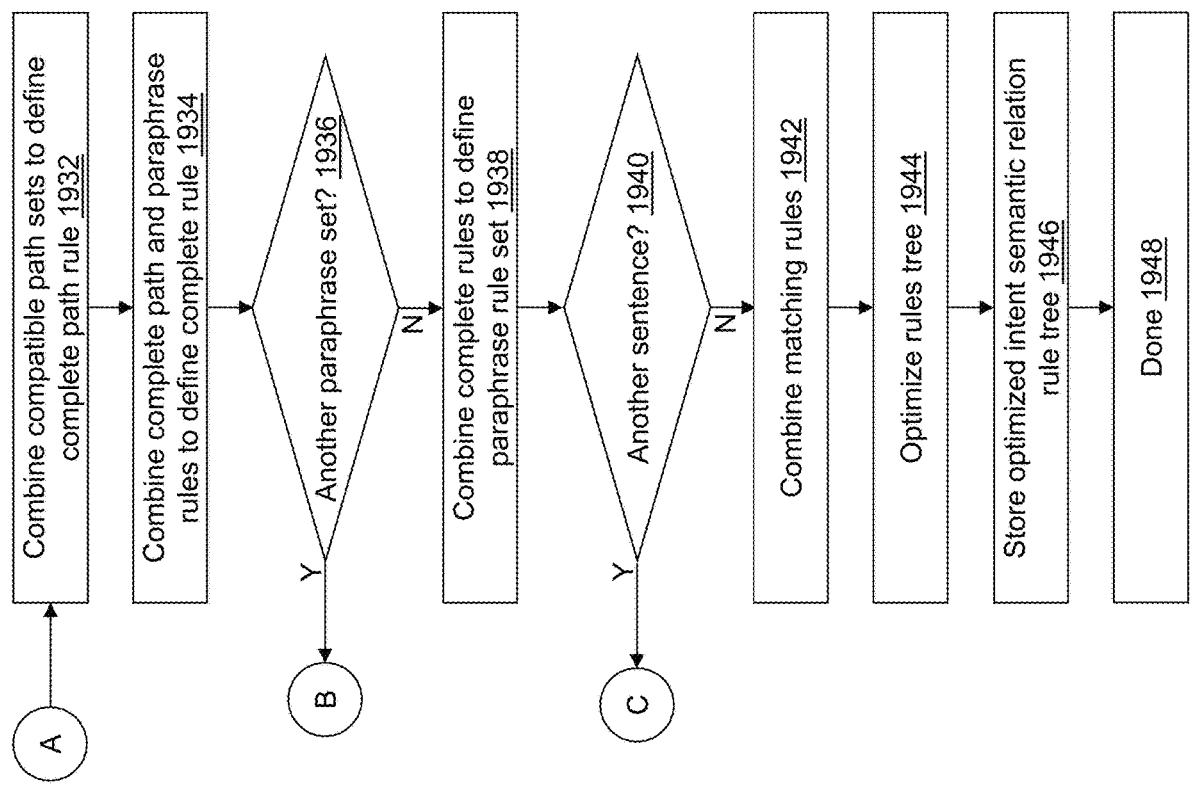

In an operation 1408, intent semantic rules 324 are built for the next intent. For example, referring to FIGS. 19A and 19B, example operations associated with semantic rules development application 1322 in building intent semantic rules 324 while applying paraphrase models 1324 and path models 1326 are described. Additional, fewer, or different operations may be performed depending on the embodiment. The order of presentation of the operations of FIGS. 19A and 19B is not intended to be limiting.

Figure 24A:
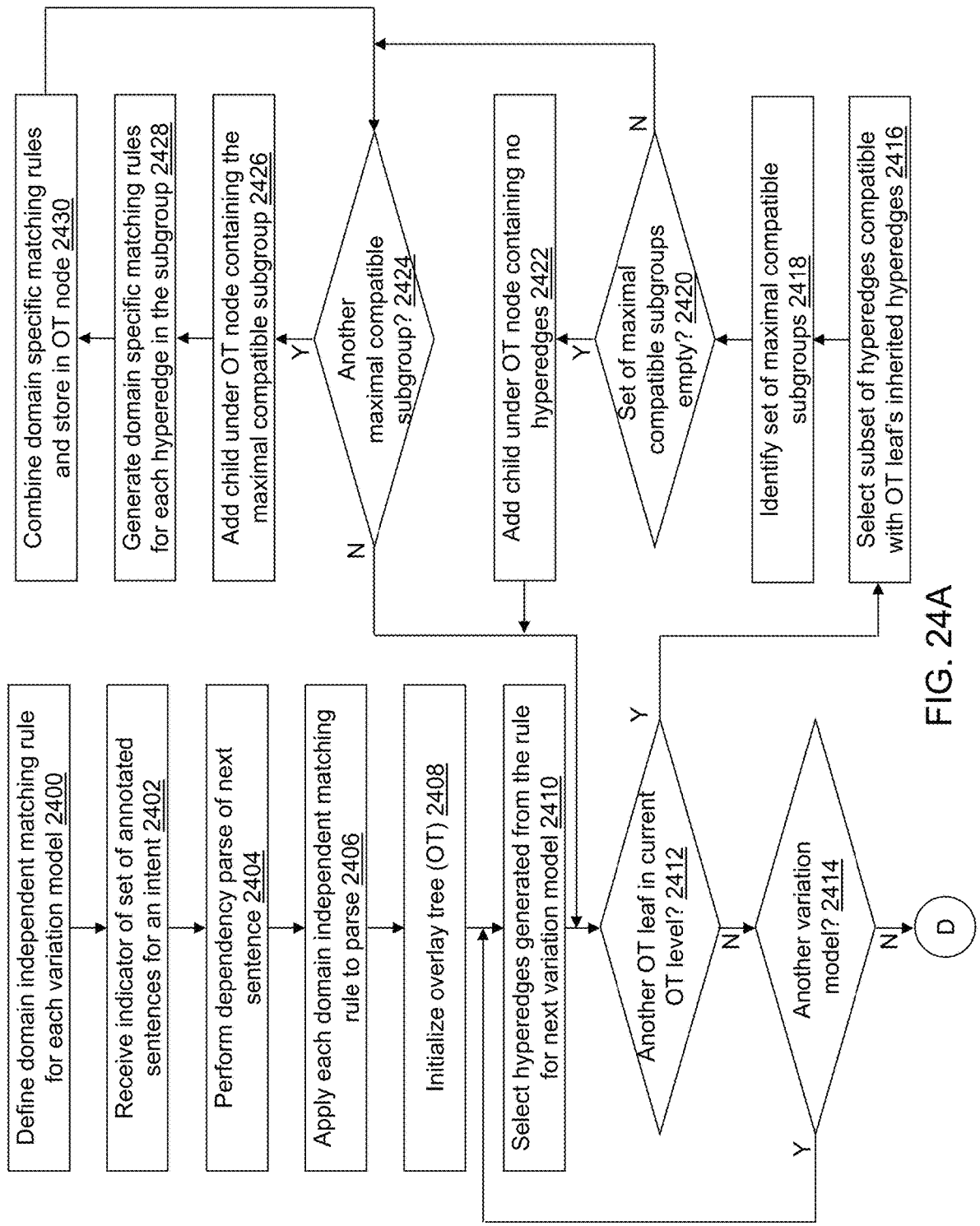
FIGS. 24A and 24B depict a flow diagram illustrating examples of operations performed by the semantic rules development device of FIG. 13 in building the intent semantic rules with a plurality of variation models in accordance with an illustrative embodiment.
Figure 24B:
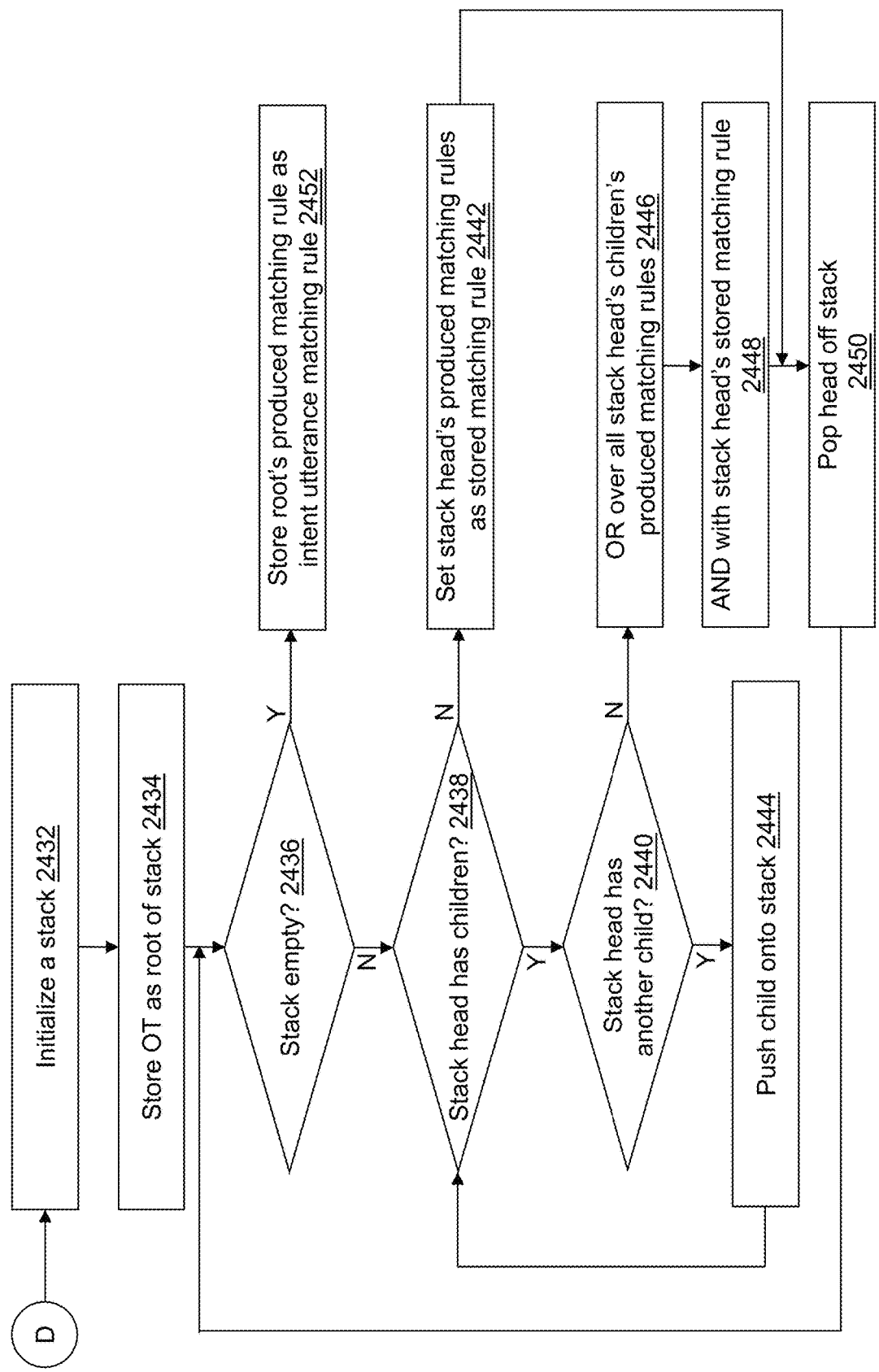

For example, referring to FIGS. 24A and 24B, example operations associated with semantic rules development application 1322 in building intent semantic rules 324 based on a plurality of variation models are described. Paraphrase models 1324 and path models 1326 are illustrative variation models. Additional, fewer, or different operations may be performed depending on the embodiment. The order of presentation of the operations of FIGS. 24A and 24B is not intended to be limiting.

Referring to FIGS. 20A to 20E, concepts for building intent semantic rules 324 are illustrated graphically in accordance with an illustrative embodiment. Referring to FIGS. 21A to 21F, aspects of building intent semantic rules 324 are illustrated graphically in accordance with an illustrative embodiment. Referring to FIGS. 22A to 22I, aspects of building intent semantic rules 324 are further illustrated graphically in accordance with an illustrative embodiment.

As background, a hypergraph is a graph that can contain hyperedges. A hyperedge is an edge that can contain one or more endpoints rather than the usual exactly two. For illustration, referring to FIG. 20A, a first hypergraph 2000 includes a first hyperedge 2002 denoted as "e1" that has two endpoints denoted as "3" and "4" and a second hyperedge 2004 denoted as "e2" that has three endpoints denoted as "5" "6", and "7".

Two hyperedges are compatible if they overlap by no more than one endpoint. For example, referring to FIG. 20B, e1 and e3 are compatible, e3 and e4 are incompatible, and e2 and e4 are compatible. A set of hyperedges where no two members are incompatible is called a compatible set of hyperedges. For example, {e1, e2, e3} is a compatible set, {e1, e2, e4} is a compatible set, and {e1, e3, e4} is not a compatible set. Given a set S of hyperedges and C that is a subset of S, C may be called a maximal compatible subset of S, if C is a compatible set, and adding any new hyperedge from S to C will make C no longer a compatible set. For example, when S is {e1, e2, e3, e4}, {e1, e2, e3} is a maximal compatible set and {e1, e2} is not a maximal compatible set.

An overlay is a set of graph edges overlaid on a parent overlay. More formally, an overlay includes a set of edges and inherits other edges from ancestor overlays. For example, referring to FIG. 20C, a first generated graph 2010, a second generated graph 2012, and a third generated graph 2014 are shown that are generated graphs of three different overlays. First generated graph 2010 is an empty overlay that may be designated as overlay zero (o0). Second generated graph 2012 may be designated as overlay one (o1) and contains {e1, e3, e4} and o0 because it trivially inherits o0's edges of which there are none and adds hyperedges e1, e3, and e4. Third generated graph 2014 that may be designated as overlay two (02) contains {e7} and o1 because it inherits e1, e3, and e4 from o1 and adds e7. Inherited edges may be expressed implicitly by parent-child relationships between overlays, meaning, for third generated graph 2014, only e7 would be shown, with a visual link from third generated graph 2014 to second generated graph 2012.

An overlay tree is a tree where each tree node contains an overlay that inherits from the overlay in the parent node where the inherited edges within each overlay are not shown for simplicity. For example, referring to FIG. 20D, a root of an overlay tree 2020 is an empty overlay such as first generated graph 2010 that does not include any hyperedges. A first child generated graph 2022 of the root generated graph includes hyperedges e1 and e2, and a second child generated graph 2024 of the root generated graph includes hyperedges e3 and e4. A first grandchild generated graph 2026 of first child generated graph 2022 inherits hyperedges e1 and e2 though not shown and includes hyperedges e5 and e6. A first grandchild generated graph 2028 of second child generated graph 2024 inherits hyperedges e3 and e4 though not shown and includes hyperedge e7. A second grandchild generated graph 2030 of second child generated graph 2024 inherits hyperedges e3 and e4 though not shown and includes hyperedge e2. A first final generated graph 2032 is a leaf of the overlay tree and is defined by first child generated graph 2026 of first child generated graph 2022 though now showing all of the hyperedges. A second final generated graph 2034 is a leaf of the overlay tree and is defined by first child generated graph 2028 of second child generated graph 2024 though now showing all of the hyperedges. A third final generated graph 2036 is a leaf of the overlay tree and is defined by second child generated graph 2030 of second child generated graph 2024 though now showing all of the hyperedges. Each final generated graph is an alternative graph generated from overlay tree 2020.

Figure 20B:
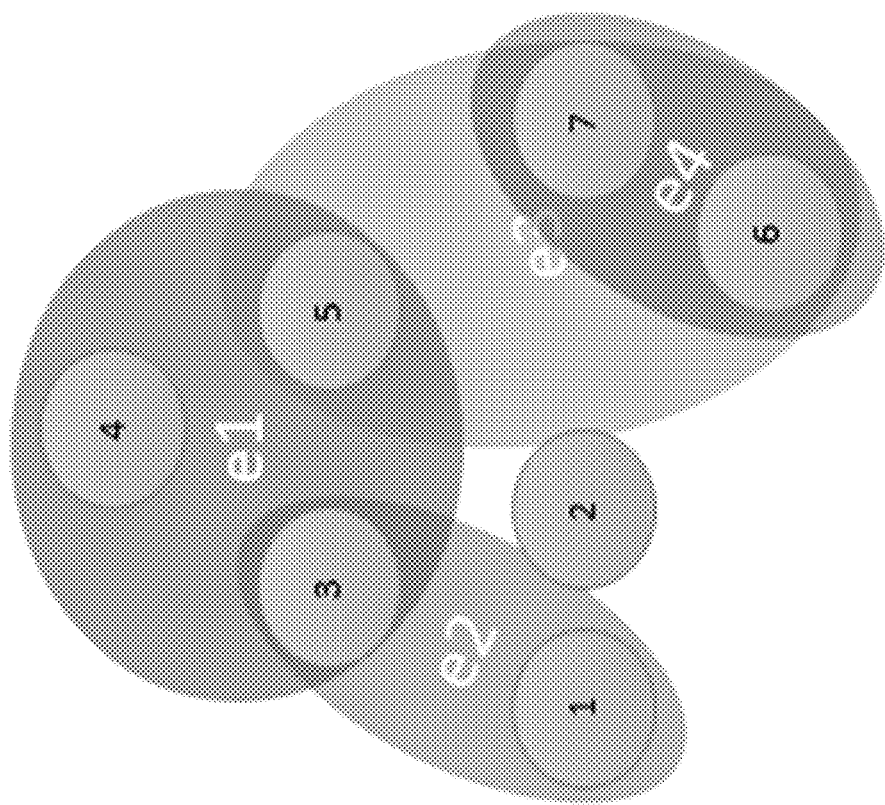
Figure 20A:
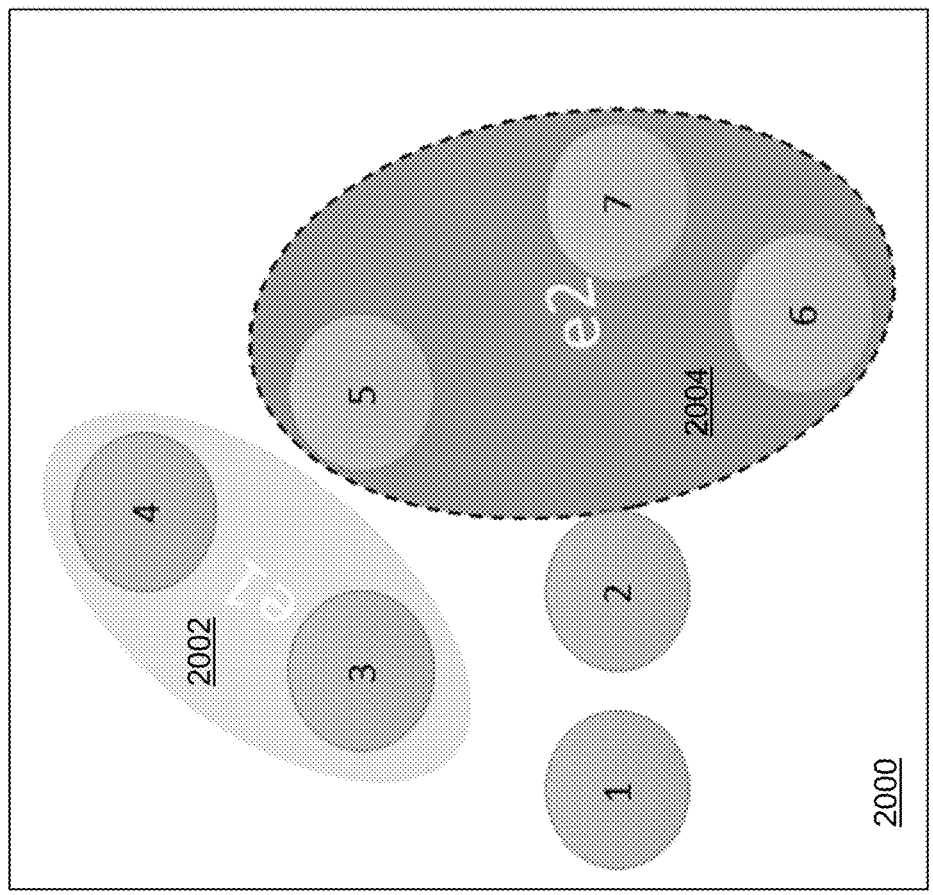
Figure 20E:
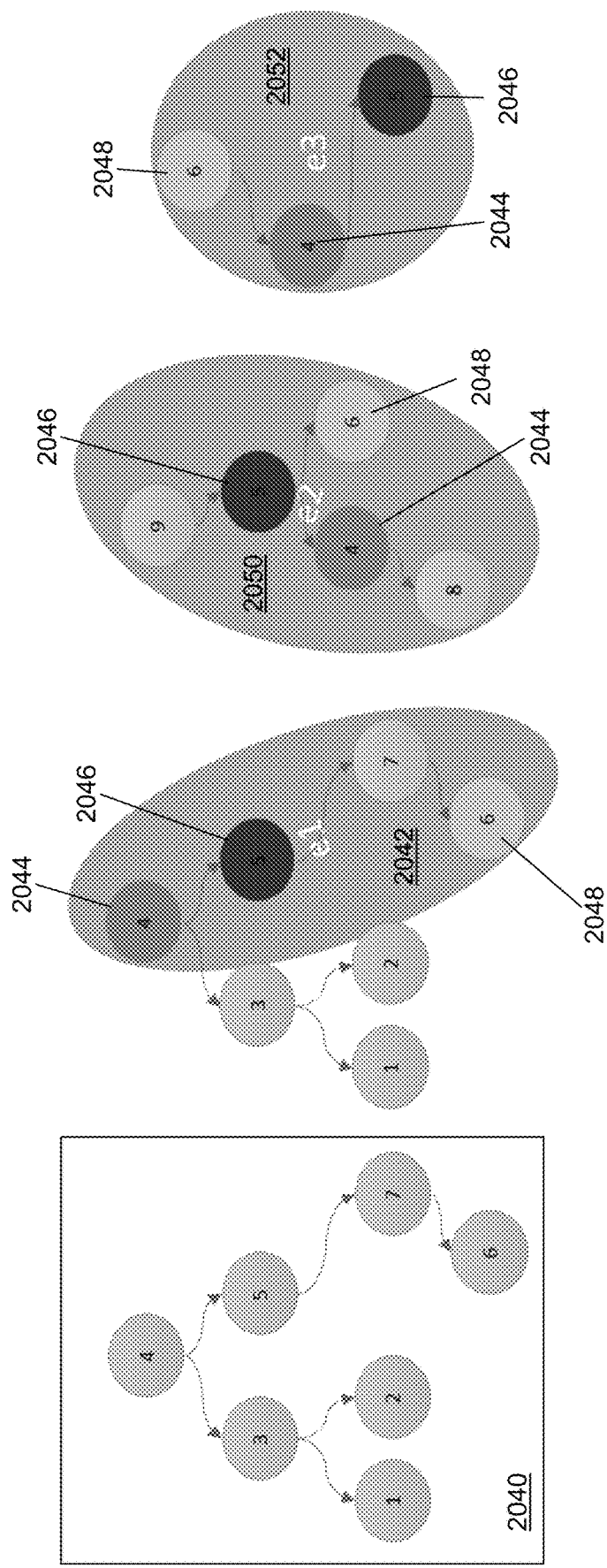
Figure 21B:
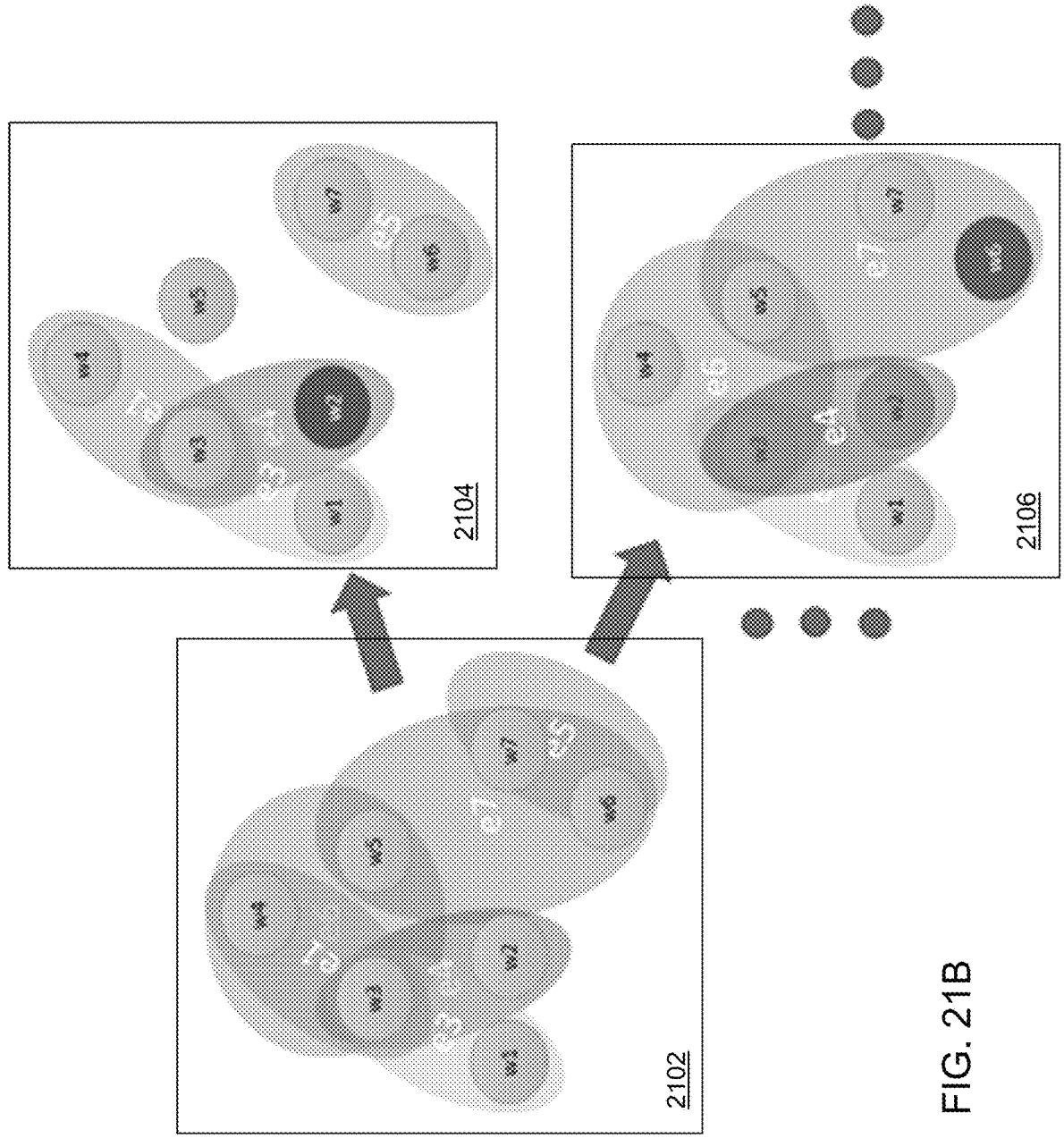
Figure 21D:
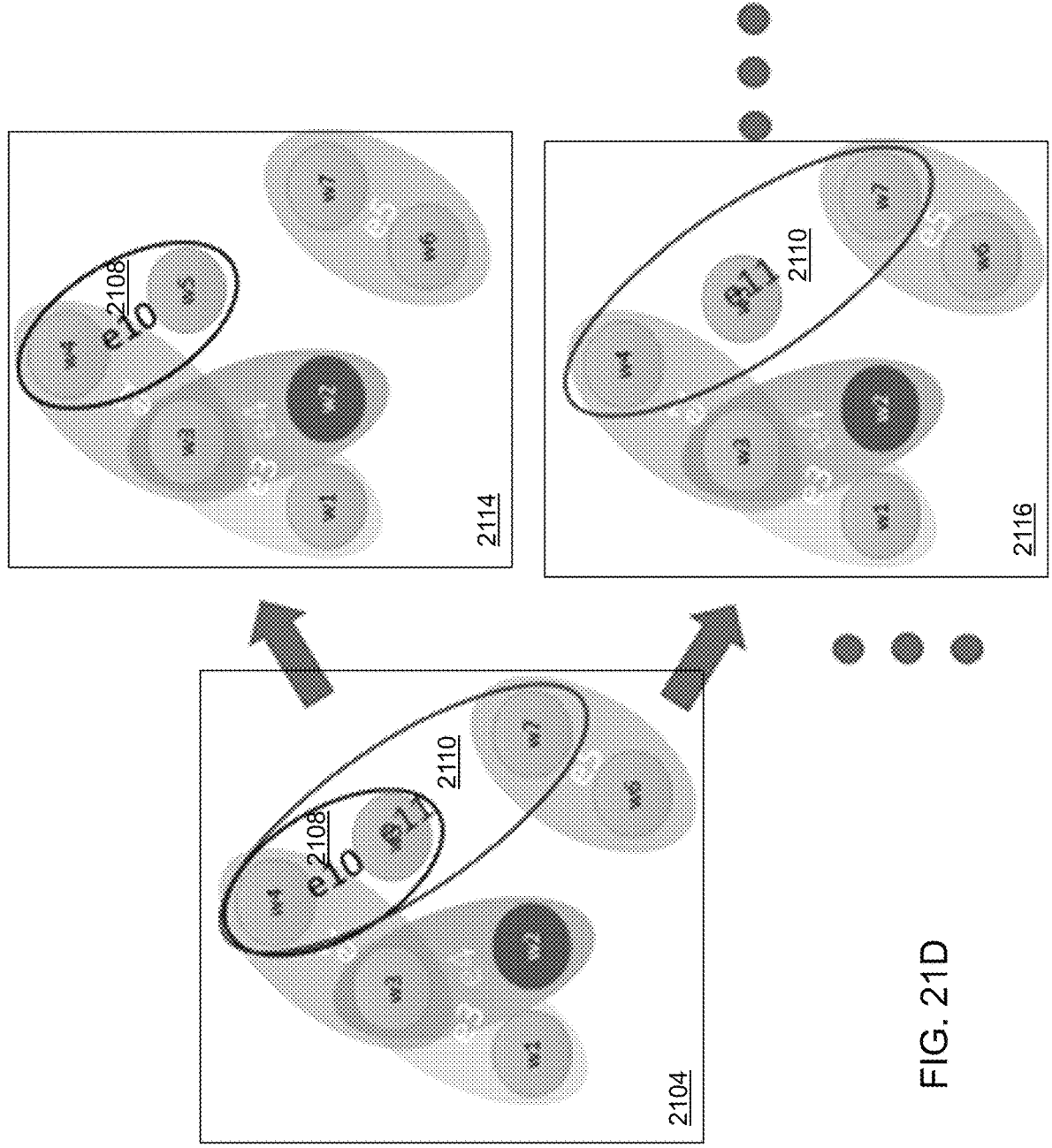
Figure 21F:
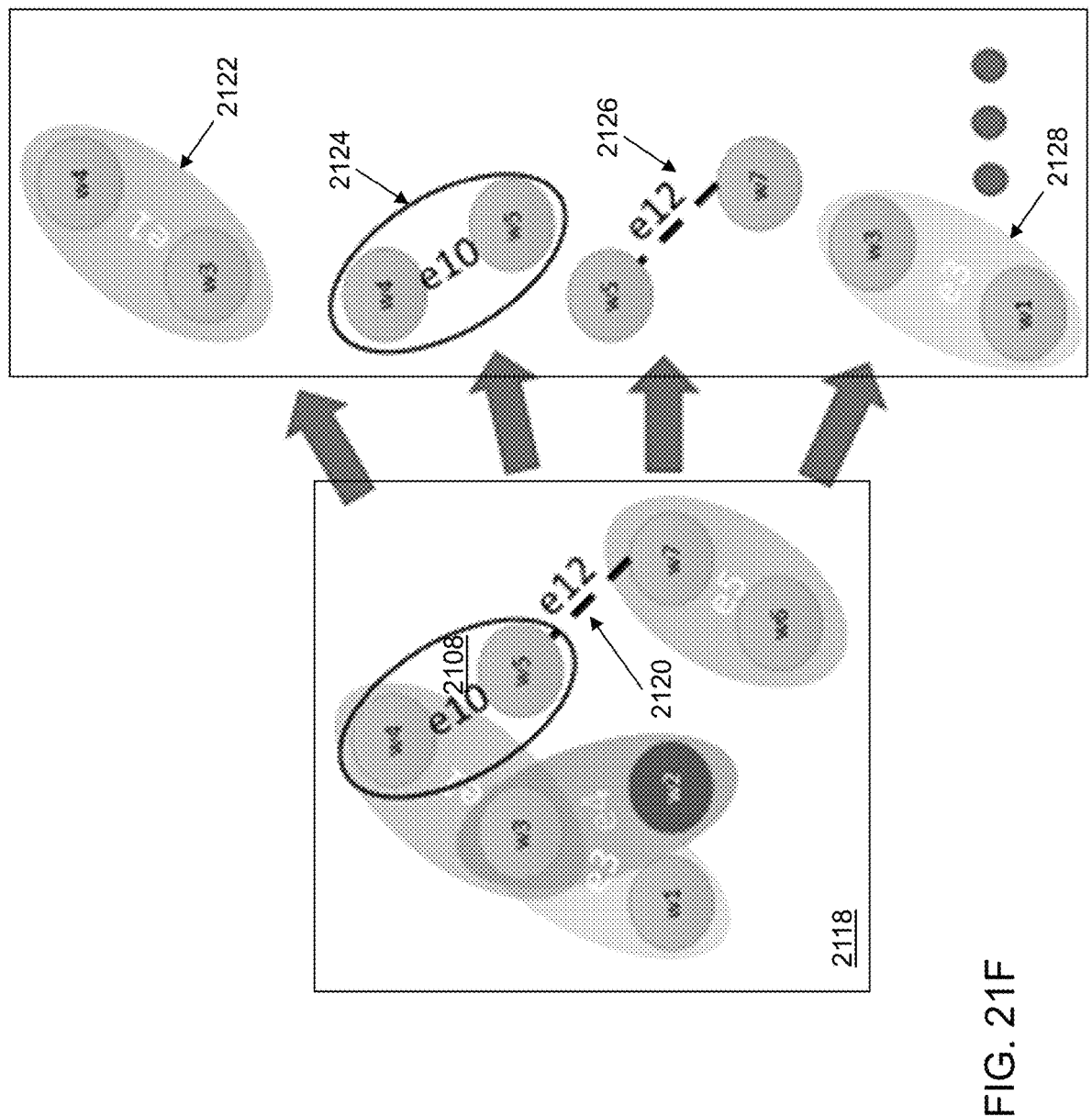

A semantic (hyperedge) model is composed of semantic equivalence classes. A semantic equivalence class has a set of node role labels and matches a variety of subgraphs considered equivalent. A hyperedge covering the matched subgraph may be output for the associated semantic equivalence class. The following metadata may be attached to the hyperedge: node role assignments and a link back to the associated semantic equivalence class. Referring to FIG. 20E, starting with a graph 2040, a semantic equivalence class includes a role r1 associated with a first node 2044 of graph 2040, a role r2 associated with a second node 2046 of graph 2040, and a role r3 associated with a third node 2046 of graph 2040. Applying the semantic equivalence class with roles {r1, r2, r3}, a hyperedge e1 may be generated. The equivalence class can later be used to take these nodes and produce class-equivalent hyperedges in a new graph from them such as a second hyperedge 2050 denoted e2 or a third hyperedge 2052 denoted e3. Node role labels can be used to align and translate between different hyperedges produced by the same equivalence class.

Referring to FIG. 19A, in an operation 1900, a sixth indicator may be received that indicates a set of annotated intent sentences for a specific intent. As an example, the sixth indicator may be received by semantic rules development application 1322 after receipt from third microphone 1313, third keyboard 1312, third mouse 1314, or fourth display 1316 or through fourth communication interface 1306, etc. For example, a linguist or developer defines a list of sentences where the entities are properly annotated with what intent they represent and the types and slots of relevant terms in each sentence are defined. Semantic rules development application 1322 builds dependency parse matching rules from the set of annotated intent sentences expanding the matching capability to cover expressive paraphrases of the set of annotated intent sentences as well as to cover potential misparses, thereby reducing the inherent brittleness of dependency parse matching systems.

In an operation 1902, a dependency parse of each annotated intent sentence included in the set of annotated intent sentences is performed. When the sentence includes a plurality of sentences, a plurality of ordered dependency parses is created. A variety of structures may be received due to an inherent brittleness of dependency parsers. Referring to FIG. 21A, a first sentence of the set of sample intent sentences is dependency parsed as shown by a first dependency parse graph 2100.

Referring again to FIG. 19A, in an operation 1906, paraphrase models 1324 are applied to the dependency parse of each sentence of the set of annotated intent sentences to generate subtree paraphrase matching rules based on pattern matching. The identifiers are updated to be domain specific, lemmas are filled in from the input dependency parse for non-lexeme nodes in template trees that had identifiers but no lemmas, multi word term lexemes are corrected, etc. The slot nodes for each subtree paraphrase matching rule are recorded and are build-time claimed nodes. All nodes (slot nodes or otherwise) are added to a runtime record extracted as described below that are runtime claimed nodes.

In an operation 1908, path models 1326 are applied to the dependency parse of each sentence of the set of annotated intent sentences to generate subtree misparse matching rules using pattern matching. The identifiers are updated to be domain specific, and lemmas are filled in from the input dependency parse for non-lexeme nodes. The slot nodes for each subtree path matching rule are recorded and are build-time claimed nodes. All nodes (slot nodes or otherwise) are added to a runtime record extracted as described below that are runtime claimed nodes.

In an operation 1910, the generated subtree paraphrase matching rules and the generated subtree misparse matching rules are factored to define a map from the subset of nodes of the next sentence to the matching rules that cover all and only the particular nodes of the subset of nodes. For example, a map is made where the key is a set of nodes and the value is a set of matching rules. For each matching rule of the mapping, a set keyed by the mapping rules covered nodes is created or identified, and the matching rule is added to the set resulting in a mapping from sets of covered nodes to a set of corresponding matching rules. Further processing applies the node sets and expands them back out to the matching rules later. For illustration, referring to FIG. 21A, paraphrase class matches 2102 are shown for first dependency parse graph 2100 that includes hyperedges e1, e3, e4, e5, e6, and e7.

Referring again to FIG. 19A, in an operation 1912, maximal compatible paraphrase matching rules are determined from the defined paraphrase matching rules for the next sentence. The maximal compatible paraphrase matching rules are compatible because they can be combined using a logical "AND" operation without automatically disqualifying some of their paraphrase forms and are maximal because there should be no more unadded compatible paraphrase matching rules to add to the set.

In an operation 1914, a next compatible paraphrase set is selected from the maximal compatible paraphrase matching rules. For illustration, referring to FIG. 21B, paraphrase class matches 2102 are converted to a first compatible paraphrase match 2104, a second compatible paraphrase match 2106, etc. First compatible paraphrase match 2104 includes hyperedges e1, e3, e4, and e5. Second compatible paraphrase match 2106 includes hyperedges e3, e4, e6, and e7. First compatible paraphrase match 2104 may be selected as the next coherent paraphrase set on a first iteration of operation 1914, second compatible paraphrase match 2106 may be selected as the next coherent paraphrase set on a second iteration of operation 1914, etc.

Referring again to FIG. 19A, in an operation 1916, the hyperedges included in the selected compatible paraphrase set are combined using an "AND" operation into a single paraphrase rule.

In an operation 1918, path matching rules that individually are compatible with the single paraphrase rule are identified. Path matching rules have corresponding nodes that they were generated from. These are treated as hyperedges so rule compatibility is hyperedge compatibility. For illustration, referring to FIG. 21C, a first path class 2108 labeled hyperedge "e10" and a second path class 2110 labeled hyperedge "e11" are compatible with first compatible paraphrase match 2104.

Referring again to FIG. 19A, in an operation 1919, maximal compatible path matching rules are determined from the identified path matching rules. For illustration, referring to FIG. 21D, a first maximal compatible path matching rules 2114 includes first path class 2108 and a second maximal compatible path matching rules 2116 includes second path class 2110.

Referring again to FIG. 19A, in an operation 1920, a next compatible path set is selected from the maximal compatible path matching rules. First maximal compatible path matching rules 2114 may be selected as the next compatible path set on a first iteration of operation 1920, second maximal compatible path matching rules 2116 may be selected as the next compatible path set on a second iteration of operation 1920, etc.

In an operation 1922, the hyperedges included in the selected compatible path set are combined using a logical "AND" operation into a single path rule.

In an operation 1924, a bridging graph is defined that includes each element of the compatible paraphrase set.

In an operation 1926, each set of nodes in each element of the compatible paraphrase set is connected in the bridging graph. Wherever there is a gap in connectivity in the bridging graph as defined by the dependency parse, a subtree matching rule that spans the gap is defined. For illustration, referring to FIG. 21E, a bridging graph 2118 is defined from first maximal compatible path matching rules 2114 and includes a subtree matching rule 2120 that spans a gap between first path class 2108 and hyperedge e5.

Referring again to FIG. 19A, in an operation 1928, any subtree matching rule that spans any gap is combined with the single path rule using a logical "AND" operation to define a path rule.

In an operation 1930, a determination is made concerning whether another compatible path set is to be processed. When another compatible path set is to be processed, processing continues in operation 1920 to process the next compatible path set. When another compatible path set is not to be processed, processing continues in an operation 1932 shown referring to FIG. 19B.

In operation 1932, the hyperedges that define each defined path rule are combined using a logical "OR" operation to define a combined path rule. For illustration, referring to FIG. 21F, bridging graph 2118 includes a first hyperedge 2122, a second hyperedge 2124, a third hyperedge 2126, a fourth hyperedge 2128, etc. that are combined in a rule using the logical "OR" operation.

Referring again to FIG. 19B, in an operation 1934, the combined path rule is combined with the single paraphrase rule using a logical "AND" operation to define a combined rule.

In an operation 1936, a determination is made concerning whether there is another compatible paraphrase set to process. When there is another coherent paraphrase set to process, processing continues in operation 1914 to process the next compatible paraphrase set. When there is not another compatible paraphrase set to process, processing continues in an operation 1938.

In operation 1938, results from each defined combined rule are combined using a logical "OR" operation to define a paraphrase rule set.

Referring again to FIG. 19B, in an operation 1940, a determination is made concerning whether the set of annotated intent sentences includes another intent sentence. When the set of annotated intent sentences includes another intent sentence, processing continues in operation 1902 to process the next intent sentence. When the set of annotated intent sentences does not include another intent sentence, processing continues in an operation 1942.

In operation 1942, results from each defined paraphrase rule set are combined using a logical "OR" operation to define an intent rule tree. In the illustrative embodiment, paraphrase models 1324 have primary control over expanding the sentence to a matching rule, while path models 1326 have secondary control further filling in possible gaps left by paraphrase models 1324, and bridging any remaining gaps to define a matching rule that matches many variations (paraphrase or misparse) of the semantics expressed in the set of annotated intent sentences.

In an operation 1944, the intent rule tree is optimized. Because the intent rules are combined in a logical tree, factoring, simplification, and other logical processes can be applied to reduce a size of the intent rule tree to optimize run time performance.

In an operation 1946, the optimized intent rule tree is stored in intent semantic rules 324 rules with one optimized intent rule tree defined for each intent.

In an operation 1948, the building of intent semantic rules 324 is complete for the next intent, and processing continues in an operation 1410 shown referring to FIG. 14.

To summarize, given a set of models of syntactic variation, ordered in decreasing semantic complexity, the model applications can be combined to a dependency parse by letting a sentence be represented by a hypergraph H, where each node is a word or domain term. This graph can be turned into a variety of graphs, depending on which set of hyperedges are overlaid on the nodes. The edge sets are called overlays. To capture the variety of overlays, a list of overlays can be alternatively expressed as a tree of overlay extensions which can be called the overlay tree. The overlay tree is initialized with a root node containing an empty overlay. Each model is applied to the parse of the sentence to generate a set of subtree matches treated as a set of hyperedges for each model. For each model and for each leaf of the overlay tree, a subset of the set of hyperedges is obtained by taking only hyperedges not incompatible with hyperedges in this branch of the overlay tree. Compatibility can be determined in a number of ways such as limiting the node overlap to one. The subset of the set of hyperedges is split into maximal compatible subgroups where members are not incompatible with each other. The overlay tree branch is split and the maximal subgroup is placed in each new leaf of the branching. The process is repeated for each model. The overlay tree is converted into a logical expression of semantic alternatives by treating parent-child relationships in an overlay tree using a logical AND operation and sibling relationships using a logical OR operation.

For further illustration regarding the building of intent semantic rules 324, referring to FIG. 22A, given a graph 2200 and a set of semantic models ranked by some priority (e.g. semantic richness) {m1, m2, m3}, in a first step, all of the hyperedges from the models m1, m2, m3 are identified. For example, all hyperedges from a first model 2202, from a second model 2204, and from a third model 2206 are identified.

Figure 22B:
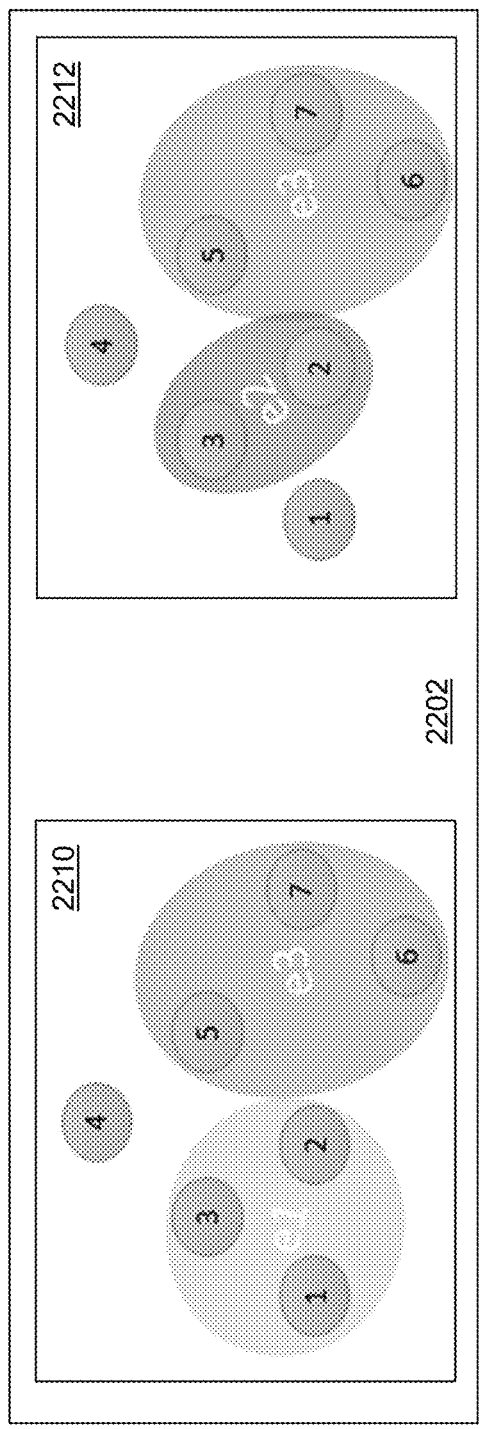
Figure 22C:
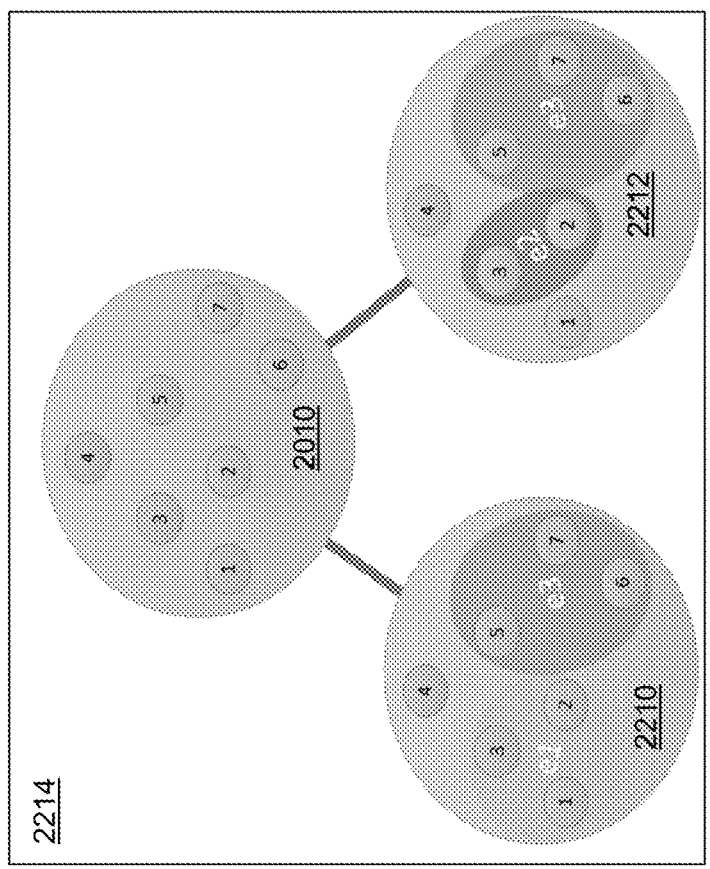

Referring to FIG. 22B, an overlay tree initially has a single root node that is a single leaf as well. For example, first generated graph 2010 is an empty overlay in an initial overlay tree. A first generation of leaves is added to the overlay tree based on first model 2202. A set of m1 hyperedges that are compatible with all hyperedges in the generated graph of that leaf are identified. First model 2202 includes a first maximal compatible subset 2210 and a second maximal compatible subset 2212. Note that all m1 hyperedges are compatible with the empty overlay. The maximal compatible subsets of each leaf of the overlay tree become the next generation under the leaf. For illustration, referring to FIG. 22C, first maximal compatible subset 2210 and second maximal compatible subset 2212 are added as leaves of first generated graph 2010 to define a second level overlay tree 2214. Second level overlay tree 2214 has three nodes and two leaves.

A second generation of leaves is added to the overlay tree based on second model 2204. A set of m2 hyperedges that are compatible with all hyperedges in the generated graph of an associated leaf are identified. Referring to FIG. 22D, second model 2204 includes a third maximal compatible subset 2218 that is a leaf of first maximal compatible subset 2210 and a fourth maximal compatible subset 2220 that is a leaf of second maximal compatible subset 2212. The maximal compatible subsets of each leaf of the overlay tree become the next generation under the leaf. Third maximal compatible subset 2218 is an empty overlay because no hyperedges of second model 2204 are compatible with first maximal compatible subset 2210. Fourth maximal compatible subset 2220 includes only e4 because e5 and e6 are not compatible with second maximal compatible subset 2212. A third level overlay tree 2216 has five nodes and two leaves.

A third generation of leaves is added to the overlay tree based on third model 2206. A set of m3 hyperedges that are compatible with all hyperedges in the generated graph of an associated leaf are identified. Referring to FIG. 22E, third model 2206 includes a fifth maximal compatible subset 2222 that is a leaf of third maximal compatible subset 2218, a sixth maximal compatible subset 2224 that is a leaf of third maximal compatible subset 2218, a seventh maximal compatible subset 2226 that is a leaf of fourth maximal compatible subset 2220, and an eighth maximal compatible subset 2228 that is a leaf of fourth maximal compatible subset 2220. The maximal compatible subsets of each leaf of the overlay tree become the next generation under the leaf. A fourth level overlay tree 2230 has nine nodes and four leaves.

Referring to FIG. 22F, a first graph 2232 is generated for the entire path from first generated graph 2010 to fifth maximal compatible subset 2222, a second graph 2234 is generated for the entire path from first generated graph 2010 to sixth maximal compatible subset 2224, a third graph 2236 is generated for the entire path from first generated graph 2010 to seventh maximal compatible subset 2226, and a fourth graph 2238 is generated for the entire path from first generated graph 2010 to eighth maximal compatible subset 2228. These graphs define the various possible alternative interpretations of the original graph that can be combined using a logical "OR" operation.

Figure 22G:
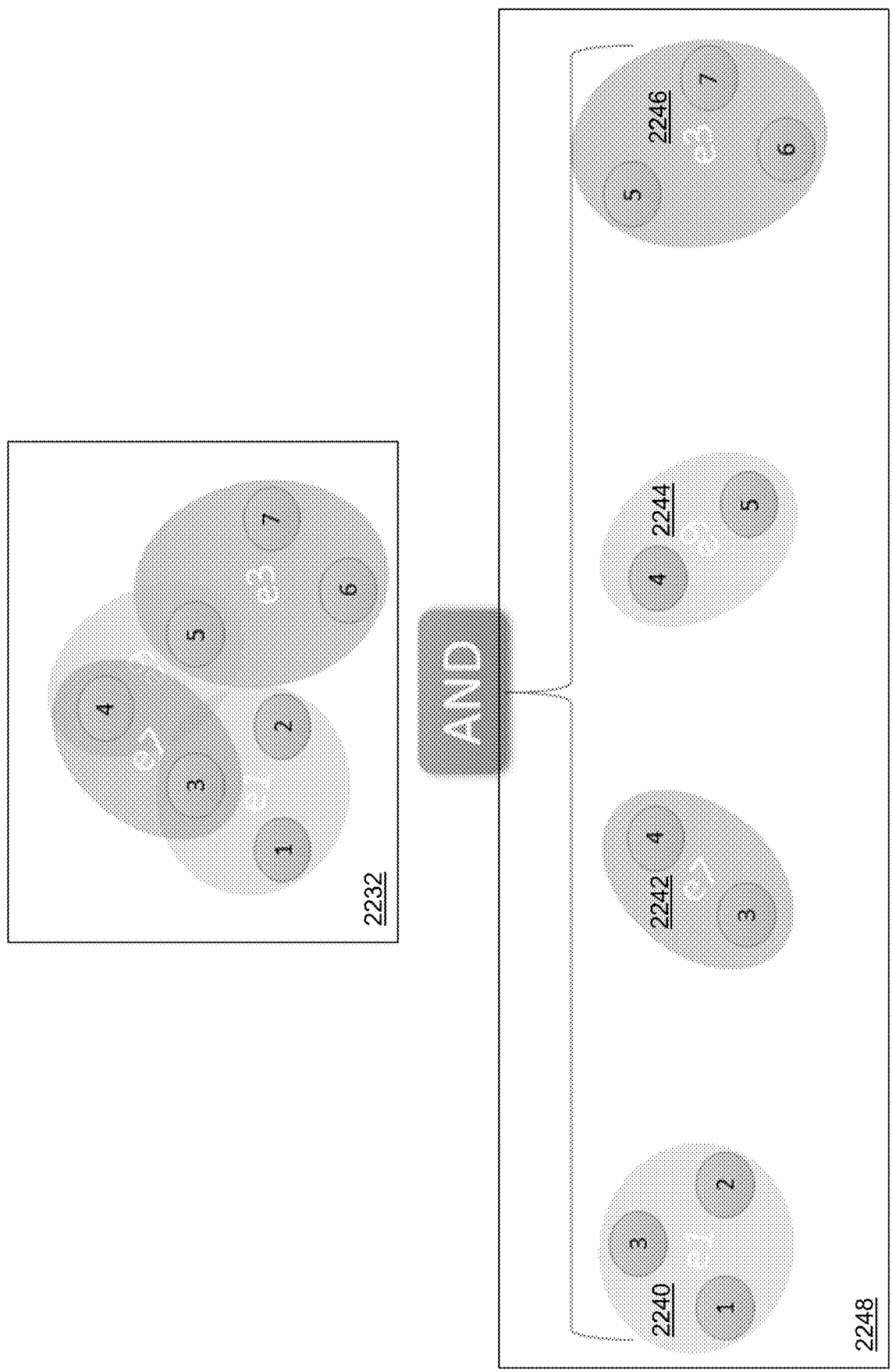
Figure 22H:
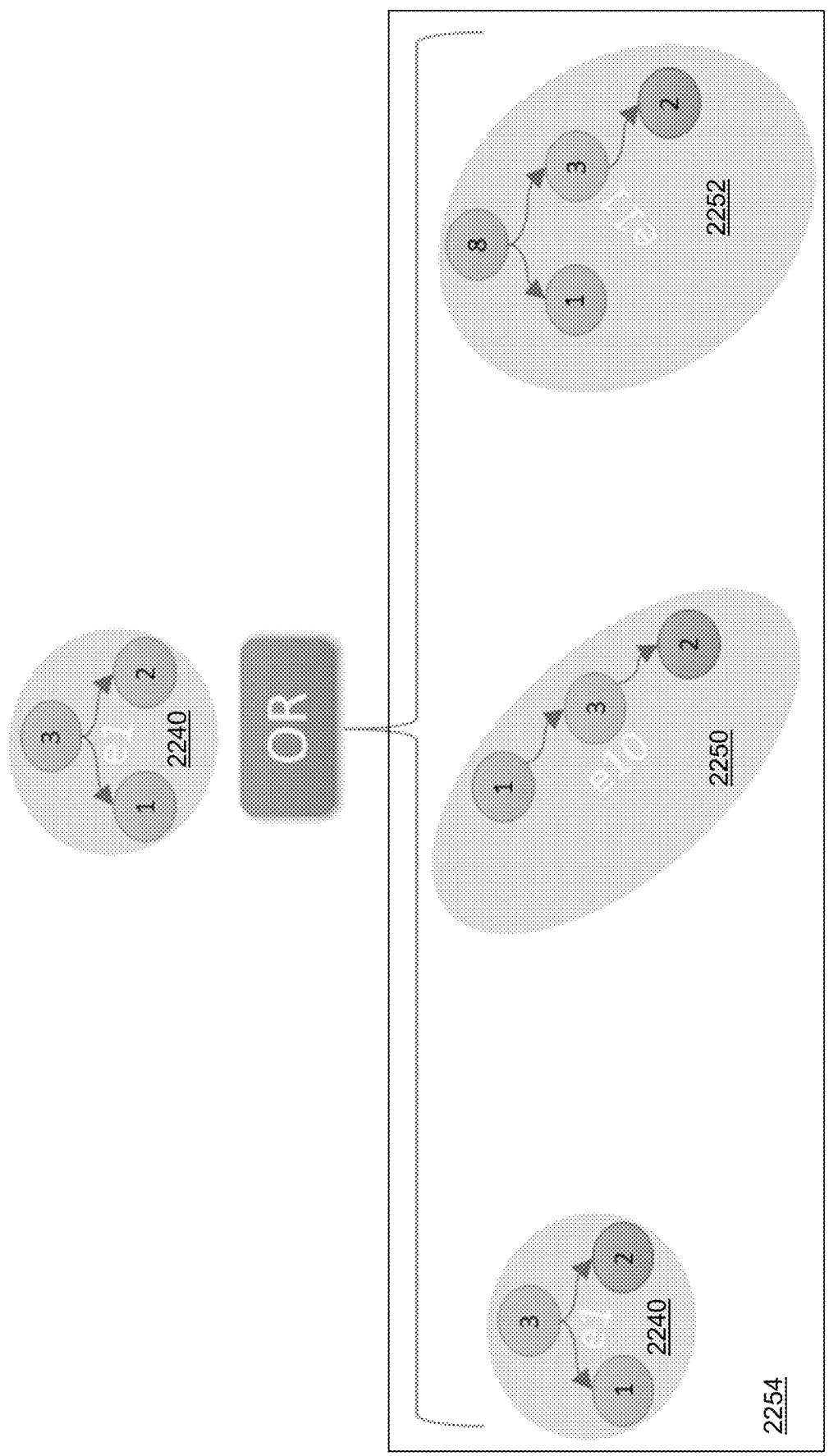

Referring to FIG. 22G, first graph 2232 can be re-visualized as a first hyperedge 2240, a second hyperedge 2242, a third hyperedge 2244, and a fourth hyperedge 2246 that can be combined using a logical "AND" operation. For better efficiency, the overlay tree can be used instead of a set of generated graphs 2248.

Each hyperedge links back to the semantic equivalence class that created it, and the semantic equivalence class can produce new class-equivalent hyperedges on a new graph, which means that the generated graphs can be logically expanded out to other possible graphs that have the same interpretation. For illustration, referring to FIG. 22H, first hyperedge 2240 can be reformulated as a disjunction of class equivalent hyperedges on different graphs such as first class equivalent hyperedge 2250 and second class equivalent hyperedge 2252 to define a set of class equivalent hyperedges 2254.

Figure 22I:
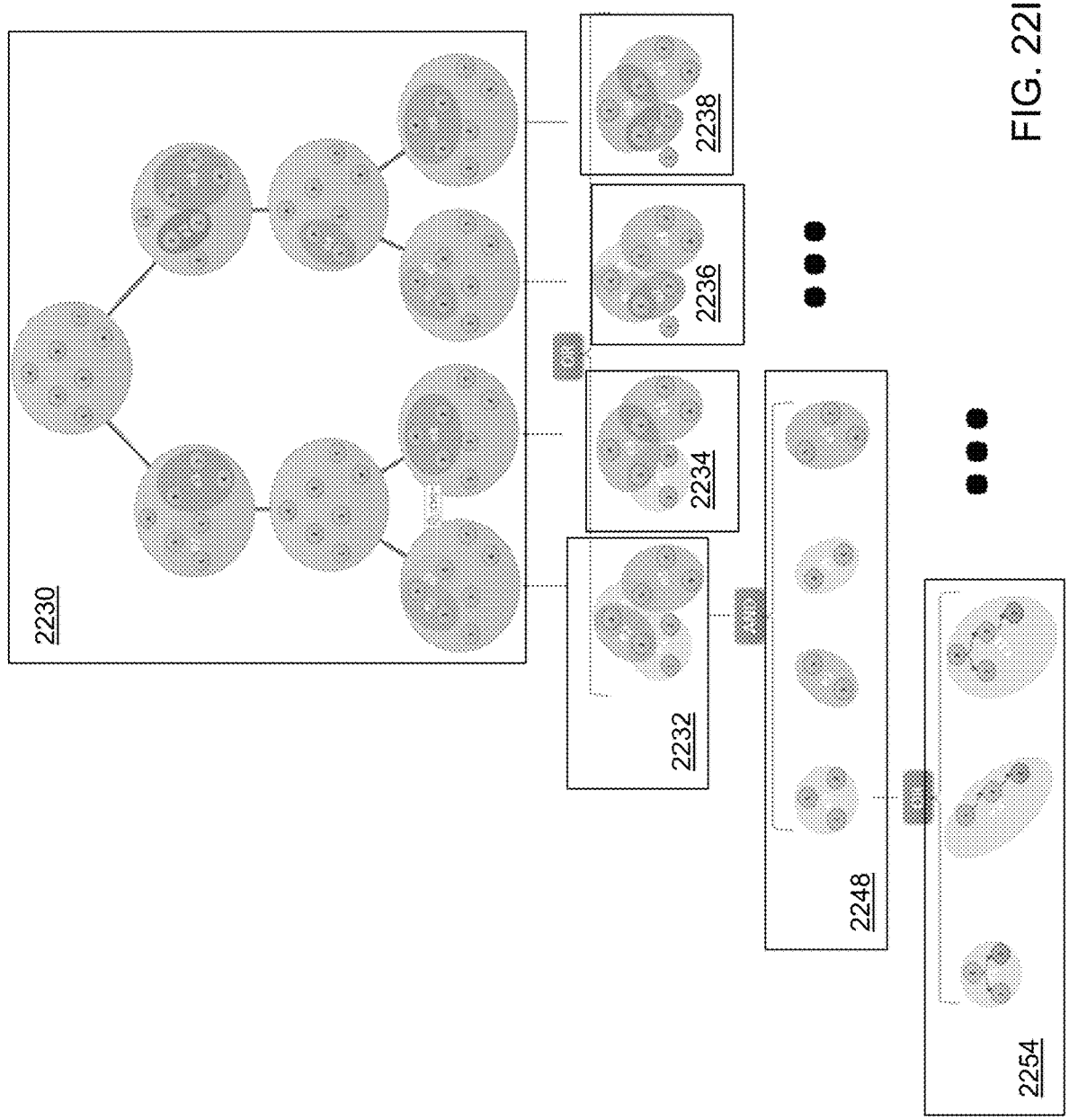

Referring to FIG. 22I, a summary of the process of building intent semantic rules 324 is illustrated graphically in accordance with an illustrative embodiment for three ordered models. After expanding the generated graph hyperedges, a final expanded data structure can be generated to define the intent rule tree. When combined logically over the entire overlay tree, the defined intent rule tree can be useful for many NLP tasks. For example, in NLU, the defined intent rule tree can be used to create graph matching rules, and in NLG, the defined intent rule tree can be used to generate new dependency parse trees.

Figure 25:
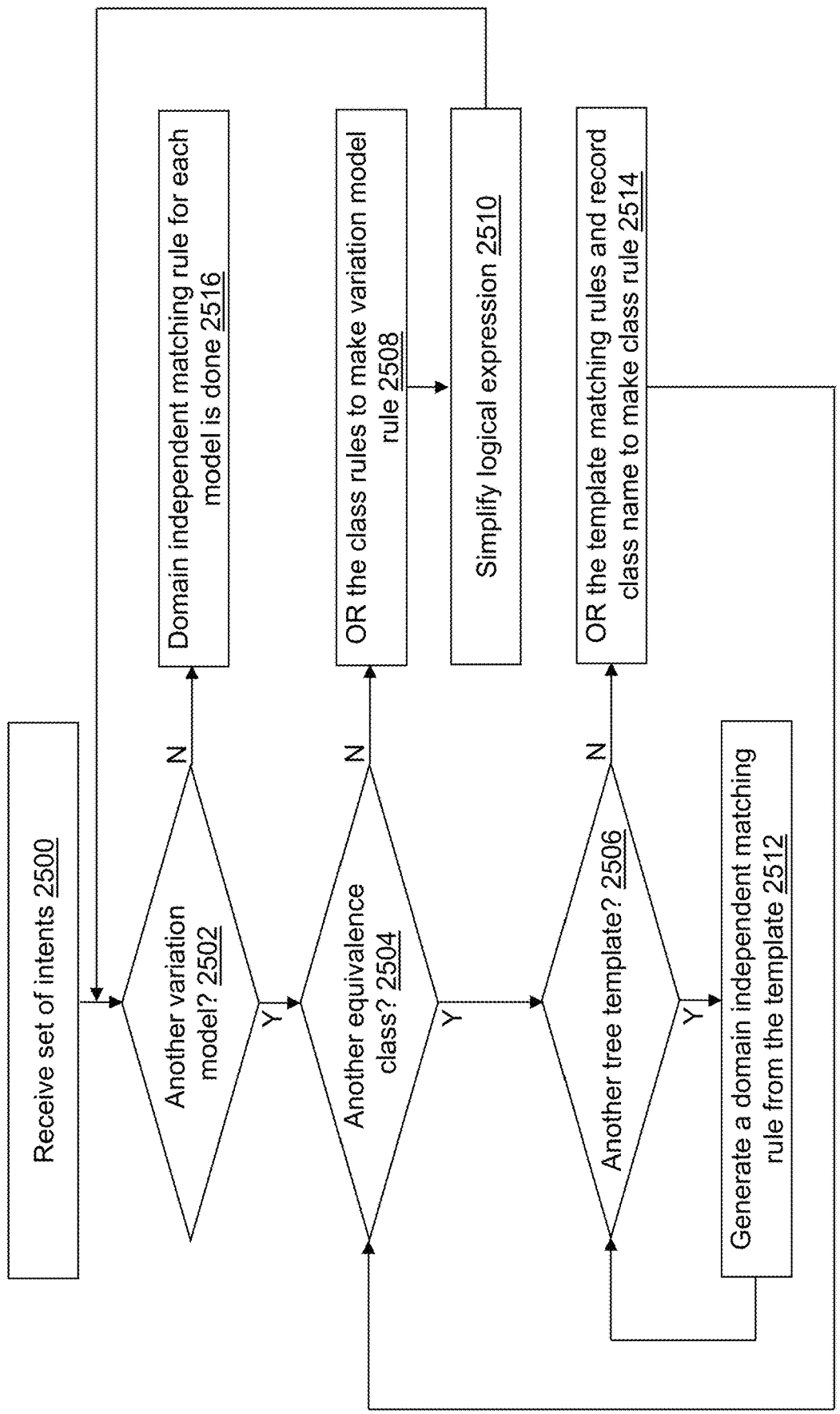
FIG. 25 depicts a flow diagram illustrating examples of operations performed by the semantic rules development device of FIG. 13 in building domain independent rules for the plurality of variation models in accordance with an illustrative embodiment.

As an alternative to FIGS. 19A and 19B, FIGS. 24A and 24B describe example operations associated with semantic rules development application 1322 in building intent semantic rules 324 based on a plurality of variation models. FIGS. 19A and 19B are a 3-variation model instance of more generic algorithm (shown in FIGS. 24A and 24B), using the 3 models: a semantic variation model, a path variation model, and a "bridging model" that contains edges from the utterance's dependency parse. Referring to FIG. 24A, in an operation 2400, a domain independent matching rule is defined for each variation model. For example, referring to FIG. 25, example operations associated with semantic rules development application 1322 in defining a domain independent matching rule for each variation model are described. Additional, fewer, or different operations may be performed depending on the embodiment. The order of presentation of the operations of FIG. 25 is not intended to be limiting.

In an operation 2500, a set of intents is received.

In an operation 2502, a determination is made concerning whether another variation model is defined. When another variation model is defined, a next variation model is selected, and processing continues in an operation 2504. When another variation model is not defined, processing continues in an operation 2516. Each variation model is a semantic (hyperedge) model. For example, referring to FIG. 26, a variation model structure is shown in accordance with an illustrative embodiment. As described above, a variation model has a set of tree equivalence classes. In each class, there are a set of genericized tree structures and a set of node labels/roles common to every tree in the class. The trees can be used as templates to create dependency parses (in NLG) or to create dependency parse subtree matching rules (in NLU), or possibly for other purposes. The trees are grouped so that if one is selected from a class, every tree from the class can be applied because they are considered semantically equivalent and due to how the node labels/roles are used to translate between them.

Paraphrase models 1324 and path models 1326 are two variation models. The paraphrase (semantic variation) model may be the $2^{nd}$ level of the overlay tree, the path model may be the 3rd level in the overlay tree, and the degenerate variation model (the original edges of the utterance's dependency parse) may the 4th level with the empty root is the 1st level.

Referring again to FIG. 25, in operation 2504, a determination is made concerning whether another equivalence class is defined for the variation model. When another equivalence class is defined, a next equivalence class is selected, and processing continues in operation 2506. When another equivalence class is not defined, processing continues in an operation 2508.

In operation 2506, a determination is made concerning whether another tree template is defined for the equivalence class. When another tree template is defined, a next tree template is selected, and processing continues in operation 2512. When another tree template is not defined, processing continues in an operation 2514.

In operation 2508, the class rules are combined using the logical "OR" operation to make the domain independent matching rule for the current variation model.

In an operation 2510, the logical expression that defines the domain independent matching rule for the current variation model may be simplified and processing continues in operation 2502 to select and process a next variation model, if any. For example, simplification is the same as simplifying predicate logical expressions by applying an Idempotent Rule, factoring common conjuncts or disjuncts, etc.

Figure 27:
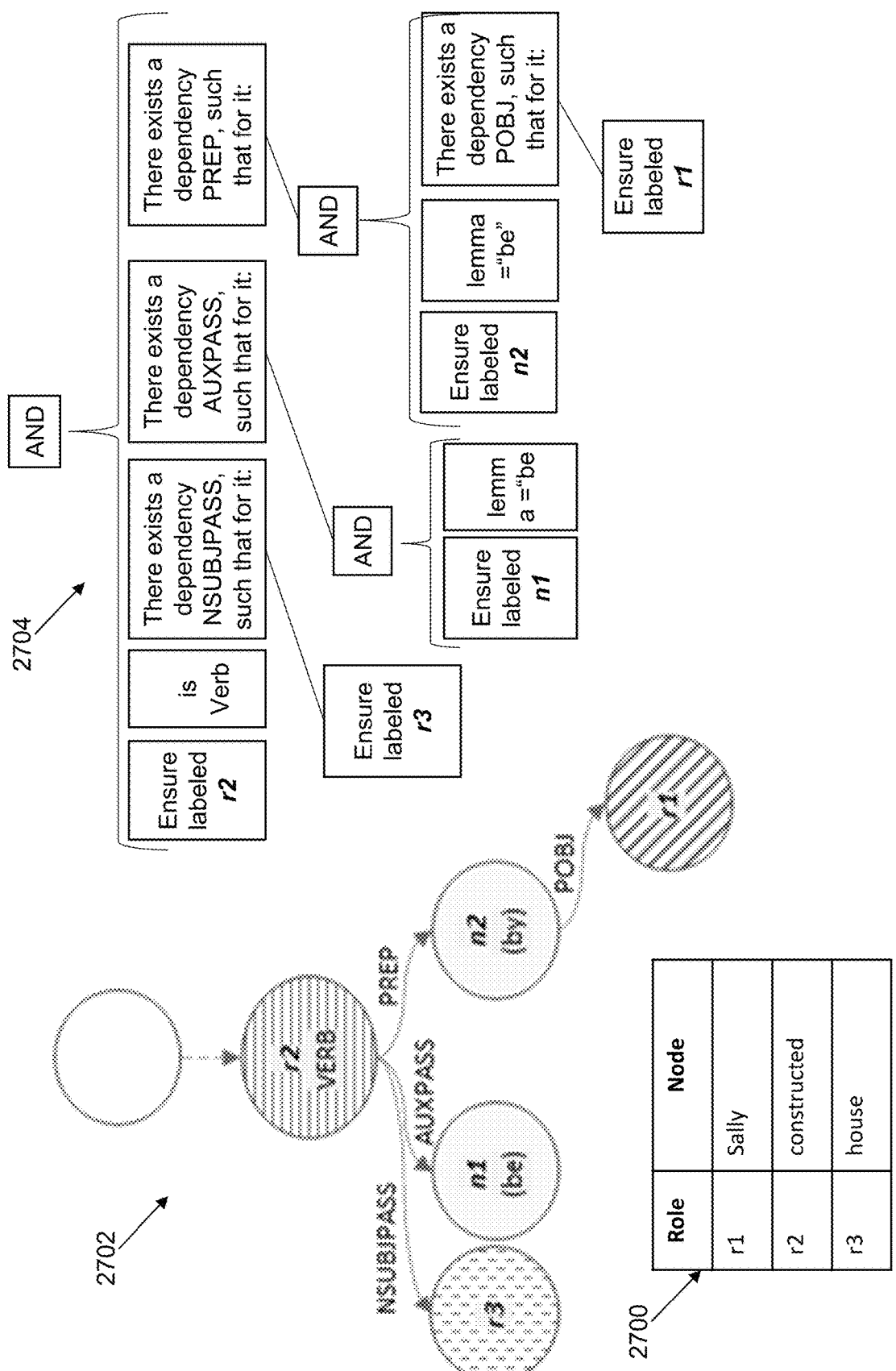
FIG. 27 graphically illustrates using a template tree structure to create a domain independent matching rule in accordance with an illustrative embodiment.

In operation 2512, a domain independent matching rule is generated from the current tree template, and processing continues in operation 2506 to select and process a next tree template, if any. For example, the identifiers are updated to be domain specific, and lemmas are filled in from the input dependency parse for non-lexeme nodes. The slot nodes for each subtree paraphrase matching rule are recorded and are build-time claimed nodes. All nodes (slot nodes or otherwise) are added to a runtime record extracted as described below that are runtime claimed nodes. For example, referring to FIG. 27, using a tree template structure to create a domain independent matching rule is graphically illustrated in accordance with an illustrative embodiment. The domain training utterance "The house was constructed by Sally" produces a role-node map table 2700, where role->node mappings are extracted from the intent. A first dependency parse 2702 results in a first matching rule illustrated by tree template 2704.

Figure 28:
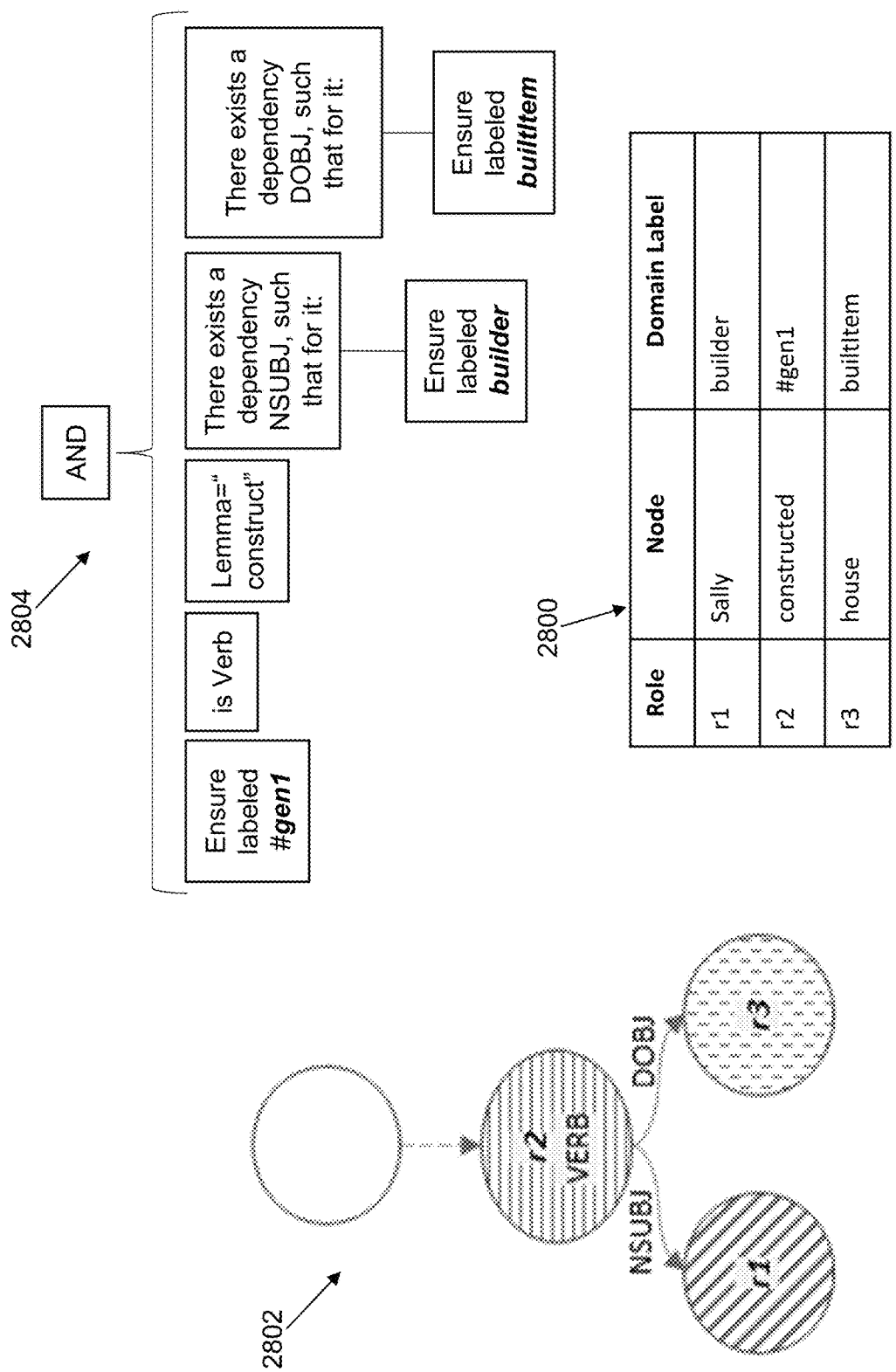
FIG. 28 graphically illustrates how to generate domain specific matching rules from a template and a role in accordance with an illustrative embodiment.

Referring to FIG. 28, how to generate domain specific matching rules from a template and a role is graphically illustrated in accordance with an illustrative embodiment. User slot labels are defined for each node in a role-label map table 2800 and a matching rule generating from the template while making the identifiers domain specific and adding lemma constraints where the user did not provide a label. A second dependency parse 2802 results in a second matching rule illustrated by tree template 2804.

Referring again to FIG. 25, in operation 2514, the template matching rules are combined using the logical "OR" operation to make an equivalence class rule, and processing continues in operation 2504 to select and process a next equivalence class, if any. All of the tree templates in an equivalence class are applied to generate matching rules.

In operation 2516, creation of domain independent matching rules for each variation model is done. Combining the template matching rules over all of the rules derived from each template and table allows the matching of many semantically equivalent, but syntactically different variants of the domain training utterance. The output is a domain specific rule to match and interpret any structure from the equivalence class with the additional constraints.

Referring again to FIG. 24A, similar to operation 1900, in an operation 2402, the sixth indicator may be received that indicates the set of annotated intent sentences for a specific intent.

Similar to operation 1902, in an operation 2404, a dependency parse of each annotated intent sentence included in the set of annotated intent sentences is performed. Where the sentence includes a plurality of sentences, a plurality of ordered dependency parses is created. A variety of structures may be received due to an inherent brittleness of dependency parsers.

In an operation 2406, each domain independent matching rule for each variation model is applied to the set of annotated intent sentences for a specific intent In an operation 2408, an overlay tree (OT) is initialized In an operation 2410, hyperedges generated from application of each domain independent matching rule for a next variation model are selected.

In an operation 2412, a determination is made concerning whether there is another OT leaf in a current OT level. When there is another OT leaf, processing continues in operation 2416. When there is not another OT leaf, processing continues in an operation 2414.

In operation 2414, a determination is made concerning whether there is another variation model to process. When there is another variation model, processing continues in operation 2410. When there is not another variation model, processing continues in an operation 2432 shown referring to FIG. 24B.

In operation 2416, a subset of hyperedges compatible with the OT leaf's inherited hyperedges is selected.

In an operation 2418, a set of maximal compatible subgroups is identified from the selected subset of hyperedges.

In operation 2420, a determination is made concerning whether the set of maximal compatible subgroups is empty. When the set of maximal compatible subgroups is empty, processing continues in operation 2422. When the set of maximal compatible subgroups is not empty, processing continues in an operation 2424.

In operation 2422, a child is added under the OT node that contains no hyperedges, and processing continues in operation 2412.

In operation 2424, a determination is made concerning whether there is another maximal compatible subgroup to process. When there is another maximal compatible subgroup, processing continues in operation 2426. When there is not another maximal compatible subgroup, processing continues in operation 2412.

In operation 2426, a child node is added under the OT node that contains the next maximal compatible subgroup.

In an operation 2428, domain specific matching rules are generated for each hyperedge in the next maximal compatible subgroup.

In an operation 2430, the generated domain specific matching rules are combined using the logical "AND" operation and stored in association with the OT node, and processing continues in operation 2424.

Referring to FIG. 24B, in operation 2432, a stack is initialized.

In an operation 2434, the OT is stored as a root of the stack.

In an operation 2436, a determination is made concerning whether the stack is empty. When the stack is empty, processing continues in an operation 2452. When the stack is not empty, processing continues in an operation 2438.

In operation 2438, a determination is made concerning whether a stack head has children nodes. When the stack head has children nodes, processing continues in an operation 2440. When the stack head does not have children nodes, processing continues in an operation 2442.

In operation 2440, a determination is made concerning whether the stack head has another child node. When the stack head another child node, processing continues in an operation 2444. When the stack head does not have another child node, processing continues in an operation 2446.

In operation 2442, the stack head's produced matching rule is set as the stored matching rule, and processing continues in operation 2450.

In operation 2444, a child node is pushed onto the stack, and processing continues in operation 2438.

In operation 2446, the stack head's children's node produced matching rules are combined using the logical "OR" operation.

In an operation 2448, the combined stack head's children's node produced matching rules are combined with the stack head's stored matching rule using the logical "AND" operation to define the intent rule tree.

In operation 2450, a head is popped off the stack, and processing continues in operation 2436 to continue processing the OT.

In operation 2452, the intent rule tree is stored in intent semantic rules 324 rules with one intent rule tree defined for the intent, the building of intent semantic rules 324 is complete for the intent, and processing continues in operation 1410 shown referring to FIG. 14.

Referring again to FIG. 14, in operation 1410, a determination is made concerning whether there is another intent to process for inclusion in intent semantic rules 324. When there is another intent to process, processing continues in operation 1406 to process the next intent. When there is not another intent to process, processing continues in an operation 1412. For example, execution of semantic rules development application 1322 may be stopped under control of a user.

In operation 1412, processing is complete to build intent semantic rules 324 for use by intent determination application 322.

During domain building, it can be advantageous to analyze a sentence for helpful information to aid in domain building. For example, lexical adoption suggestions can be applied. If an intent rule has a hit against a sentence, the nodes that are assigned a lexeme identifier from the hit but don't correspond to a hit from the lexeme matcher itself are offered as possible new entries in that lexeme's values. These are scored by how good a match the rest of the lexeme matches are in the intent hit. As another example, new lexeme suggestions can be applied. If a sentence would be an intent hit if one of its non-lexeme terms and one of the non-lexeme terms from the training sentence were both lexemes, these may be surfaced as a new lexeme suggestion with scoring by how good a match the rest of the sentence is. Semantic rules development application may further attempt to match the intent and provide lexical matching.

Implementing some examples of the present disclosure at least in part by using the above-described intent semantic rules 324 can reduce a total number of processing iterations, time, memory, electrical power, or any combination of these consumed by a computing device when analyzing textual data for meaning. Some machine-learning approaches may be more efficiently and speedily executed and processed with machine-learning specific processors (e.g., not a generic CPU). For example, some of these processors can include a graphical processing unit, an application-specific integrated circuit, a field-programmable gate array, a Tensor Processing Unit by Google, an Artificial Intelligence accelerator design, and/or some other machine-learning-specific processor that implements one or more neural networks using semiconductor (e.g., silicon, gallium arsenide) devices.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

receive a conversation element;
generate a plurality of distinct intent labels for the received conversation element;

divide the generated plurality of distinct intent labels into a plurality of interpretation partitions with overlapping semantic content;

for each interpretation partition of the plurality of interpretation partitions, define a set of maximal coherent subgroups that do not disagree on labels for terms in each subgroup;

compute a score for each maximal coherent subgroup of the defined set of maximal coherent subgroups; and select a maximal coherent subgroup from the set of maximal coherent subgroups based on the computed score;

aggregate intent labels from the selected maximal coherent subgroup of each interpretation partition of the plurality of interpretation partitions to define a multiple intent interpretation of the received conversation element;

output the defined multiple intent interpretation for the received conversation element;

determine an action based on the defined multiple intent interpretation of the received conversation element;

generate a response to the received conversation element based on the determined action; and output the generated response.

2. The non-transitory computer-readable medium of claim 1, wherein before determining the intent, the computer-readable instructions further cause the computing device to convert the received conversation element from an audio signal to text.

3. The non-transitory computer-readable medium of claim 2, wherein before outputting the generated response, the computer-readable instructions further cause the computing device to convert the generated response from response text to a response audio signal using a speech synthesizer, wherein the response audio signal is the generated response that is output.

4. The non-transitory computer-readable medium of claim 1, wherein the conversation element is received from a second computing device, and the generated response is output to the second computing device.

5. The non-transitory computer-readable medium of claim 1, wherein the plurality of interpretation partitions split the generated plurality of distinct intent labels into non-subsumable intent labels with overlapping semantic content.

6. The non-transitory computer-readable medium of claim 1, wherein the plurality of interpretation partitions split the generated plurality of distinct intent labels into lexically independent groups.

7. The non-transitory computer-readable medium of claim 1, wherein each maximal coherent subgroup of the set of maximal coherent subgroups do not disagree on labels for terms in each subgroup.

8. The non-transitory computer-readable medium of claim 1, wherein the score is computed based on an amount of sentence coverage of the terms included in a respective maximal coherent subgroup.

9. The non-transitory computer-readable medium of claim 1, wherein the score is computed based on match scores computed for each term.

10. The non-transitory computer-readable medium of claim 1, wherein the score is computed based on a parsimony score biasing against many small intent hits versus fewer large intent hits.

11. The non-transitory computer-readable medium of claim 1, wherein the score is computed based on intentSetScore=parsimonyScore·termScore, where intentSetScore is the computed score, parsimonyScore is a parsimony score, and termScore is a textual coverage score.

12. The non-transitory computer-readable medium of claim 11, wherein the parsimony score is computed based on parsimonyScore=$|S|^{-0.1}$, where S is the maximal coherent group to be scored, and $|S|$ indicates a size of S.

13. The non-transitory computer-readable medium of claim 11, wherein the textual coverage score is computed based on termScore=$\Sigma_{t \in T}$(len(t)·matchScore(t)·W), where T is a set of all terms covered in the maximal coherent group to be scored, len(t) is a value of a term's length, matchScore(t) is a match score, and W is a weight value.

14. The non-transitory computer-readable medium of claim 13, wherein the match score is computed based on a score computed by a named entity recognizer algorithm that identified the term.

15. The non-transitory computer-readable medium of claim 14, wherein before generating the plurality of distinct intent labels, the computer-readable instructions further cause the computing device to apply the named entity recognizer algorithm to the received conversation element to define the terms in the received conversation element.

16. The non-transitory computer-readable medium of claim 13, wherein the weight value is computed based on $$W = \begin{cases} 1 & \text{if } t \in P \\ 0.4 & \text{otherwise} \end{cases}.$$

where P is a subset of T present and playing a same role in training data as for a respective intent label of the generated plurality of distinct intent labels of the maximal coherent group to be scored.

17. The non-transitory computer-readable medium of claim 1, wherein the maximal coherent subgroup is selected based on having a highest computed score relative to any other subgroup of the set of maximal coherent subgroups.

18. The non-transitory computer-readable medium of claim 1, wherein before generating the plurality of distinct intent labels, the computer-readable instructions further cause the computing device to dependency parse the received conversation element to determine syntactic relationships.

19. The non-transitory computer-readable medium of claim 18, wherein before generating the plurality of distinct intent labels, the computer-readable instructions further cause the computing device to generate semantics relations based on the dependency parsed, received conversation element.

20. The non-transitory computer-readable medium of claim 19, wherein before generating the plurality of distinct intent labels, the computer-readable instructions further cause the computing device to generate semantic intent candidates from the generated semantics relations and lexeme matching.

21. The non-transitory computer-readable medium of claim 20, wherein before generating the plurality of distinct intent labels, the computer-readable instructions further cause the computing device to generate alternative semantic intent candidates by lexeme matching, wherein the generated semantic intent candidates and the generated alternative semantic intent candidates are combined to generate the plurality of distinct intent labels.

22. A computing device comprising:

a processor; and a non-transitory computer-readable medium operably coupled to the processor, the computer-readable medium having computer-readable instructions stored thereon that, when executed by the processor, cause the computing device to receive a conversation element;

generate a plurality of distinct intent labels for the received conversation element;

divide the generated plurality of distinct intent labels into a plurality of interpretation partitions with overlapping semantic content;

for each interpretation partition of the plurality of interpretation partitions, define a set of maximal coherent subgroups that do not disagree on labels for terms in each subgroup;

compute a score for each maximal coherent subgroup of the defined set of maximal coherent subgroups; and select a maximal coherent subgroup from the set of maximal coherent subgroups based on the computed score;

aggregate intent labels from the selected maximal coherent subgroup of each interpretation partition of the plurality of interpretation partitions to define a multiple intent interpretation of the received conversation element;

output the defined multiple intent interpretation for the received conversation element;

determine an action based on the defined multiple intent interpretation of the received conversation element;

generate a response to the received conversation element based on the determined action; and output the generated response.

23. A method of determining user intent from text, the method comprising:

receiving, by a computing device, a conversation element;

generating, by the computing device, a plurality of distinct intent labels for the received conversation element;

dividing, by the computing device, the generated plurality of distinct intent labels into a plurality of interpretation partitions with overlapping semantic content;

for each interpretation partition of the plurality of interpretation partitions, defining, by the computing device, a set of maximal coherent subgroups that do not disagree on labels for terms in each subgroup;

computing, by the computing device, a score for each maximal coherent subgroup of the defined set of maximal coherent subgroups; and selecting, by the computing device, a maximal coherent subgroup from the set of maximal coherent subgroups based on the computed score;

aggregating, by the computing device, intent labels from the selected maximal coherent subgroup of each interpretation partition of the plurality of interpretation partitions to define a multiple intent interpretation of the received conversation element;

outputting, by the computing device, the defined multiple intent interpretation for the received conversation element;

determining, by the computing device, an action based on the defined multiple intent interpretation of the received conversation element;

generating, by the computing device, a response to the received conversation element based on the determined action; and outputting, by the computing device, the generated response.

24. The method of claim 23, wherein the plurality of interpretation partitions split the generated plurality of distinct intent labels into non-subsumable intent labels with overlapping semantic content.

25. The method of claim 23, wherein the plurality of interpretation partitions split the generated plurality of distinct intent labels into lexically independent groups.

26. The method of claim 23, wherein each maximal coherent subgroup of the set of maximal coherent subgroups do not disagree on labels for terms in each subgroup.

27. The method of claim 23, wherein the score is computed based on an amount of sentence coverage of the terms included in a respective maximal coherent subgroup.

28. The method of claim 23, wherein the score is computed based on a parsimony score biasing against many small intent hits versus fewer large intent hits.

29. The method of claim 23, wherein the maximal coherent subgroup is selected based on having a highest computed score relative to any other subgroup of the set of maximal coherent subgroups.

* * * * *

UNITED STATES PATENT AND TRADEMARK OFFICE
CERTIFICATE OF CORRECTION

PATENT NO. : 10,978,053 B1
APPLICATION NO. : 17/069128
DATED : April 13, 2021
INVENTOR(S) : Jared Michael Dean Smythe et al.

It is certified that error appears in the above-identified patent and that said Letters Patent is hereby corrected as shown below:

In the Specification

Column 5, Line 42:
Delete the phrase "SAS/STAR)," and replace with --SAS/STAT®,--.

Column 27, Line 16:
Delete the phrase "overlay two (02)" and replace with --overlay two (o2)--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*